(12) United States Patent
Sato

(10) Patent No.: US 8,717,353 B2
(45) Date of Patent: May 6, 2014

(54) IMAGE PROCESSING APPARATUS AND METHOD

(75) Inventor: Yosuke Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 13/207,671

(22) Filed: Aug. 11, 2011

(65) Prior Publication Data

US 2012/0050322 A1    Mar. 1, 2012

(30) Foreign Application Priority Data

Aug. 27, 2010   (JP) ................................. 2010-191203
Jun. 24, 2011   (JP) ................................. 2011-140883

(51) Int. Cl.
| G06T 15/00 | (2011.01) |
| G06T 15/40 | (2011.01) |
| G09G 5/00 | (2006.01) |
| H04N 13/00 | (2006.01) |
| H04N 13/02 | (2006.01) |
| G06K 9/00 | (2006.01) |

(52) U.S. Cl.
USPC ........... 345/419; 345/422; 345/582; 345/630; 348/42; 348/47; 382/100

(58) Field of Classification Search
USPC ....................................................... 345/630
See application file for complete search history.

(56) References Cited

U.S. PATENT DOCUMENTS

| 5,384,615 | A  * | 1/1995 | Hsieh et al. ..................... 396/84 |
| 7,450,132 | B2 * | 11/2008 | Park et al. ....................... 345/582 |
| 7,869,657 | B2 * | 1/2011 | Podilchuk ....................... 382/218 |
| 2005/0174346 | A1 * | 8/2005 | Park et al. ....................... 345/422 |
| 2005/0253924 | A1 * | 11/2005 | Mashitani ........................ 348/42 |
| 2007/0286497 | A1 |  12/2007 | Podilchuk |
| 2009/0091567 | A1 * | 4/2009 | Fu et al. .......................... 345/419 |
| 2009/0244682 | A1 * | 10/2009 | Saishu et al. ................... 359/246 |
| 2010/0074468 | A1 * | 3/2010 | Panahpour Tehrani et al. ............................ 382/100 |
| 2011/0118015 | A1 * | 5/2011 | Yamamoto et al. ............. 463/30 |

FOREIGN PATENT DOCUMENTS

JP   2010-079505 A   4/2010

OTHER PUBLICATIONS

View Interpolation for Image Synthesis by Shenchang Eric Chen, Lance Williams of Apple Computer, Inc. pp. 279-288, 1993.*
Chen et al., View interpolation for image synthesis, Association for Computing Machinery, 1993, p. 279-288.

* cited by examiner

*Primary Examiner* — David Zarka
*Assistant Examiner* — Andrew J Gill
(74) *Attorney, Agent, or Firm* — Canon USA, Inc., IP Division

(57) ABSTRACT

An image processing apparatus calculates a near image distance, corresponding to a distance from a virtual viewpoint to a first viewpoint among viewpoints of a plurality of images, and a far image distance, corresponding to a distance from the virtual viewpoint to a second viewpoint among the viewpoints of the plurality of images, which is relatively distant from the virtual viewpoint compared with the first viewpoint, sets a search range, determines parallax vectors corresponding to search reference block coordinates by executing block matching processing within the search range and by using a first block image, included in a near image and corresponding to the search reference block coordinates and the near image distance, and a second block image, included in a far image and corresponding to the search reference block coordinates and the far image distance, and generates an image viewed from the virtual viewpoint by using the parallax vectors.

11 Claims, 22 Drawing Sheets

FIG. 11
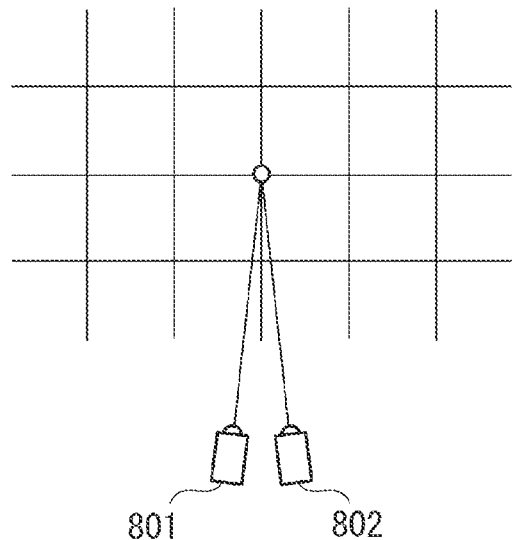
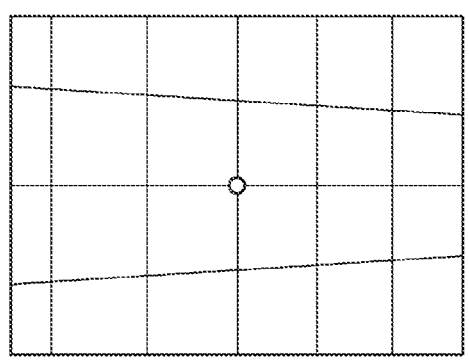 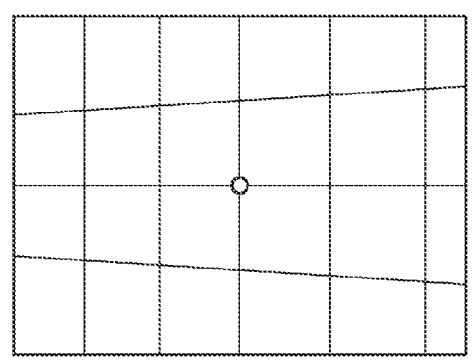
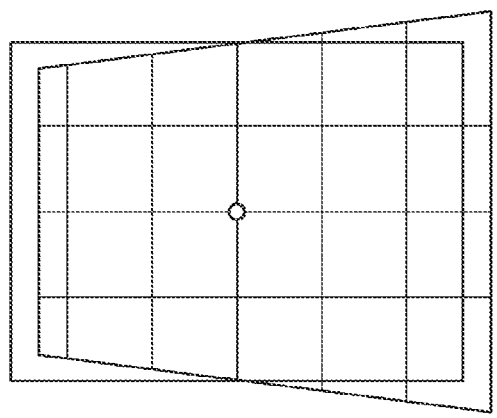 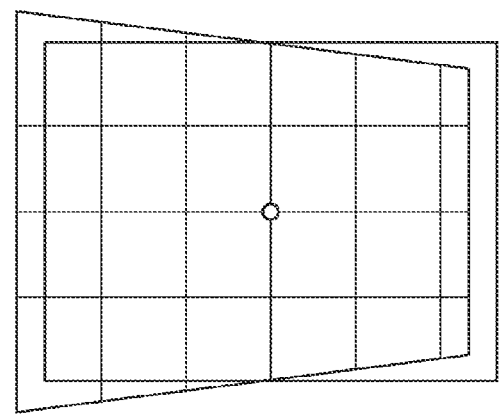

IMAGE PROCESSING APPARATUS AND METHOD

BACKGROUND OF THE INVENTION

1. Field of the Invention

The present invention relates to an image processing apparatus and a method configured to generate, based on a plurality of images photographed from a plurality of different viewpoints, an image viewed from a virtual viewpoint that is located outside the plurality of different viewpoints.

2. Description of the Related Art

Japanese Patent Application Laid-Open No. 2010-79505 discusses a method for executing virtual viewpoint image generation processing for generating an image photographed from a virtual viewpoint by using a plurality of images photographed from a plurality of viewpoints. More specifically, the method discussed in Japanese Patent Application Laid-Open No. 2010-79505 generates a virtual viewpoint image, which is an image viewed from a point between camera photographing positions (viewpoints) by using a plurality of photographed images.

However, the conventional method discussed in Japanese Patent Application Laid-Open No. 2010-79505 generates a virtual viewpoint image, which is an image viewed from a point between different camera photographing positions, by using a plurality of images photographed at a plurality of viewpoints but does not generate a virtual viewpoint image, which is an image viewed from a viewpoint outside the camera photographing positions, by using images photographed from two viewpoints.

Therefore, according to the conventional method discussed in Japanese Patent Application Laid-Open No. 2010-79505, a virtual viewpoint image, which is an image viewed from a virtual viewpoint located outside camera photographing positions and which has an expanded parallax, cannot be generated based on a two-viewpoint image, such as a binocular parallax image having an image quality as low as not to be able to achieve a sufficiently high effect of the stereoscopic view when stereoscopically viewed under a stereoscopic view-display environment because of its small parallax.

SUMMARY OF THE INVENTION

The present invention is directed to an image processing apparatus and a method capable of generating a virtual viewpoint image, which is an image viewed from a virtual viewpoint located outside camera photographing positions and which has an expanded parallax.

In addition, an aspect of the present invention is directed to an image processing apparatus and a method capable of generating a virtual viewpoint image, which is an image viewed from a virtual viewpoint not located on a straight line connecting viewpoints of a plurality of images, with a high accuracy.

According to another aspect of the present invention, an image processing apparatus configured to generate, based on a plurality of images photographed from a plurality of different viewpoints, an image viewed from a virtual viewpoint that is located outside the plurality of different viewpoints includes a calculation unit configured to calculate a near image distance, which corresponds to a distance from the virtual viewpoint to a first viewpoint among the viewpoints of the plurality of images, and a far image distance, which corresponds to a distance from the virtual viewpoint to a second viewpoint among the viewpoints of the plurality of images, which is relatively distant from the virtual viewpoint compared with the first viewpoint, a search range setting unit configured to set a search range, a determination unit configured to determine parallax vectors corresponding to search reference block coordinates by executing block matching processing within the search range and by using a first block image, which is included in a near image corresponding to the first viewpoint and which corresponds to the search reference block coordinates and the near image distance, and a second block image, which is included in a far image corresponding to the second viewpoint and which corresponds to the search reference block coordinates and the far image distance, and a generation unit configured to generate the image viewed from the virtual viewpoint by using the parallax vectors.

According to another aspect of the present invention, an image processing apparatus configured to generate, based on a plurality of images photographed from a plurality of different viewpoints, an image viewed from a virtual viewpoint that is located outside the plurality of different viewpoints includes a projection transform unit configured to projection-transform each of the plurality of images on a common plane, a calculation unit configured to calculate a near image distance and a far image distance for each search reference position on the common plane, wherein an intersection between a straight line passing through a search reference position on the common plane and the virtual viewpoint and a straight line passing through the viewpoints of the plurality of images is a virtual viewpoint correction position, wherein the near image distance corresponds to a distance between the virtual viewpoint correction position and a first viewpoint among the viewpoints of the plurality of images, and wherein the far image distance corresponds to a distance between the virtual viewpoint correction position and a second viewpoint among the viewpoints of the plurality of images, which is relatively distant from the virtual viewpoint correction position compared with the first viewpoint, a determination unit configured to determine parallax vectors corresponding to search reference block coordinates by using a first block image, which is included in the projection-transformed near image corresponding to the first viewpoint and which corresponds to the search reference block coordinates and the near image distance, and a second block image, which is included in the projection-transformed far image corresponding to the second viewpoint and which corresponds to the search reference block coordinates and the far image distance, and a generation unit configured to generate the image viewed from the virtual viewpoint by using the parallax vectors.

According to an exemplary embodiment of the present invention, a virtual viewpoint image, which is an image viewed from a virtual viewpoint located outside camera photographing positions and which has an expanded parallax, can be appropriately generated.

In addition, according to an exemplary embodiment of the present invention, virtual viewpoint images, which is an image viewed from a virtual viewpoint not located on a straight line connecting viewpoints of a plurality of images, can be generated with a high accuracy.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 11 schematically illustrates an example of a result of projection transform processing according to the second exemplary embodiment of the present invention.

DESCRIPTION OF THE EMBODIMENTS

Various exemplary embodiments, features, and aspects of the invention will be described in detail below with reference to the drawings.

In a first exemplary embodiment of the present invention, a parallax of a parallel view-binocular parallax image, which is a binocular parallax image photographed by a parallel view method, is readjusted by times equivalent to a parallax magnification PM.

Figure 1:
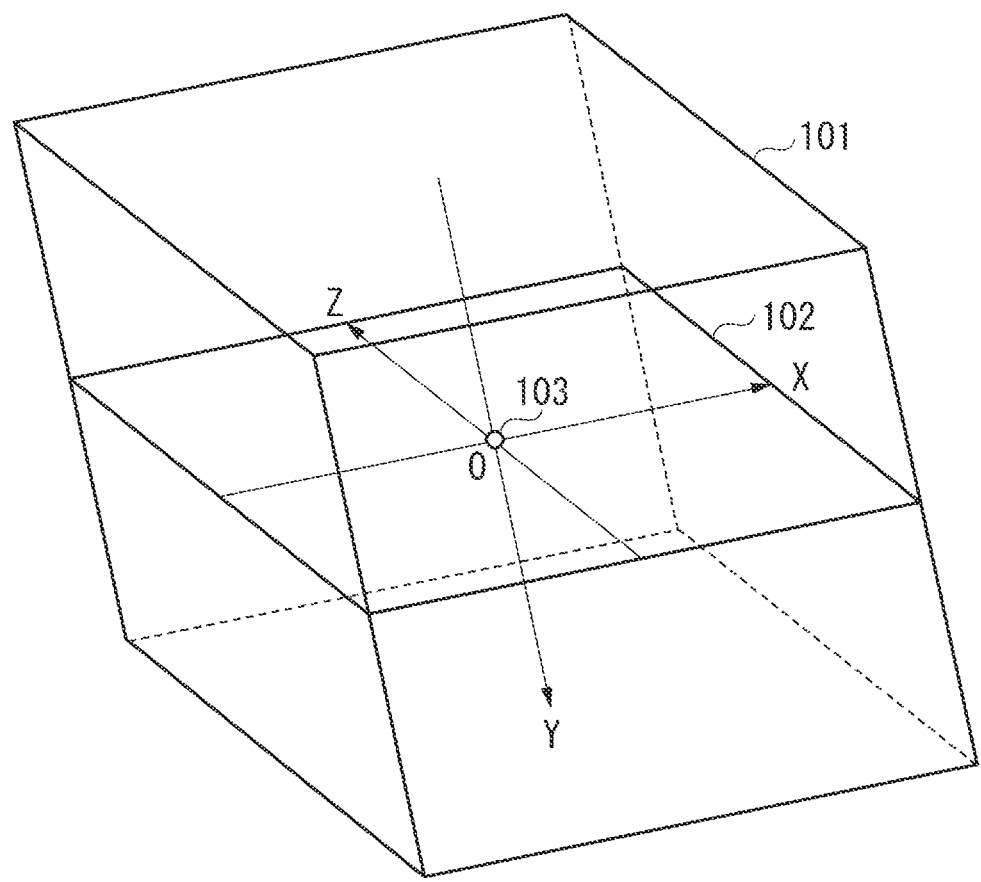
FIG. 1 schematically illustrates an example of a three-dimensional space, which is expressed in an XYZ orthogonal coordinate system.
Figure 2A:
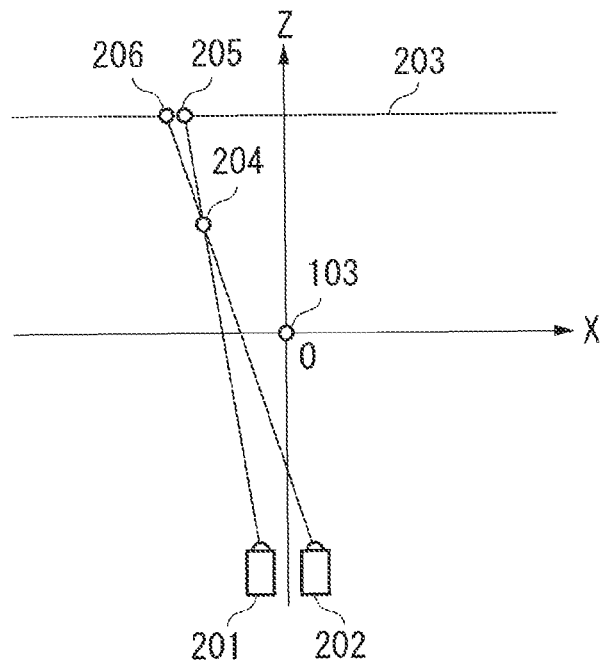
FIGS. 2A and 2B illustrate an example of an XZ plane when viewed from a negative direction towards a positive direction in a direction of a Y-axis according to a first exemplary embodiment.

Now, the parallel view-binocular parallax image will be defined with reference to FIGS. 1 and 2A. FIG. 1 schematically illustrates an example of a three-dimensional space, which is expressed in an XYZ orthogonal coordinate system. Referring to FIG. 1, a three-dimensional space 101 includes an origin O 103 and an XZ plane 102, which includes the origin O 103.

FIG. 2A illustrates the XZ plane 102 when viewed from the negative direction towards the positive direction in a direction of a Y-axis. Referring to FIG. 2, the left camera 201 photographs a left eye-viewpoint image of a binocular parallax image. A right camera 202 photographs a right eye-viewpoint image of a binocular parallax image.

A common infinite-distance XY plane 203 corresponds to an image sensor plane of each of the left camera 201 and the right camera 202. An image of an object 204 is to be photographed.

A mapping point 205 of the object 204 is a mapping point of the object 204 corresponding to the left camera 201 on the common infinite-distance XY plane 203. A mapping point 206 of the object 204 is a mapping point of the object 204 corresponding to the right camera 202 on the common infinite-distance XY plane 203.

In the present exemplary embodiment, each of a left camera viewpoint PL ($x_L$, $y_L$, $z_L$, $\theta_{xL}$, $\theta_{yL}$, $\theta_{zL}$) and a right camera viewpoint PR ($x_R$, $y_R$, $z_R$, $\theta_{xR}$, $\theta_{yR}$, $\theta_{zR}$) is defined in a six-dimensional coordinate system. More specifically, $x_L$ and $x_R$ are X-axis direction-coordinate values in the three-dimensional space 101. In addition, $y_L$ and $y_R$ are Y-axis direction-coordinate values in the three-dimensional space 101. Furthermore, $z_L$ and $z_R$ are Z-axis direction-coordinate values in the three-dimensional space 101. Moreover, $\theta_{xL}$, and $\theta_{xR}$ are X-axis rotation angles.

The angle increases by a counterclockwise rotation around the X-axis when viewed from the negative direction towards the positive direction in the direction of the X-axis. More specifically, the angle is 0° in the direction of the Z-axis.

In addition, $\theta_{yL}$ and $\theta_{yR}$ are Y-axis rotation angles. The angle increases by a counterclockwise rotation around the Y-axis when viewed from the negative direction towards the positive direction in the direction of the Y-axis. More specifically, the angle is 0° in the direction of the X-axis.

In addition, $\theta_{zL}$ and $\theta_{zR}$ are Z-axis rotation angles. The angle increases by a counterclockwise rotation around the Z-axis when viewed from the negative direction towards the positive direction in the direction of the Z-axis. More specifically, the angle is 0° in the direction of the Y-axis.

In a parallel view-binocular parallax image, a relationship between the left camera viewpoint PL and the right camera viewpoint PR can be expressed by the following expression (1.1).

A parallel view-binocular parallax image, which is photographed by the parallel view method, is a binocular parallax image if a difference between the left camera viewpoint PL and the right camera viewpoint PR, which acquire an image of the object, respectively, is expressed only by a baseline distance $\alpha(=|x_L-x_R|)$. A variable "d" denotes a distance between a camera viewpoint and a point of regard. The distance d between a camera viewpoint and a point of regard will be described in detail below.

$$x_L = -\frac{a}{2} \quad y_L = 0 \quad z_L = -d \quad (1.1)$$
$$\theta_{xL} = 0 \quad \theta_{yL} = \frac{\pi}{2} \quad \theta_{zR} = \pi$$
$$x_R = \frac{a}{2} \quad y_R = 0 \quad z_R = -d$$
$$\theta_{xR} = 0 \quad \theta_{yR} = \frac{\pi}{2} \quad \theta_{zL} = \pi$$

Now, a definition of a parallax to be readjusted by PM times will be described in detail below with reference to FIG. 2B.

Figure 2B:
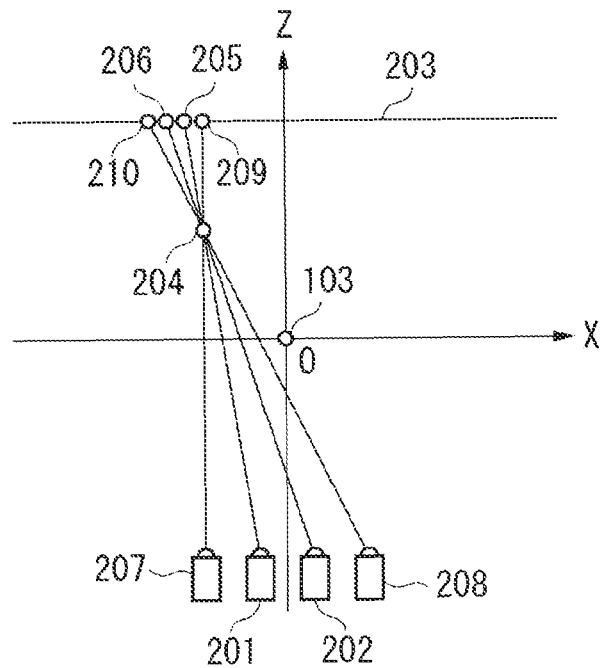

Referring to FIG. 2B, a virtual left camera 207 photographs a left eye-viewpoint image among a binocular parallax image having a readjusted parallax. A virtual right camera 208 photographs a right eye viewpoint-image among a binocular parallax image having a readjusted parallax.

A mapping point 209 is a mapping point of the object 204 corresponding to the virtual left camera 207 on the common infinite-distance XY plane 203. A mapping point 210 is a mapping point of the object 204 corresponding to the virtual right camera 208 on the common infinite-distance XY plane 203.

In the present exemplary embodiment, a virtual left camera viewpoint PVL is defined as PVL ($x_{VL}$, $y_{VL}$, $z_{VL}$, $\theta_{xVL}$, $\theta_{yVL}$, $\theta_{zVL}$) and a virtual right camera viewpoint PVR is defined as PVR ($x_{VR}$, $y_{VR}$, $z_{VR}$, $\theta_{xVR}$, $\theta_{yVR}$, $\theta_{zVR}$) respectively, in the six-dimensional coordinate system.

In addition, $x_{VL}$ and $x_{VR}$ are X-axis direction-coordinate values in the three-dimensional space 101. Furthermore, $y_{VL}$ and $y_{VR}$ are Y-axis direction-coordinate values in the three-dimensional space 101. Moreover, $z_{VL}$ and $z_{VR}$ are Z-axis direction-coordinate values in the three-dimensional space 101. In addition, $\theta_{xVL}$ and $\theta_{xVR}$ are X-axis rotation angles.

The angle increases by a counterclockwise rotation around the X-axis when viewed from the negative direction towards the positive direction in the direction of the X-axis. More specifically, the angle is 0° in the direction of the Z-axis.

In addition, $\theta_{yVL}$ and $\theta_{yVR}$ are Y-axis rotation angles. The angle increases by a counterclockwise rotation around the Y-axis when viewed from the negative direction towards the positive direction in the direction of the Y-axis. More specifically, the angle is 0° in the direction of the X-axis.

Furthermore, $\theta_{zVL}$ and $\theta_{zVR}$ are Z-axis rotation angles. The angle increases by a counterclockwise rotation around the Z-axis when viewed from the negative direction towards the positive direction in the direction of the Z-axis. More specifically, the angle is 0° in the direction of the Y-axis.

In a parallel view-binocular parallax image, a relationship between the virtual left camera viewpoint PVL and the virtual right camera viewpoint PVR can be expressed by the following expression (1.2).

More specifically, the readjustment of the parallax by PM times is equivalent to the generation of images corresponding to a viewpoint PVL for the virtual left camera 207 and a viewpoint PVR for the virtual right camera 208, which are located at positions equivalent to PM times of a baseline distance "a" between the left camera viewpoint PL corresponding to the left camera 201 and the right camera viewpoint PR corresponding to the right camera 202.

$$x_{VL} = -\frac{PM \cdot a}{2} \quad y_{VL} = 0 \quad z_{VL} = -d \quad (1.2)$$
$$\theta_{xVL} = 0 \quad \theta_{yVL} = \frac{\pi}{2} \quad \theta_{zVL} = \pi$$
$$x_{VR} = \frac{PM \cdot a}{2} \quad y_{VR} = 0 \quad z_{VR} = -d$$
$$\theta_{xVR} = 0 \quad \theta_{yVR} = \frac{\pi}{2} \quad \theta_{zVR} = \pi$$

In executing processing according to the present exemplary embodiment, it is supposed that the baseline distance a=1 (cm). However, the value (length) of the baseline distance a is not limited to a specific value.

The parallax magnification PM can assume any actual numerical value within the range of 0≤PM<∞. If the parallax magnification PM=0, then the baseline distance $|x_{VL}-x_{VR}|$ between the viewpoint PVL and the viewpoint PVR becomes 0. Therefore, the parallax becomes 0.

On the other hand, if the parallax magnification PM assumes a value in the range of 0<PM<1, then $|x_{VL}-x_{VR}|<a$. Therefore, the parallax becomes smaller than the binocular parallax image. In addition, if the parallax magnification PM=1, then $|x_{VL}-x_{VR}|=a$. Therefore, the parallax becomes equivalent to the parallax of an input binocular parallax image. Moreover, if the parallax magnification PM is in the range of 1<PM<∞, then $|x_{VL}-x_{VR}|>a$. Therefore, the parallax becomes larger than an input binocular parallax image.

Figure 3:
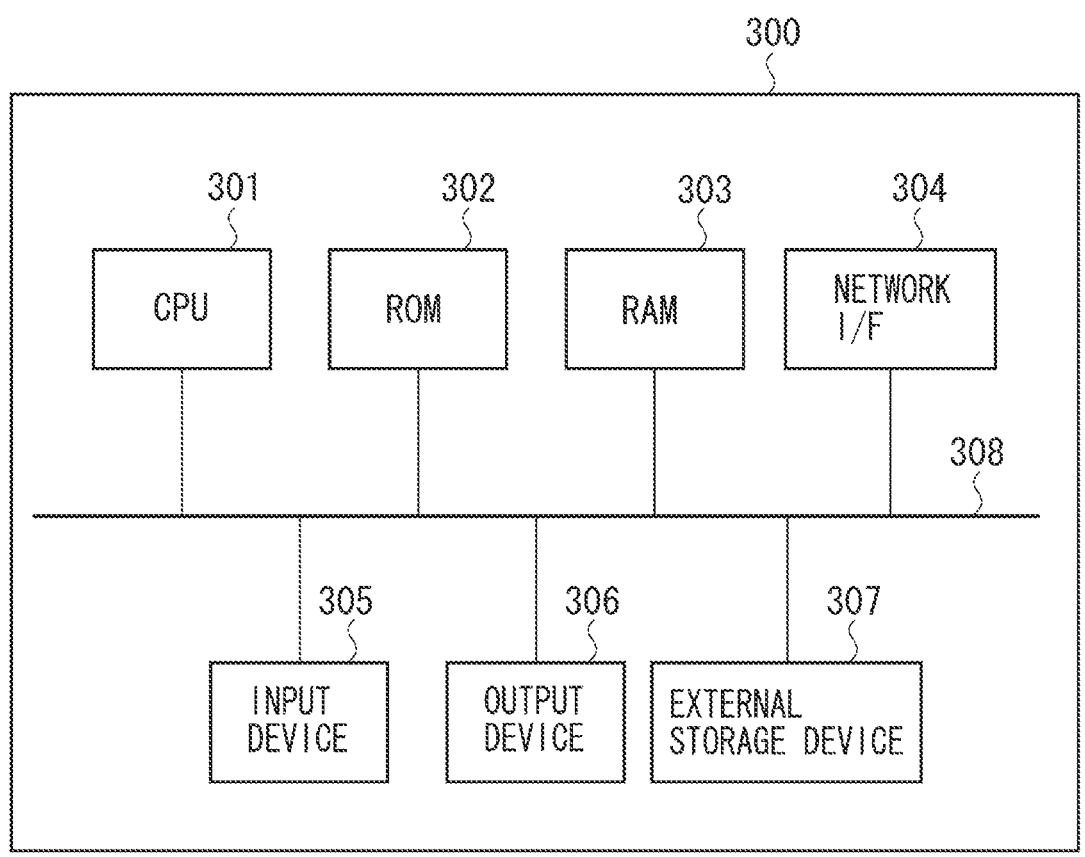
FIG. 3 illustrates an exemplary hardware configuration of a computer according to a first exemplary embodiment of the present invention.

FIG. 3 illustrates an exemplary hardware configuration of a computer according to the present exemplary embodiment. Referring to FIG. 3, a central processing unit (CPU) 301 is configured to control an operation of the entire image processing apparatus 300 by executing an operating system (OS) and an application program from an external storage device (hard disk) 307. More specifically, the CPU 301 executes a corresponding processing program.

In addition, the CPU 301 execute control for temporarily storing information and a file necessary for executing the program on a random access memory (RAM) 303. A read-only memory (ROM) 302 stores a program, such as a basic input/output (I/O) program. The RAM 303 functions as a main memory and a work area for the CPU 301.

A network interface (I/F) 304 is connected to a personal area network (PAN), a local area network (LAN), or a wide area network (WAN). The network I/F 304 is a communication interface between the image processing apparatus 300 and an external apparatus. An input device 305 can include an imaging apparatus configured to photograph an image of an object and input the image as well as a mouse and a keyboard configured to receive a user input.

Because the input device 305 of the image processing apparatus 300 includes the imaging apparatus, the image processing apparatus 300 can function as a digital camera or a digital video camera.

An output device 306 is a display device, such as a liquid crystal display (LCD). An external storage device 307 stores an application program, a driver program, an OS, a control program, and a processing program for executing processing according to the present exemplary embodiment. A system bus 308 controls a flow of processing data within the apparatus.

Figure 4:
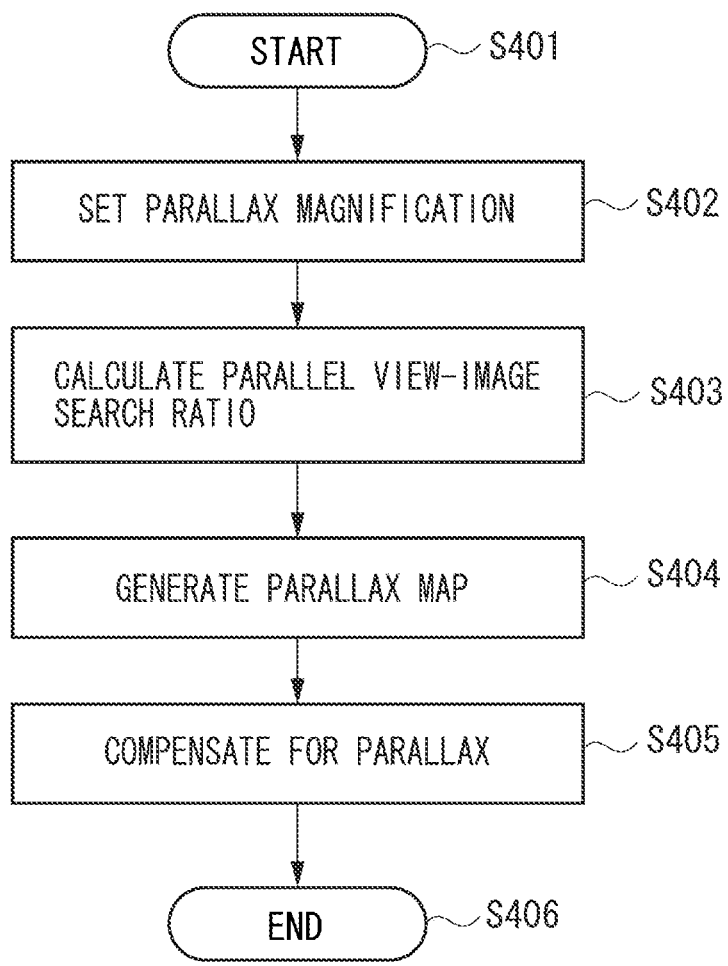
FIG. 4 is a flow chart illustrating an exemplary flow of a parallax readjustment program according to the first exemplary embodiment of the present invention.

FIG. 4 is a flow chart illustrating an exemplary flow of a parallax readjustment program (hereinafter simply referred to as a "processing program 1") according to the present exemplary embodiment, which is executed by the CPU 301.

The processing program 1, which is illustrated in the flow chart of FIG. 4, is normally recorded on the external storage device 307. In executing the processing program 1, the processing program 1 is read and executed by the CPU 301 from the external storage device 307 on the RAM 303.

Referring to FIG. 4, in step S401, the CPU 301 starts the processing program 1.

In step S402, the CPU 301 sets the parallax magnification PM. More specifically, in the present exemplary embodiment, it is supposed that PM=3. In addition, if the parallax set to both pieces of image data to be input is normal, the parallax magnification PM is set at a value with which the parallax can be readjusted to three times the normal level.

In step S403, the CPU 301 calculates an image search ratio SR. The image search ratio SR is a ratio of a near image distance NID to the far image distance FID. The near image distance NID is a distance between a virtual viewpoint of a virtual viewpoint image to be generated and a viewpoint of the camera configured to photograph an image at a viewpoint near the virtual viewpoint. The far image distance FID is a distance between the virtual viewpoint and a viewpoint of the camera configured to photograph an image at a viewpoint far from the virtual viewpoint.

In the present exemplary embodiment in which the parallax of a parallel view-binocular parallax image is readjusted, the near image distance NID and the far image distance FID can be calculated by using the following expression (1.3).

$$NID = PM - 1 \quad FID = PM + 1 \quad SR = \left|\frac{NID}{FID}\right| \quad (1.3)$$

Now, an exemplary method for calculating the near image distance NID and the far image distance FID according to the present exemplary embodiment will be described in detail below with reference to FIG. 2B.

Referring to FIG. 2B, the mapping point 209 is a mapping point on the common infinite-distance XY plane 203 for the object 204 whose image is to be photographed by the virtual left camera 207. Furthermore, the mapping point 205 is a mapping point on the common infinite-distance XY plane 203 for the object 204 whose image is to be photographed by the left camera 201. Moreover, the mapping point 206 is a mapping point on the common infinite-distance XY plane 203 for the object 204 whose image is to be photographed by the right camera 202.

In the example illustrated in FIG. 2B, the virtual left camera 207, the left camera 201, and the object 204 form a triangle A. In addition, the mapping point 209, the mapping point 205, and the object 204 form a triangle B. The triangle A and the triangle B are geometrically similar.

Furthermore, the virtual left camera 207, the right camera 202, and the object 204 form a triangle C. In addition, the mapping point 209, the mapping point 206, and the object 204 form a triangle D. The triangle C and the triangle D are geometrically similar.

Therefore, a ratio between the length of an edge of the triangle A, which exists between the vertexes of the triangle A, i.e., between the virtual left camera 207 and the left camera 201, and the length of an edge of the triangle C, which exists between the vertexes of the triangle C, i.e., between the virtual left camera 207 and the right camera 202, can be calculated by the following expression (1.4).

$$(x_{VL}-x_L):(x_{VL}-x_R)=(PM-1):(PM+1) \quad (1.4)$$

Let a Z-axis direction component of the edge which commonly forms the triangle A and the triangle C and which exists between the virtual left camera 207 and the object 204 be the height of the triangle A and the triangle C. Then, a ratio between the areas of the triangle A and the triangle C matches the ratio between the bottom edge of the triangle A, which exists between the vertexes of the triangle A, i.e., between the virtual left camera 207 and the left camera 201, and the edge of the triangle C, which exists between the vertexes of the triangle C, i.e., between the virtual left camera 207 and the right camera 202.

In the present exemplary embodiment, the triangle A and the triangle B are similar and the triangle C and the triangle D are similar as described above. Accordingly, in the present exemplary embodiment, the area ratio between the areas of the triangle B and the triangle D is equivalent to the area ratio between the areas of the triangle A and the triangle C.

Let a Z-axis direction component of the edge which commonly forms the triangle B and the triangle D, i.e., the edge which exists between the mapping point 209 and the object 204, be the height of the triangle B and the triangle D. Then, a ratio between the area of the triangle B and the triangle D matches the ratio between the bottom edge of the triangle B, which exists between the vertexes of the triangle B, i.e., between the mapping point 209 and the mapping point 205, and the edge of the triangle C, which exists between the vertexes of the triangle C, i.e., between the mapping point 209 and the mapping point 206.

In the above-described manner, the near image distance NID, which is used in searching for an image to be mapped by the left camera 201, which exists near the virtual left camera 207, and the far image distance FID, which is used in searching for an image to be mapped by the right camera 202, which exists far from the virtual left camera 207, can be calculated by using expression (1.3).

Accordingly, a distance ratio between the distance between the mapping point 205 and the mapping point 209, which is generated by the virtual left camera 207, which exists at a location expressed as $x_{VL}$_PM×a/2, by mapping the object 204 on the common infinite-distance XY plane 203, and the distance between the mapping point 206 and the mapping point 209 can be calculated by the above-described expression (1.4).

Now, the method of setting the near image distance NID and the far image distance FID executed by using the parallax magnification PM will be supplementarily described. In the following description, values of the near image distance NID and the far image distance FID, which can be calculated by using expression (1.3), are altered and controlled to express the ratio between values thereof by a simple integer.

If the parallax magnification PM=3, then the NID=2 and the FID=4 as a result of calculation by expression (1.3). By dividing the NID and the FID by 2 respectively, then the NID=1 and the FID=2.

In another example, if the parallax magnification PM=0, then the NID=−1 and the FID=1. On the other hand, if the parallax magnification PM=0.5, then the NID=−0.5 and the FID=1.5. By multiplying the NID and the FID by 2 respectively, then the NID=−1 and the FID=3.

If the parallax magnification PM=1, then the NID=0 and the FID=2. By dividing the NID and the FID by 2 respectively, then the NID=0 and the FID=1. On the other hand, if the parallax magnification PM=2, then the NID=1 and the FID=3. In addition, if the parallax magnification PM=4, then the NID=3 and the FID=5.

The values of the NID and the FID are adjusted and controlled to express the ratio between the values of the near image distance NID and the far image distance FID by a simple integer after the processing that uses expression (1.3). This is because the image data has been discretized. It is not necessary to alter the values in an environment in which the image data can be processed as continuous data.

Returning to FIG. 4, in step S404, the CPU 301 executes template matching to generate a parallax map of the parallel view-binocular parallax image. In the present exemplary embodiment, for template matching method, a characteristic such that the triangles formed by the cameras and the object 204, which is described above in step S403, is geometrically similar to the triangle formed by the mapping points on the mapping plane and the object 204 is used.

More specifically, firstly, a search reference position is set at a pixel that constitutes the image to be mapped by the virtual left camera 207 or at a small region constituted by the pixel. Secondly, a pixel existing at a position distant from the search reference position by dd·NID within the image mapped by the left camera 201 and a small region, which is constituted by the pixel, are selected. Thirdly, a pixel existing at a position distant from the search reference position by dd·FID within the image mapped by the right camera 202 and a small region, which is constituted by the pixel, are selected.

Fourthly, the selected two pixels or the selected two regions constituted by the selected pixels respectively are compared. Fifthly, values of dd·NID at which the pixels or the small regions match each other with the highest accuracy are detected as parallax vectors. In the present exemplary embodiment, the parallax vector is simply expressed by the distance variable dd. An exact solution of the parallax vector according to the present exemplary embodiment will be described in detail later below.

Figure 5:
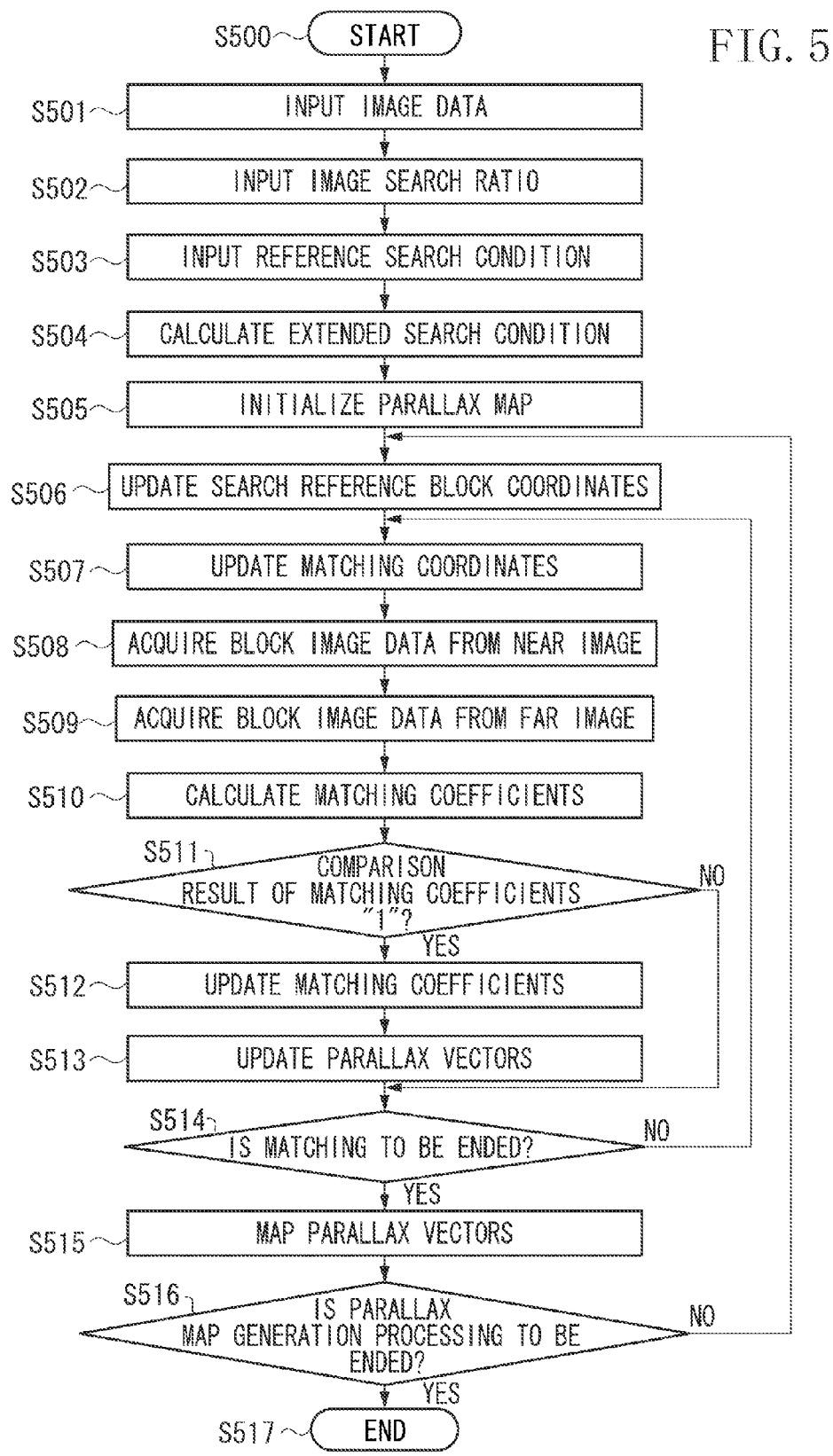
FIG. 5 is a flow chart illustrating an exemplary flow of parallax vector detection processing, which is executed in step S404 illustrated in FIG. 4.

FIG. 5 is a flow chart illustrating an exemplary flow of parallax vector detection processing, which is executed in step S404 illustrated in FIG. 4. In the following description, the flow chart of the parallax vector detection processing will be simply referred to as a "sub flow chart 1".

In the processing according to the sub flow chart 1, it is supposed that the display resolutions, bit accuracy levels of pixels, color spaces, color formats, and the angles of view $\theta_{Len}$ of the lens used in shooting are the same for the parallel view-binocular parallax images to be input.

In addition, in the present exemplary embodiment, it is supposed that image data of each of the parallel view-binocular parallax images to be input having the following attributes has been recorded.

Display resolution: 2,592×1,728 (pixel$^2$)
Color space: red (R), green (G), and blue (B) (RGB)
Color format: RGB (field sequential)
Bit accuracy of the pixel: 8 (bit)
Angle of view: $\theta_{Len}=\pi/2$ (rad)

In addition, in the processing described below, field-sequential image data having the RGB format is converted into a luminance signal Y. The luminance signal Y can be calculated by executing the weighted mean operation on the RGB image signal for each pixel by using as expressed by the following equation:

$$Y=a1\times R+a2\times G+a3\times B.$$

Furthermore, a1, a2, and a3 are color matrixes. Various color matrixes are defined by various standards for the input image. More specifically, in International Telecommunication Union (ITU)-R BT.709 recommendation (Rec. 709), a1=0.2126, a2=0.7152, and a3=0.0722.

Instead of using the luminance signal Y, a single component (any one of R, G, or B components) of the image data can be used. In addition, data of any color space other than the RGB color space or the YUV color space can be used.

Furthermore, the processing content of the processing for generating a virtual right-viewpoint image is the same as the processing content of the processing for generating a virtual left-viewpoint image. In other words, the virtual right-viewpoint image generation processing and the virtual left-viewpoint image generation processing differ from each other in a point as to which of a near image NI and a far image FI the left camera-viewpoint image is to be set as.

More specifically, in generating a virtual left-viewpoint image, the left camera-viewpoint image is set as the near image NI and the right camera-viewpoint image is set as the far image FI. On the other hand, in generating a virtual right-viewpoint image, the left camera-viewpoint image is set as the far image FI and the right camera-viewpoint image is set as the near image NI. Accordingly, in the following description, the virtual left-viewpoint image generation processing will be described in detail and the virtual right-viewpoint image generation processing will not be particularly described.

In the following description about the processing illustrated in FIG. 5, exemplary processing for generating a virtual left-viewpoint image, which has been virtually photographed by the virtual left camera 207, will be described in detail. In addition, in the present exemplary embodiment, it is supposed that before executing the processing program 1, processing for correcting an image quality degradation cause, such as distortion that may occur due to an aberration on the lens, the phenomenon of color break, a sensor noise that may occur on the image sensor, or an encoding noise, is previously executed where necessary to prevent matching failure that may otherwise occur due to the above-described image quality degradation cause as a result of the template matching.

In addition, if the image signal has already been subjected inverse gamma correction, gamma correction is executed on the image signal before executing the processing program 1. More specifically, the inverse gamma correction refers to processing having a characteristic such that as a value of an input X becomes smaller, a value of an output Y becomes greater. The inputs X and Y in the inverse gamma correction can be expressed by the following equation:

$$Y=X^{gi}$$

where gi=5/11, where the value of the input X is in the range of 0≤X≤1, and where the value of the input Y is in the range of 0≤Y≤1. On the other hand, the gamma correction refers to processing having a characteristic such that as the value of an input X becomes smaller, the value of an output Y becomes smaller. The inputs X and Y in the gamma correction can be expressed by the following equation:

$$Y=X^{gf}$$

where gf=11/5 and where gf=gi$^{-1}$=11/5.

In the present exemplary embodiment, the bit accuracy of the pixel is 8. Accordingly, a value calculated by multiplying the pixel value by 2$^{-8}$ times is set as the value of the input X. In addition, the bit accuracy is returned to 8 by multiplying the output Y by 2$^8$ times.

Referring to FIG. 5, in step S500, the CPU 301 of the image processing apparatus 300 starts processing illustrated in the sub flow chart 1. In step S501, the CPU 301 inputs the near image NI ($x_{in}$, $y_{in}$) and the far image FI ($x_{in}$, $y_{in}$). Both the X-axis direction coordinate pointer $x_{in}$ and the Y-axis direction coordinate pointer $y_{in}$ can assume a value "0" or a positive integer.

Let rsl_x and rsl_y be an X-axis direction display resolution and a Y-axis direction display resolution of the near image NI ($x_{in}$, $y_{in}$) and the far image FI ($x_{in}$, $y_{in}$), then $x_{in}$ and $y_{in}$ assume a value in the following range, respectively:

$0 \leq x_{in} < rsl\_x$ $0 \leq y_{in} < rsl\_y$.

In the present exemplary embodiment, since rsl_x=2,592 and rsl_y=1,728, then $0 \leq x_{in} < 2,592$ and $0 \leq y_{in} < 1,728$.

In step S502, the CPU 301 inputs an image search ratio SR. However, alternatively, the near image distance NID and the far image distance FID can be input instead of the image search ratio SR. In the present exemplary embodiment, since the parallax magnification PM=3, then NID=1, FID=2, and SR=0.5 as a result of the calculation using expression (1.3).

In step S503, the CPU 301 inputs a reference matching processing condition, which is used in template matching. The reference matching processing condition includes an X-axis direction reference block size $BS\_BASIC_x$, a Y-axis direction reference block size $BS\_BASIC_y$, an X-axis direction reference one-sided search range $SS\_BASIC_x$, and a pixel search accuracy PSA. In the present exemplary embodiment, $BS\_BASIC_x=8$, $BS\_BASIC_y=8$, $SS\_BASIC_x=8$, and PSA=0.5.

The pixel search accuracy PSA assumes an exponentiation of 2, i.e., $PSA=2^{-n}$ (n=0, 1, 2, 3, . . . ). Because the amount of movement of a search block in a next search exponentially decreases as the value of n becomes greater, the search accuracy improves.

In the present exemplary embodiment, PSA=0.5. Accordingly, the search is executed at the ½-pixel accuracy, by which the template matching is executed by using a search block movement amount as half as the pixel pitch of the input image.

In a parallel view-binocular parallax image, a parallax of an image in the direction of the Y-axis, which may not occur in terms of the geometrical optics, may occur due to a defocused image or due to distortion on the image. In the present exemplary embodiment, it is assumed that the above-described image degradation cause may not occur. However, in order to achieve a high practical utility of the present invention, exemplary processing for suppressing the image degradation cause will be described in detail below.

In this order, the present invention adds a Y-axis reference one-sided search range $SS\_BASIC_y$ to the above-described reference matching processing condition. In the present exemplary embodiment, $SS\_BASIC_y=3$.

In step S504, the CPU 301 calculates an extended matching processing condition in template matching by using the image search ratio SR and the reference matching processing condition. The extended matching processing condition includes an X-axis direction extended block size $BS\_EXTEND_x$, a Y-axis direction extended block size $BS\_EXTEND_y$, and an X-axis direction extended one-sided search range $SS\_EXTEND_x$. The $BS\_EXTEND_x$, $BS\_EXTEND_y$, and $SS\_EXTEND_x$ are calculated by the following expression (1.5), respectively. More specifically, $BS\_EXTEND_x=32$, $BS\_EXTEND_y=32$, and $SS\_EXTEND_x=16$ as a result of calculation using the following expression (1.5):

$$BS\_EXTEND_x = \frac{FID \cdot BS\_BASIC_x}{PSA} \quad (1.5)$$

$$BS\_EXTEND_y = \frac{FID \cdot BS\_BASIC_y}{PSA}$$

$$SS\_EXTEND_x = \frac{SS\_BASIC_x}{PSA}.$$

If the Y-axis direction reference one-side search range $SS\_BASIC_y$ has been added to the reference matching processing condition, a Y-axis direction extended one-sided search range $SS\_EXTEND_y$ is added to the extended matching processing condition calculated in step S504.

$SS\_EXTEND_y$ is calculated by using the following expression (1.6). More specifically, $SS\_EXTEND_y=6$ as a result of calculation using expression (1.6):

$$SS\_EXTEND_y = \frac{SS\_BASIC_y}{PSA}. \quad (1.6)$$

In step S505, the CPU 301 initializes a parallax map PMAP (ax, ay), which is generated by executing the sub flow chart 1.

The X-axis direction search reference block pointer ax and the Y-axis search reference block pointer ay can assume a value "0" or a positive integer.

Let rsl_x and rsl_y be the X-axis direction display resolution and the Y-axis direction display resolution of both pieces of image data, then ax and ay assume a value expressed by the following expression (1.7), respectively. In the present exemplary embodiment, since rsl_x=2,592 and rsl_y=1,728, then $0 \leq ax < 324$ and $0 \leq ay < 216$. In addition, ax and ay can be combined in 324×216=69,987 possible combinations, which matches a reference range of the parallax map PMAP (ax, ay).

$$0 \leq ax < \frac{rsl\_x}{BS\_BASIC_x} \quad (1.7)$$

$$0 \leq ay < \frac{rsl\_y}{BS\_BASIC_y}.$$

As can be expressed by the following expression (1.8), by referring to the parallax map by using a predetermined X-axis direction search reference block pointer $ax_m$ and a Y-axis direction search reference block pointer $ay_n$, a predetermined X-axis direction parallax vector $\Delta x_{m,n}$ and a predetermined Y-axis direction parallax vector $\Delta y_{m,n}$ can be acquired.

$$\Delta x_{m,n}, \Delta y_{m,n} = PMAP(ax_m, ay_n) \quad (1.8).$$

In step S506, the CPU 301 updates search reference block coordinates (BBC_x, BBC_y). The search reference block X coordinate BBC_x and the search reference block Y coordinate BBC_y are expressed by the following expression (1.9):

$$BBC\_x = ax \cdot BS\_EXTEND_x$$

$$BBC\_y = ay \cdot BS\_EXTEND_y \quad (1.9).$$

The X-axis direction search reference block pointer ax and the Y-axis direction search reference block pointer ay can be combined into any combination within the range of expression (1.7). The order of combining ax and ay can be arbitrarily determined. In the present exemplary embodiment, the following combination order is used in determining the combination of ax and ay for easier understanding.

More specifically, both the X-axis direction search reference block pointer ax and the Y-axis direction search reference block pointer ay assume a value "0" as their initial value. After incrementing ax by 1 each time and if the value of ax exceeds the range of possible value, then the value of ax is returned to "0" and ay is incremented by 1. The CPU 301 updates the search reference block coordinates by executing the above-described operation.

In step S507, the CPU 301 calculates matching coordinates of each of the near image NI and the far image FI for a block image positioned at the search reference block coordinates (BBC_X, BBC_Y).

An X-axis direction matching coordinate NMC_X within the near image NI, a Y-axis direction matching coordinate NMC_Y within the near image NI, an X-axis direction matching coordinate FMC_X within the far image FI, and a Y-axis direction matching coordinate FMC_Y within the far image FI can be calculated by the following expression (1.10):

$$NMC\_X = BBC\_X + mx \cdot NID$$

$$NMC\_Y = BBC\_Y + my \cdot NID$$

$$FMC\_X = BBC\_X + mx \cdot FID$$

$$FMCY = BBCY + my \cdot FID \quad (1.10).$$

An X-axis direction matching pointer mx assumes a value in the range of $-SS\_EXTEND_x \leq mx \leq SS\_EXTEND_x$. A Y-axis direction matching pointer my assumes a value in the range of $-SS\_EXTEND_y \leq my \leq SS\_EXTEND_y$. Furthermore, both mx and my assume an integer value.

The X-axis direction parallax vector $\Delta x$ and the Y-axis direction parallax vector $\Delta y$ are defined as expressed by the following expression (1.11). According to expression (1.11), the above-described distance variable dd can be defined as $dd = mx \cdot PSA/FID$.

$$\Delta x = \frac{mx \cdot NID \cdot PSA}{FID} \quad (1.11)$$

$$\Delta y = \frac{my \cdot NID \cdot PSA}{FID}.$$

In step S508, the CPU 301 acquires a block image, whose reference position is at matching coordinates (NMC_X, NMC_Y) from the near image NI. The matching coordinates (NMC_X, NMC_Y) are coordinates in relation to an enlarged near image ENI. The enlarged near image ENI is generated by enlarging the near image NI, which has the X-axis direction display resolution rsl_x and the Y-axis direction display resolution rsl_y, by FID/PSA times.

By executing the above-described operation, the enlarged near image ENI, which has the X-axis direction display resolution rsl_x·FID/PSA and the Y-axis direction display resolution rsl_y·FID/PSA, is acquired. As a result, a block image BKN, whose reference position is at coordinates ENI (NMC_X, NMC_Y) and which has an area $BS\_EXTEND_x \cdot BS\_EXTEND_y$, is generated.

For an image interpolation method for generating the enlarged near image ENI based on the near image NI, a nearest neighbor interpolation method, a bilinear method, a bicubic method, or any other image interpolation method can be used.

In a second exemplary embodiment of the present invention, which will be described in detail below, if the near image NI has already been enlarged by FID/PSA times, then in step S508, the CPU 301 processes the near image NI as the enlarged near image ENI.

In step S509, the CPU 301 acquires a block image whose reference position is set at matching coordinates (FMC_X, FMC_Y) from the far image FI. The matching coordinates (FMC_X, FMC_Y) are coordinates in relation to an enlarged far image EFI. The enlarged far image EFI is generated by enlarging the far image FI, which has the X-axis direction display resolution rsl_x and the Y-axis direction display resolution rsl_y, by FID/PSA times.

By executing the above-described operation, the enlarged far image EFI, which has the X-axis direction display resolution rsl_x·FID/PSA and the Y-axis direction display resolution rsl_y·FID/PSA, is acquired. As a result, a block image BKF, whose reference position is at coordinates EFI (FMC_X, FMC_Y) and which has an area $BS\_EXTEND_x \cdot BS\_EXTEND_y$, is generated.

For an image interpolation method for generating the enlarged far image EFI based on the far image FI, a nearest neighbor interpolation method, a bilinear method, a bicubic method, or any other image interpolation method can be used.

In the second exemplary embodiment of the present invention, which will be described in detail below, if the far image FI has already been enlarged by FID/PSA times, then in step S508, the CPU 301 processes the far image FI as the enlarged near image ENI.

In step S510, the CPU 301 executes matching on the block image BKN and the block image BKF. By executing the matching operation, the CPU 301 calculates a correlation coefficient expressed by the following expression (1.12) and a sum of absolute difference (SAD) value, which is expressed by the following expression (1.13). Instead of using the above-described method, a least square matching method can be used. The CPU 301 outputs matching coefficients calculated by the matching operation (the correlation coefficient and the SAD value).

$$R = \frac{\sum_{m=-M}^{M-1}\sum_{n=-N}^{N-1}\{(f(x_0+m, y_0+n) - \overline{f(x_0, y_0)}) \cdot (g(x_1+m, y+n) - \overline{g(x_1, y_1)})\}}{\sqrt{\sum_{m=-M}^{M-1}\sum_{n=-N}^{N-1}(f(x_0+m, y_0+n) - \overline{f(x_0, y_0)})^2} \sqrt{\sum_{m=-M}^{M-1}\sum_{n=-N}^{N-1}(g(x_1+m, y_1+n) - \overline{g(x_1, y_1)})^2}} \quad (1.12)$$

$$\overline{f(x_0, y_0)} = \frac{1}{MN} \cdot \sum_{m=-M}^{M-1}\sum_{n=-N}^{N-1} f(x_0+m, y_0+n)$$

$$\overline{g(x_0, y_0)} = \frac{1}{MN} \cdot \sum_{m=-M}^{M-1}\sum_{n=-N}^{N-1} f(x_1+m, y_1+n)$$

$M = BS\_EXTEND_x$, $N = BS\_EXTEND_y$ $x_0 = NMC\_X$ $y_0 = NMC\_Y$ $x_1 = FMC\_X$ $y_1 = FMC\_Y$ $f(x, y) = ENI(x, y)$ $g(x, y) = FNI(x, y)$

-continued $$SAD = \sum_{m=-M}^{M-1} \sum_{n=-N}^{N-1} |f(x_0+m, y_0+n) - g(x_1+m, y_1+n)| \quad (1.13)$$

$M = BS\_EXTEND_x \quad N = BS\_EXTEND_y$
$x_0 = NMC\_X \quad y_0 = NMC\_Y$
$x_1 = FMC\_X \quad y_1 = FMC\_Y$
$f(x, y) = ENI(x, y) \quad g(x, y) = FNI(x, y)$ In step S511, the CPU 301 compares the matching coefficients calculated in step S510 for each matching coordinate updated in step S507. If the correlation coefficient is used in the matching operation in step S510, the CPU 301 calculates the following comparison result. In calculating the Result, the CPU 301 uses a matching operation result $R_{pre}$, which is a result having the highest matching level (highest matching value) among the results of the previous matching operations and a result $R_{cur}$ of the current matching operation.

$$Result = \begin{cases} 1 & (R_{cur} \geq R_{pre}) \\ 0 & (R_{cur} < R_{pre}) \end{cases} \quad (1.14)$$

On the other hand, if the SAD value is used in the matching operation in step S510, the CPU 301 calculates the following comparison result. In calculating the Result, the CPU 301 uses a matching operation result $SAD_{pre}$, which is a result having the highest matching level (highest matching value) among the results of the previous matching operations and a result $SAD_{cur}$ of the current matching operation.

$$Result = \begin{cases} 1 & (SAD_{cur} \leq SAD_{pre}) \\ 0 & (SAD_{cur} > SAD_{pre}) \end{cases} \quad (1.15)$$

If Result=1, the matching level of the current matching operation result is higher than the highest matching level of the result of the previous matching operations. Accordingly, in this case, the CPU 301 determines that the parallax vector used in referring to the block image used in the current matching operation is a more correct parallax vector. Then, the processing advances to step S512.

On the other hand, if Result=0, the CPU 301 determines that the matching level that is the highest among the results of the previous matching operations is the more correct matching result. Accordingly, the CPU 301 discards the current matching operation result. After that, the processing advances to step S514.

In step S512, the CPU 301 stores the current matching operation result as expressed by the following expression (1.16) (if the correlation coefficient is used in the matching operation) or expression (1.17) (if the SAD value is used in the matching operation) to use the current matching operation result in comparing the matching coefficients in the processing in step S511 next time.

$$R_{pre} = R_{cur} \quad (1.16)$$

$$SAD_{pre} = SAD_{cur} \quad (1.17)$$

In step S513, in calculating the X-axis direction matching coordinate NMC_X and the Y-axis direction matching coordinate NMC_Y in the current matching operation, the CPU 301 stores the X-axis direction parallax vector Δx and the Y-axis direction parallax vector Δy, which are calculated at the same time by using expression (1.11). In addition, the CPU 301 discards the previous X-axis direction parallax vector Δx and the previous Y-axis direction parallax vector Δy, which have been stored by the previous matching operation.

In step S514, the CPU 301 determines whether all combinations of possible values of the X-axis direction matching pointer mx and the Y-axis direction matching pointer my have been examined. If it is determined that all such combinations have been examined (YES in step S514), then the processing advances to step S515 because the matching for the search reference block coordinates (BBC_X, BBC_Y) has been completed. On the other hand, if it is determined that not all the combinations have been examined (NO in step S514), then the processing returns to step S507.

In step S515, the CPU 301 stores, at a memory position of the parallax map PMAP (ax, ay), the X-axis direction parallax vector Δx and the Y-axis direction parallax vector Δy at the search reference block coordinates (BBC_X, BBC_Y). In step S516, the CPU 301 determines whether all combinations of possible values of the X-axis direction search reference block pointer ax and the Y-axis direction search reference block pointer ay have been examined.

If all the possible combinations (324×216=69,984 combinations in the present exemplary embodiment) have been examined (YES in step S516), then the processing advances to step S517 because the parallax map PMAP has been completely generated. On the other hand, if not all the possible combinations have been examined (NO in step S516), then the processing returns to step S506. In step S517, the processing in the sub flow chart 1 ends.

The processing in step S507 will be elaborated. In the present exemplary embodiment, the combination order of the X-axis direction matching pointer mx and the Y-axis direction matching pointer my is defined as a "scan scheme". The CPU 301 calculates the matching coordinates of each of the near image NI and the far image FI according to the combination order for combining mx and my defined by the scan scheme.

The scan scheme according to the present exemplary embodiment is generated according to the following rule.

Rule: if two X-axis direction matching pointers mx1 and mx2 having mutually different absolute values exist and if |mx1|>|mx2|, then mx2 is used in forming a combination in priority to mx1.

The reason for using the above-described scan scheme will be described in detail below with reference to FIGS. 6A and 6B. Both the object 204 illustrated in FIG. 6A and an object 601 illustrated in FIG. 6B are mapped to the mapping point 209 when viewed from the virtual left camera 207. In addition, when viewed from the virtual left camera 207, the object 204 exists at a location farther than the object 601.

A mapping point 602 is a mapping point of the object 601 corresponding to the left camera 201. A mapping point 603 is a mapping point of the object 601 corresponding to the right camera 202.

Figure 6A:
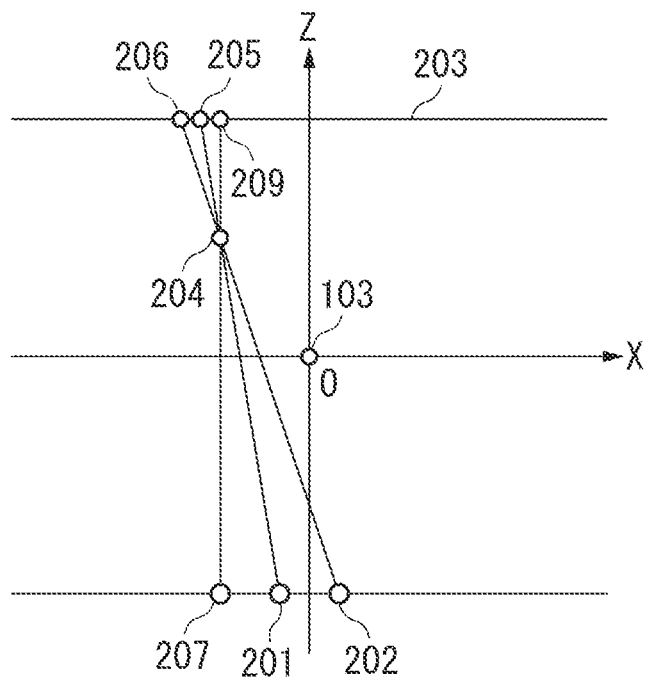
FIGS. 6A and 6B schematically illustrate an example of a content of processing executed in step S507 illustrated in FIG. 5.
Figure 6B:
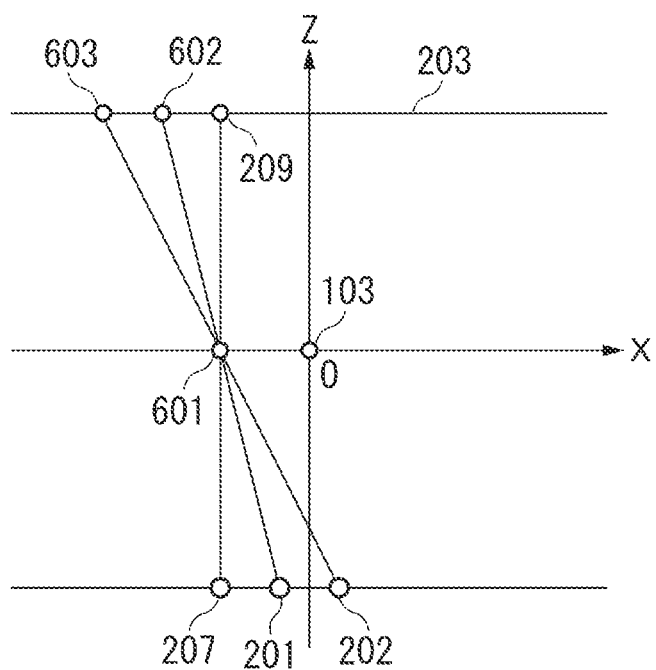

If |mx1|>|mx2|, when the distance between the mapping point 209 and the mapping point 205 illustrated in FIG. 6A is compared with the distance between the mapping point 209 and the mapping point 602 illustrated in FIG. 6B, the distance from the mapping point 209 to the mapping point 205 can be calculated by an expression NMC_X=BBC_X+mx2×NID. In addition, the distance from the mapping point 209 to the mapping point 602 can be designated by an expression NMC_X=BBC_X+mx1×NID.

It can be understood that the two objects 204 and 601, which exist on a ray extending from the mapping point 209 to the virtual left camera 207, exist at a distance nearer to the virtual left camera 207 when the distance from the mapping point 209 to the mapping point 602, which can be expressed by using mx1, is matched.

The near-distance object 601 and the far-distance object 204 cannot be recorded by the virtual left camera 207 at the same time. Accordingly, if the same matching result is acquired (if the matching coefficients are the same as each other), then the CPU 301 employs the result of matching the near-distance object 601 by using the X-axis direction matching pointer having the greater absolute value.

In step S405 (FIG. 4), the CPU 301 compensates for the parallax by inputting the parallax map PMAP (ax, ay) and the parallel view-binocular parallax image to generate images at the virtual left camera viewpoint PVL and the virtual right camera viewpoint PVR.

Now, an exemplary method for compensating for the parallax according to the present exemplary embodiment will be described in detail below with reference to FIG. 7.

Figure 7:
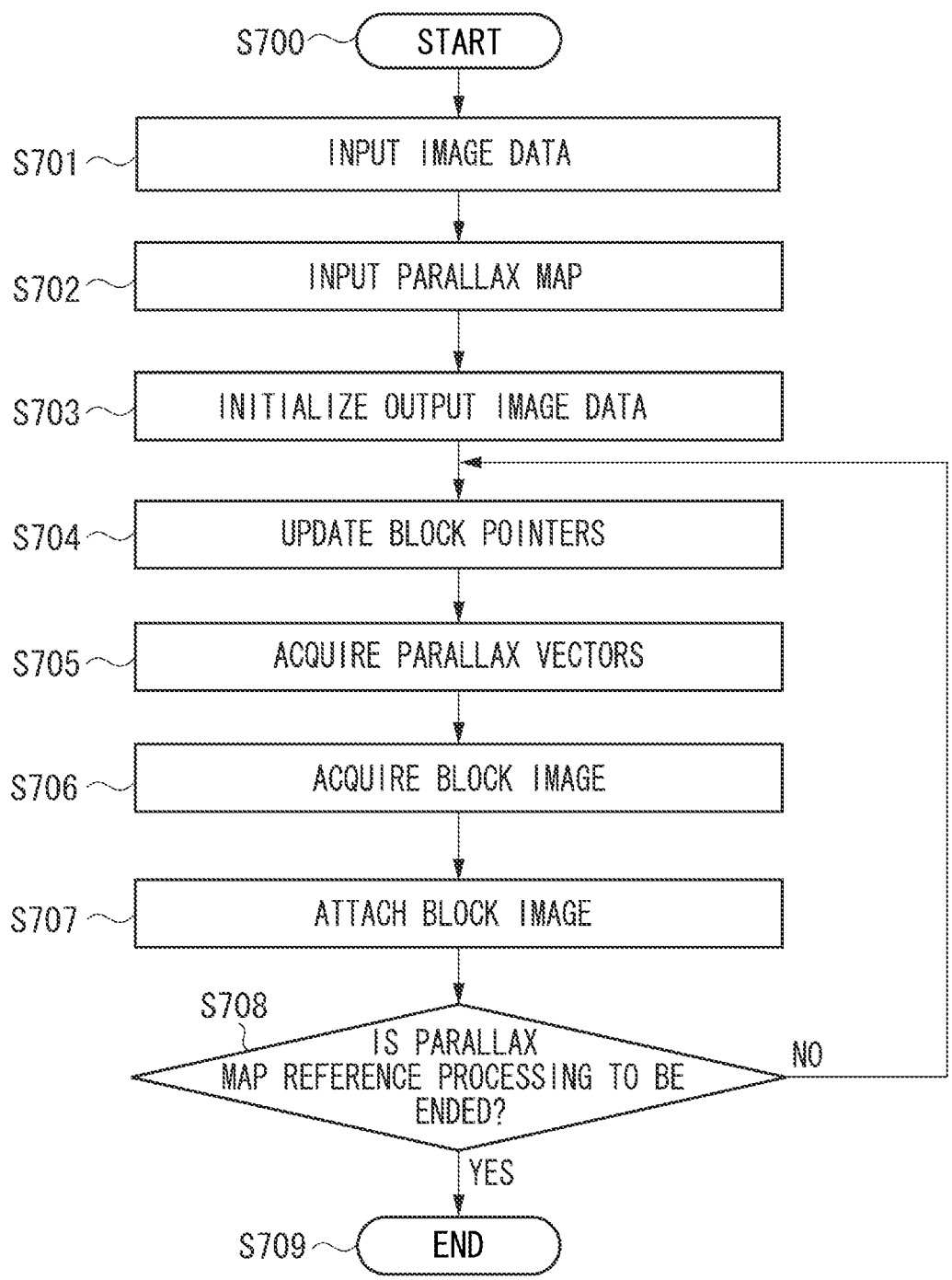
FIG. 7 is a flow chart illustrating an exemplary flow of parallax compensation processing, which is executed in step S405 illustrated in FIG. 4.

FIG. 7 is a flow chart illustrating an exemplary flow of the parallax compensation processing in step S405 illustrated in FIG. 4. In the following description, the flow chart of the parallax compensation processing is referred to as a sub flow chart 2.

For the parallel view-binocular parallax image input in the processing according to the sub flow chart 2, the near image NI ($x_{in}$, $y_{in}$) input in the processing according to the sub flow chart 1 or the enlarged near image ENI generated in step S508 is input.

The result of the processing according to the sub flow chart 2 does not differ regardless of which of the above-described images is to be input. Accordingly, the image that is compliant with the implementation of the software can be input.

In other words, if it is desired to reduce the amount of use of the memory, the near image NI ($x_{in}$, $y_{in}$) before the image is enlarged can be input because it is not effective to store the enlarged near image ENI during the processing. On the other hand, if it is desired to increase the processing speed, the enlarged near image ENI, which is acquired by enlarging the image, can be input because it is useful to enlarge the image only once.

In the following steps of the processing, the CPU 301 executes the processing by using an R image region only among image data having the field-sequential RGB format. Because the CPU 301 executes the same processing for a G image region and a B image region as the processing for the R image region, the processing for the G and B image regions will not be particularly described below.

In addition, in the present exemplary embodiment, the CPU 301 previously executes processing for correcting image degradation causes, such as distortion that may occur due to an aberration on the lens, the phenomenon of color break, a sensor noise that may occur on the image sensor, or an encoding noise for both types of image data where necessary, before executing a processing program 2 (the processing according to the sub flow chart 2). Accordingly, it is supposed that no matching failure may occur in the template matching due to the above-described image degradation cause.

If the image signal has been corrected by inverse gamma correction, the CPU 301 executes gamma correction before executing the processing program 2. In addition, by executing the inverse gamma correction on the image signal after executing the processing program 2, the CPU 301 executes control for restoring the gamma characteristic of the input image data.

Because the present exemplary embodiment executes the same inverse gamma correction and the same gamma correction as those described above with reference to the processing program 1, the description thereof will not be repeated here.

In the processing described below, similar to the processing in step S404, the CPU 301 generates a virtual left-viewpoint image virtually photographed by the virtual left camera 207.

Referring to FIG. 7, in step S700, the CPU 301 starts the processing according to the sub flow chart 2. In step S701, the CPU 301 inputs the near image NI ($x_{in}$, $y_{in}$) or the enlarged near image ENI. In step S702, the CPU 301 inputs the parallax map PMAP (ax, ay). In step S703, the CPU 301 generates and initializes a parallax correction image PPI ($x_{out}$, $y_{out}$), which is generated by the processing according to the sub flow chart 2. Both the X-axis direction coordinate pointer $x_{out}$ and the Y-axis direction coordinate pointer $y_{out}$ can assume a value "0" or a positive integer.

Let rsl_x and rsl_y be an X-axis direction display resolution and a Y-axis direction display resolution of the parallax correction image PPI ($x_{out}$, $y_{out}$), then $x_{out}$ and $y_{out}$ assume a value in the following range, respectively:

$0 \leq x_{out} < rsl\_x$ $0 \leq y_{out} < rsl\_y$.

In the present exemplary embodiment, since rsl_x=2,592 and rsl_y=1,728, then $0 \leq x_{out} < 2{,}592$ and $0 \leq y_{out} < 1{,}728$.

In step S704, the CPU 301 updates the X-axis direction search reference block pointer ax and the Y-axis direction search reference block pointer ay.

The X-axis direction search reference block pointer ax and the Y-axis direction search reference block pointer ay can be combined into any combination within the range of expression (1.7). The order of combining ax and ay can be arbitrarily determined. In the present exemplary embodiment, the following combination order is used in determining the combination of ax and ay for easier understanding.

More specifically, both the X-axis direction search reference block pointer ax and the Y-axis direction search reference block pointer ay assume a value "0" as their initial value. After incrementing ax by 1 each time and if the value of ax exceeds the range of possible value, then the value of ax is returned to "0" and ay is incremented by 1. The CPU 301 updates the search reference block coordinates by executing the above-described operation.

In step S705, by using a predetermined X-axis direction search reference block pointer $ax_m$ and a Y-axis direction search reference block pointer $ay_n$ as an input to the parallax map PMAP (ax, ay), the CPU 301 acquires a predetermined X-axis direction parallax vector $\Delta x_{m,n}$ and a predetermined Y-axis direction parallax vector $\Delta y_{m,n}$ by using expression (1.8).

In step S706, the CPU 301 acquires a block image to be attached by using the parallax vector. More specifically, at first, the CPU 301 calculates offsets mx·NID and my·NID from the search reference block coordinates (BBC_X, BBC_Y) based on the acquired $\Delta x_{m,n}$ and $\Delta y_{m,n}$ by using the following expression (1.18). The expression (1.18) is a modification of expression (1.11).

$$mx \cdot NID = \frac{\Delta x \cdot FID}{PSA} \quad (1.18)$$

$$my \cdot NID = \frac{\Delta y \cdot FID}{PSA}.$$

In addition, by using the calculated offsets mx·NID and my·NID, the CPU 301 calculates reference coordinate values NMC_X and NMC_Y of the block image to be attached, by executing the calculation using expression (1.10).

In inputting the near image NI ($x_{in}$, $y_{in}$) and the far image FI ($x_{in}$, $y_{in}$) in step S701, the CPU 301 generates the enlarged near image ENI having the X-axis direction display resolution rsl_x·FID/PSA and the Y-axis direction display resolution rsl_y·FID/PSA. As a result, a block image BKN, whose reference position is at coordinates ENI (NMC_X, NMC_Y) and which has an area BS_EXTEND$_x$ or BS_EXTEND$_y$, is generated.

On the other hand, if the enlarged near image ENI and the enlarged far image EFI are input in step S701, the block image BKN, whose reference position is at coordinates ENI (NMC_X, NMC_Y) and which has an area BS_EXTEND$_x$·BS_EXTEND$_y$, can be generated because the enlarged near image ENI has been already generated.

In step S707, the CPU 301 attaches the acquired block image BKN to the parallax correction image PPI ($x_{out}$, $y_{out}$).

Because the block image BKN is generated based on the enlarged near image ENI, it is necessary to return the display resolution of the block image BKN to the display resolution of the near image NI, which is the image yet to be enlarged.

The block image BKN is reduced by PSA·SR times in the X-axis direction and by PSA/FID times in the Y-axis direction. After that, the CPU 301 attaches the block image BKN, which has been reduced in the above-described manner, at a position of attachment at coordinates (CBC_x, CBC_y) within the parallax correction image PPI ($x_{out}$, $y_{out}$), which can be calculated by the following expression (1.19):

$$CBC\_x = \frac{BBC\_x \cdot PSA}{FID} = ax \cdot BS\_BASIC_x \qquad (1.19)$$
$$CBC\_y = \frac{BBC\_y \cdot PSA}{FID} = ay \cdot BS\_BASIC_y.$$

In the second exemplary embodiment, which will be described in detail below, if the near image NI and the far image FI have been enlarged by FID/PSA times, then the CPU 301 does not execute image reduction in step S707 but attaches the reduced block image BKN at a position of attachment at coordinates (CBC_x, CBC_y), which can be calculated by the following expression (1.20):

$$CBC\_x = BBC\_x$$

$$CBCy = BBCy \qquad (1.20).$$

In step S708, the CPU 301 determines whether all combinations of possible values of the X-axis direction search reference block pointer ax and the Y-axis direction search reference block pointer ay have been examined. If it is determined that all such combinations (i.e., 324×216=69,984 combinations in the present exemplary embodiment) have been examined (YES in step S708), then the processing advances to step S709 because the parallax correction image PPI ($x_{out}$, $y_{out}$) has been completely generated. On the other hand, if it is determined that not all the combinations have been examined (NO in step S708), then the processing returns to step S704.

In step S709, the processing according to the sub flow chart 2 ends. In step S406, the processing by the processing program 1 ends.

As described above, in the parallax readjustment processing according to the present exemplary embodiment, the CPU 301 generates the virtual left camera image and the virtual right camera image based on the left camera image and the right camera image. Accordingly, the present exemplary embodiment can readjust the parallax of the left camera image and the right camera image.

In addition, in the present exemplary embodiment, the parallax map generated by parallax vector detection is used in compensating for the parallax. Accordingly, a non-reference region of an image to be compensated for parallax, which may arise according to a conventional parallax compensation method, may not arise. As a result, the present exemplary embodiment can improve the image quality.

If the parallax magnification PM=1, then the near image distance NID=1 as a result of the calculation using expression (1.3). In this case, both the X-axis direction parallax vector Δx and the Y-axis direction parallax vector Δy assume a value "0" as a result of the calculation using expression (1.11).

Furthermore, the offsets mx·NID and my·NID calculated by expression (1.18) become 0. As a result, the parallax correction image PPI ($x_{out}$, $y_{out}$) becomes equivalent to the near image NI ($x_{in}$, $y_{in}$). Accordingly, the CPU 301 can output the near image NI ($x_{in}$, $y_{in}$) as the parallax correction image PPI ($x_{out}$, $y_{out}$) instead of executing the processing in steps S404 and S405.

In the present exemplary embodiment, it is not required to acquire the parallel view-binocular parallax image used in the above-described processing by using two or more cameras. In other words, alternatively, an image can be reconstituted based on an image photographed by one camera whose field and focus are arbitrarily set.

Even if the above-described one camera only is used, the parallel view-binocular parallax image can be generated based on image data recorded by using one recording element only. Accordingly, in the present exemplary embodiment, the parallel view-binocular parallax image generated by using the above-described one camera can be used.

With the above-described configuration, in the present exemplary embodiment, the parallax magnification PM can assume an actual numerical value in the range of 0≤PM<∞. Accordingly, by executing the parallax readjustment processing on the images photographed from different two viewpoints, the present exemplary embodiment can generate an image viewed from the virtual viewpoint that is outside camera photographing positions, which cannot be implemented by the above-described conventional method.

In a second exemplary embodiment of the present invention, a parallax of an intersecting view-binocular parallax image, which is a binocular parallax image photographed by an intersecting view method, is readjusted by multiplication by PM times by using the parallax magnification PM. In the present exemplary embodiment, the description of configurations similar to the configuration of the above-described first exemplary embodiment will not be repeated.

Figure 8A:
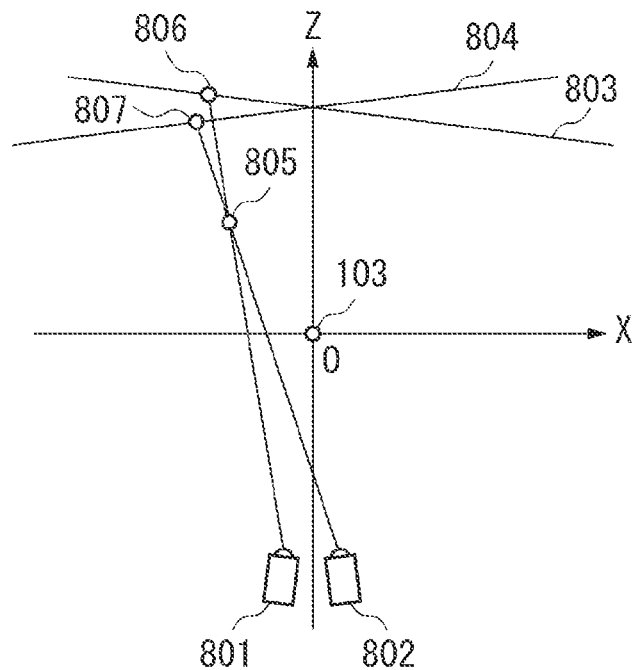
FIGS. 8A and 8B illustrate an example of an XZ plane when viewed from the negative direction towards the positive direction in the direction of the Y-axis according to a second exemplary embodiment of the present invention.

An intersecting view-binocular parallax image will be described in detail below with reference to FIG. 8A. FIG. 8A schematically illustrates the XZ plane 102 when viewed from a negative direction towards a positive direction in the direction of the Y-axis in the three-dimensional space illustrated in FIG. 1.

Referring to FIG. 8A, a left camera 801 photographs a left eye-viewpoint image of a binocular parallax image. A right camera 802 photographs a right eye-viewpoint image of the binocular parallax image.

A left camera infinite-distance XY plane 803 corresponds to an image plane of an image sensor of the left camera 801. A right camera infinite-distance XY plane 804 corresponds to an image plane of an image sensor plane of the right camera 802. The left camera 801 and the right camera 802 photograph an image of an object 805, respectively.

A mapping point 806 is a mapping point of the object 805, whose image is photographed by the left camera 801, on the left camera infinite-distance XY plane 803. A mapping point 807 is a mapping point of the object 805, whose image is photographed by the right camera 802, on the right camera infinite-distance XY plane 804.

In the intersecting view-binocular parallax image, a relationship between a left camera viewpoint PL and a right camera viewpoint PR can be calculated by the following expression (2.1). In expression (2.1), "d" denotes an inter-camera-viewpoint-fixation-point distance, which will be described in detail below. "$\theta_p$" denotes an inter-viewpoint half value inclination angle. $\theta_p$ can assume a value in the range of $0 \leq \theta_p < \pi/2$.

The intersecting view-binocular parallax image photographed by the intersecting view method is a binocular parallax image generated when the difference between the viewpoint PL of the left camera 801 configured to photograph the left eye-viewpoint image and the viewpoint PR of the right camera 802 configured to photograph the right eye-viewpoint image, i.e., a baseline distance "a", is expressed by an expression $a = 2d \cdot \sin(\theta_p) = |x_L - x_R|$ and when the difference $\Delta\theta_y$ of a Y-axis direction rotation angle is expressed by an expression $\Delta\theta_y = 2\theta_p = |\theta_{yL} - \theta_{yR}|$.

$$x_L = -\frac{a}{2} = d \cdot \sin(\theta_p) \quad y_L = 0 \quad z_L = d \cdot \cos(\theta_p) \qquad (2.1)$$
$$\theta_{xL} = 0 \quad \theta_{yL} = \frac{\pi}{2} - \theta_p \quad \theta_{zL} = \pi$$
$$x_R = \frac{a}{2} = -d \cdot \sin(\theta_p) \quad y_R = 0 \quad z_R = d \cdot \cos(\theta_p)$$
$$\theta_{xR} = 0 \quad \theta_{yR} = \frac{\pi}{2} + \theta_p \quad \theta_{zR} = \pi.$$

Figure 8B:
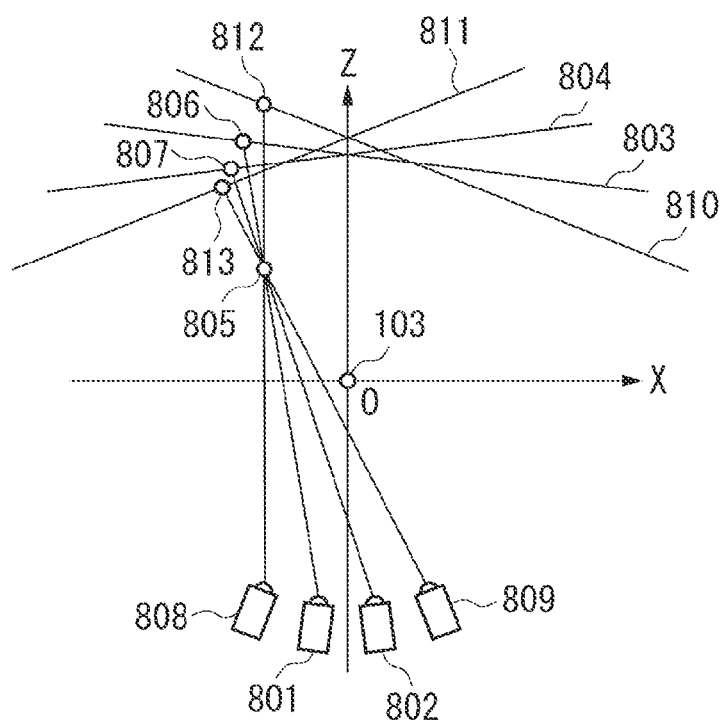

The parallax readjusted by multiplication by PM times will be defined with reference to FIG. 8B.

Referring to FIG. 8B, a virtual left camera 808 photographs a left eye-viewpoint image of binocular parallax images having a readjusted parallax. A virtual right camera 809 photographs a right eye-viewpoint image of the binocular parallax images having the readjusted parallax.

A virtual left camera infinite-distance XY plane 810 corresponds to an image plane of an image sensor of the virtual left camera 808. A virtual right camera infinite-distance XY plane 811 corresponds to an image plane of an image sensor of the virtual right camera 809.

A mapping point 812 is a mapping point of the object 805, whose image is photographed by the virtual left camera 808, on the virtual left camera infinite-distance XY plane 810. A mapping point 813 is a mapping point of the object 805, whose image is photographed by the virtual right camera 809, on the virtual right camera infinite-distance XY plane 811.

In the intersecting view-binocular parallax image, the virtual left camera viewpoint PVL and the virtual right camera viewpoint PVR have a relationship that can be calculated by the following expression (2.2). To paraphrase this, readjustment of the parallax multiplied by PM times refers to generation of an image having the virtual left camera viewpoint PVL and the virtual right camera viewpoint PVR, which are calculated by multiplication, by PM times, of the inter-viewpoint half value inclination angle $\theta_p$ set to the left camera viewpoint PL and the right camera viewpoint PR, and which is positioned at a position corresponding to $\sin(PM \cdot \theta_p)/\sin(\theta_p)$ times of the baseline distance a between the left camera viewpoint PL and the right camera viewpoint PR and whose Y-axis rotation angle difference $\Delta\theta_y$ can be calculated by an expression $\Delta\theta_y = 2PM \cdot \theta_p = |\theta_{yVL} - \theta_{yVR}|$.

$$x_{VL} = d \cdot \sin(PM \cdot \theta_p) \quad y_{VL} = 0 \quad z_{VL} = d \cdot \cos(PM \cdot \theta_p) \qquad (2.2)$$
$$\theta_{xVL} = 0 \quad \theta_{yVL} = \frac{\pi}{2} - PM \cdot \theta_p \quad \theta_{zVL} = \pi$$
$$x_{VR} = -d \cdot \sin(PM \cdot \theta_p) \quad y_{VR} = 0 \quad z_{VR} = d \cdot \cos(PM \cdot \theta_p)$$
$$\theta_{xVR} = 0 \quad \theta_{yVR} = \frac{\pi}{2} + PM \cdot \theta_p \quad \theta_{zVR} = \pi.$$

In the present exemplary embodiment, it is supposed that a=1 (cm). However, in the present exemplary embodiment, the baseline length a is not limited to a specific length. In addition, in the present exemplary embodiment, it is supposed that the inter-viewpoint half value inclination angle $\theta_p = \pi/180$ (rad). However, in the present exemplary embodiment, the value of the inter-viewpoint half value inclination angle $\theta_p$ is not limited to a specific value.

The parallax magnification PM can assume any actual numerical value within the range of $0 \leq PM < \infty$. If the parallax magnification PM=0, then the baseline distance $|x_{VL} - x_{VR}|$ between the viewpoint PVL and the viewpoint PVR becomes 0. Therefore, the parallax becomes 0. Therefore, the Y-axis rotation angle difference $\Delta\theta_y = 0$. As a result, the parallax becomes 0.

On the other hand, if the parallax magnification PM assumes a value in the range of $0 < PM < 1$, then $|x_{VL} - x_{VR}| < a$. Accordingly, $\Delta\theta_y < 2\theta_p$. Therefore, the parallax becomes smaller than the binocular parallax image.

In addition, if the parallax magnification PM=1, then $|x_{VL} - x_{VR}| = a$. Therefore, $\Delta\theta_y = 2\theta_p$. As a result, the parallax becomes equivalent to an input binocular parallax image. Moreover, if the parallax magnification PM is in the range of $1 < PM < \infty$, then $|x_{VL} - x_{VR}| > a$. Therefore, $\Delta\theta_y > 2\theta_p$. As a result, the parallax becomes large than the input binocular parallax image.

The intersecting view-binocular parallax image is different from the parallel view-binocular parallax image in the following point. More specifically, the left camera infinite-distance XY plane 803 and the right camera infinite-distance XY plane 804 have an inclination matching $|\theta_{yL} - \theta_{yR}|$, which is set to a distance between viewpoints of the left camera 801 and the right camera 802. Accordingly, a difference between the mapping point 806 and the mapping point 807 in the Z-axis direction arises.

In addition, the left camera infinite-distance XY plane 803 and the virtual left camera infinite-distance XY plane 810 are inclined by an angle of $|(PM-1)\theta_p|$ according to the parallax readjusted by multiplication by PM times. Accordingly, a difference between the mapping point 806 and the mapping point 812 in the Z-axis direction arises.

In the processing according to the first exemplary embodiment, the parallax is detected by using a two-dimensional image defined on the XY plane and the detected parallax is compensated for. Therefore, the first exemplary embodiment can neither detect nor compensate for the difference in the Z-axis direction.

In this regard, the processing for readjusting the parallax of an intersecting view-binocular parallax image is more difficult than the processing for readjusting the parallax of a parallel view-binocular parallax image.

Figure 9:
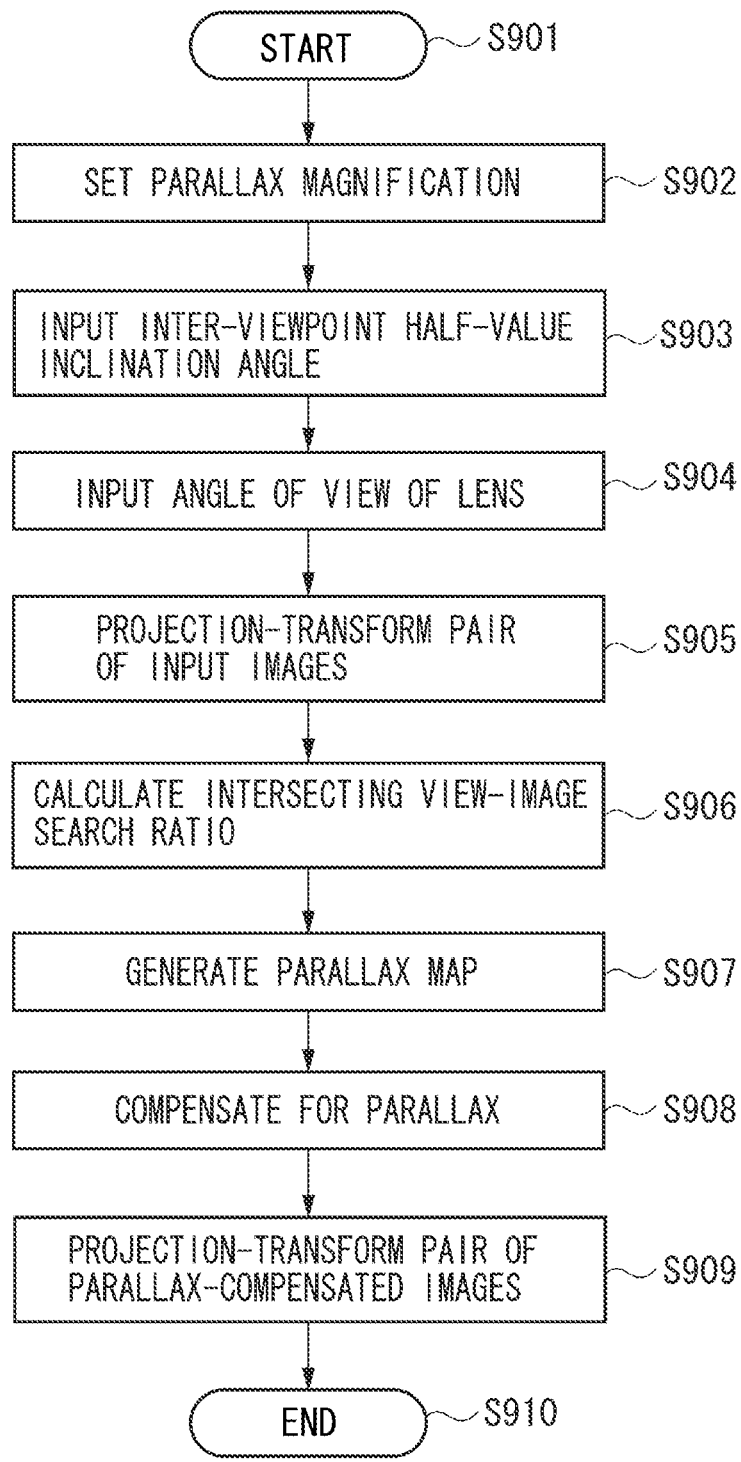
FIG. 9 is a flow chart illustrating an exemplary flow of a parallax readjustment program according to the second exemplary embodiment of the present invention.

FIG. 9 is a flow chart illustrating an exemplary flow of a parallax readjustment program (hereinafter referred to as a "processing program 2") of the present exemplary embodiment, which is executed by the CPU 301. The processing program 2 of the processing according to the flow chart of FIG. 9 is normally recorded on the external storage device 307. In executing the processing program 2, the processing program 2 is read and executed by the CPU 301 from the external storage device 307 on the RAM 303.

Referring to FIG. 9, in step S901, the CPU 301 starts the processing program 2. In step S902, the CPU 301 sets the parallax magnification PM. In the present exemplary embodiment, PM=3. In addition, if the parallax set to both pieces of image data to be input is normal, the parallax magnification PM is set at a value with which the parallax can be readjusted to three times the normal level.

In step S903, the CPU 301 inputs the inter-viewpoint half value inclination angle $\theta_P$. In step S904, the CPU 301 inputs the angle of view $\theta_{Len}$. The angle of view $\theta_{Len}$ is the angle of view of the imaging lens used by the left camera 801 and the right camera 802 during shooting. In the present exemplary embodiment, it is supposed that the angle of view $\theta_{Len}=\pi/2$ (rad), which is an angle of view of a lens classified as a wide angle lens, is input.

In addition, for easier understanding, it is supposed that the angle of view $\theta_{Len\_Left}$ of the left camera 801 and the angle of view $\theta_{Len\_Right}$ of the right camera 802 have the same value. In the following description, the angles of view $\theta_{Len\_Left}$ and $\theta_{Len\_Right}$ are collectively referred to as an angle of view $\theta_{Len}$.

In addition, the angle of view may vary according to the zoom magnification used during imaging. Furthermore, the angle of view may vary according to the magnitude of an entrance pupil diameter, which is changed by setting the aperture value. In the present exemplary embodiment, the angle of view $\theta_{Len}$ set considering the entrance pupil diameter, which may vary according to the zoom magnification and the aperture value, is used.

In step S905, the CPU 301 executes projection transform. More specifically, in step S905, the CPU 301 projection-transforms the left camera infinite-distance XY plane 803 and the left camera infinite-distance XY plane 804 on the common infinite-distance XY plane.

An exemplary method for projection-transforming the left camera infinite-distance XY plane 803 and the right camera infinite-distance XY plane 804 on the common infinite-distance XY plane will be described in detail below with reference to FIGS. 10A and 10B.

Figure 10A:
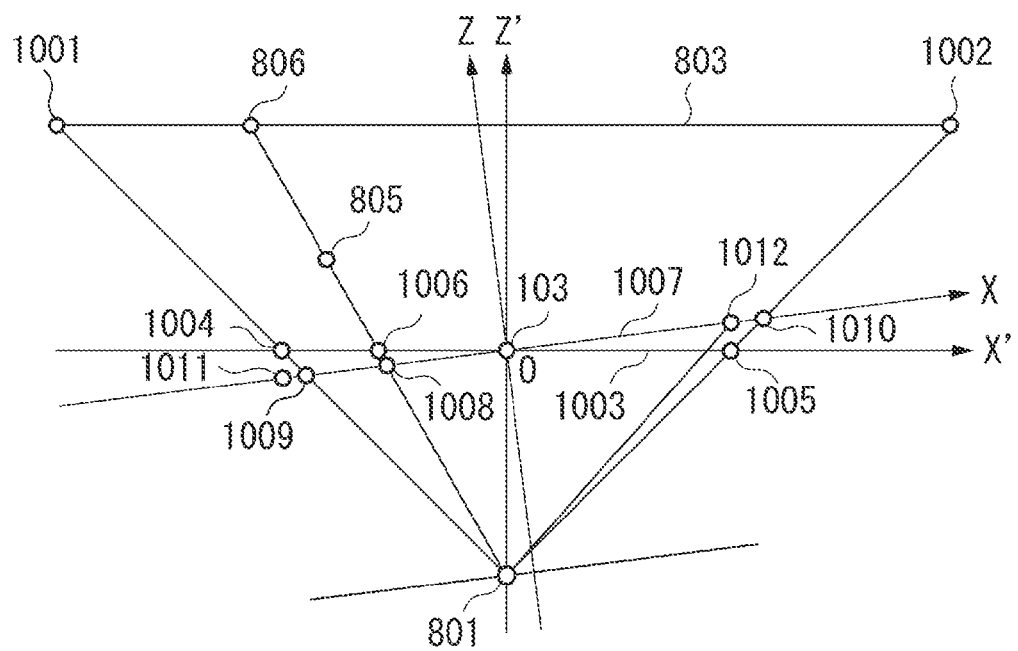
FIGS. 10A and 10B schematically illustrate an example of a projection transform method according to the second exemplary embodiment of the present invention.

FIG. 10A schematically illustrates the left camera viewpoint 801 and the left camera infinite-distance XY plane 803, which are expressed in an X'Z' coordinate system that is newly defined below. The X'Z' coordinate system includes the origin O 103, which is the same as that of the XZ coordinate system. In addition, the Y-axis rotation angle of the X'Z' coordinate system is inclined from that of the XZ coordinate system by the inter-viewpoint half value inclination angle $\theta_P$.

In the X'Z' coordinate system, the Z-axis is expressed by an expression $z'=-x'/\tan(\theta_P)$. The X-axis is expressed by the following expression (2.3).

$$z'=\tan(\theta_P)\cdot x' \quad (2.3)$$

Referring to FIG. 10A, the origin 103 is an origin in the XYZ three-dimensional space. The XYZ three-dimensional space includes the left camera viewpoint 801, the left camera infinite-distance XY plane 803, the object 805, and the mapping point 806, which is a mapping point of the object 805 on the left camera infinite-distance XY plane 803. In addition, the left camera infinite-distance XY plane 803 includes a left end point 1001 and a right end point 1002. A left camera finite near XY plane 1003 is parallel to the left camera infinite-distance XY plane 803 and exists at a position including the origin O 103. The left camera finite near XY plane 1003 includes a left endpoint 1004 and a right endpoint 1005. A mapping point 1006 is a mapping point of the object 805 on the left camera finite near XY plane 1003.

A left camera finite near projection-transform XY plane 1007 is parallel to the X-axis and exists at a position including the origin O 103. A mapping point 1008 is a mapping point on the left camera finite near projection-transform XY plane 1007. The left camera finite near projection-transform XY plane 1007 includes a left end point 1009 and a right end point 1010. A left end point 1011 is a left end point of an output image on the left camera finite near projection-transform XY plane 1007. A right end point 1012 is a right end point of the output image on the left camera finite near projection-transform XY plane 1007.

The left camera infinite-distance XY plane 803 corresponds to the image plane of the image sensor. Accordingly, the length of a line segment formed by the left end point 1001 and the right end point 1002 is equivalent to the length of the left camera image in the X-axis direction. The left camera finite near XY plane 1003 is parallel to the left camera infinite-distance XY plane 803.

In addition, a triangle E, which is formed by the left camera viewpoint 801, the left end point 1001, and the right end point 1002, is similar to a triangle F, which is formed by the left camera viewpoint 801, the left end point 1004, and the right end point 1005. The similarity ratio E:F=∞:d. The left camera finite near XY plane 1003 corresponds to the image plane of the image sensor.

Suppose that the length of the left camera image in the X-axis direction is 2w (pixel). In this case, the length of a line segment formed by the left end point 1004 and the right end point 1005 also is 2w.

Let "O" (0,0) be the origin 103, "W" (w,0) be the left end point 1004, "$W_0$" ($x_{in}$, $y_{in}$, $z_{in}$) be the mapping point 1006, "D" 8 (0, d) be the left camera viewpoint 801, and "Q" ($x_{out}$, $y_{out}$, $z_{out}$) be the mapping point 1008. In addition, $x_{in}$ assumes a value in the range of $-1 \le x_{in} \le 1$, and $y_{in}$ assumes a value in the range of $-1 \le y_{in} \le 1$. An angle formed by the left end point 1001, the left end point 1004, and the origin O 103 is defined as $\theta_L$. $\theta_L$ can be calculated by the following expression (2.4):

$$\theta_L = \frac{\pi}{2} + \frac{\theta_{Len}}{2}. \quad (2.4)$$

An equation of a line segment formed by W (w,0) and D (0, d) can be expressed by the following expression (2.5):

$$z'=\tan(\theta_L)\cdot x'+d \quad (2.5).$$

An angle formed by the object 805, the mapping point 1006, and the origin O 103 is defined as "$\theta_O$". An equation of a line segment formed by $W_0$ ($x_{in}$, $y_{in}$, $z_{in}$) and D (0, d) can be expressed by the following expression (2.6):

$$z'=\tan(\theta_O)\cdot x'+d \quad (2.6).$$

If $z'=z_{in}=0$, then d and $\theta_O$ can be calculated by the following expression (2.7), which is based on expressions (2.5) and (2.6):

$$d = -w \cdot \tan(\theta_L) = -x_{in} \cdot \tan(\theta_o) \quad (2.7)$$

$$\tan(\theta_o) = \frac{w}{x_{in}} \cdot \tan(\theta_L).$$

The following expression (2.8) can be derived by substituting expression (2.6) with expression (2.7):

$$z' = \frac{w}{x_{in}} \cdot \tan(\theta_L) \cdot x' - w \cdot \tan(\theta_L). \quad (2.8)$$

The same equation as expression (2.3) can be used as an equation for a line segment formed by the left end point 1009 and the origin 103.

If x'=$x_{out}$, then expressions (2.3) and (2.8) intersect at Q ($x_{out}$, $y_{out}$, $z_{out}$). Furthermore, $x_{out}$ can be calculated by the following expression (2.9):

$$x_{out} = \frac{w \cdot \tan(\theta_L) \cdot x_{in}}{w \cdot \tan(\theta_L) - \tan(\theta_p) \cdot x_{in}}. \quad (2.9)$$

Figure 10B:
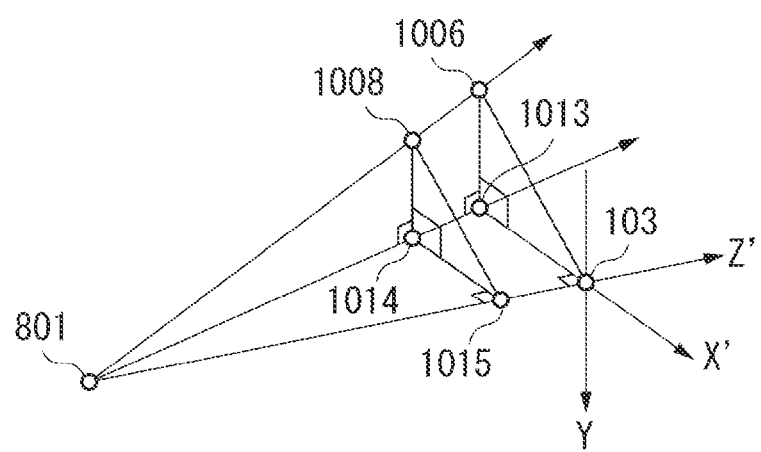

FIG. 10B schematically illustrates the three-dimensional space 101 by using an X' Y' Z' orthogonal coordinate system newly defined. Referring to FIG. 10B, The X' Y' Z' orthogonal coordinate system includes the origin O 103, which is the same as that of the XYZ orthogonal coordinate system. In addition, the Y-axis rotation angle of the X' Y' Z' orthogonal coordinate system is inclined from that of the XYZ orthogonal coordinate system by the inter-viewpoint half value inclination angle $\theta_P$.

A point 1013 has an X' coordinate value and a Z' coordinate value that are the same as those of the mapping point 1006 and has a Y coordinate value of 0. A point 1014 has an X' coordinate value and a Z' coordinate value that are the same as those of the mapping point 1008 Q (x', y', z') and has a Y coordinate value of 0. A point 1015 has a Z' coordinate value that is the same as that of the mapping point 1008 Q (x', y') and has an X' coordinate value and a Y coordinate value of 0.

A ratio between the length of a line segment E formed between the left camera viewpoint 801 and the mapping point 1006 and the length of a line segment F formed between the left camera viewpoint 801 and the mapping point 1008 is equal to a ratio between the length of a line segment formed between the left camera viewpoint 801 and the origin O 103 and the length of a line segment formed between the left camera viewpoint 801 and the point 1015.

In addition, a ratio between the length of a line segment formed between the left camera viewpoint 801 and the origin O 103 and the length of a line segment formed between the left camera viewpoint 801 and the point 1015 is equal to a ratio of the length of a line segment formed between the origin O 103 and the point 1013 and the length of a line segment formed between the point 1015 and the point 1014.

Let $y_{in}$ be a y coordinate value of the mapping point 1006 and $y_{out}$ be a y coordinate value of the mapping point 1008. Then, $y_{in}$ and $y_{out}$ have a relationship expressed by the following expression (2.10). More specifically, by using expression (2.10) $y_{out}$ can be expressed by using $y_{in}$ and $x_{in}$.

$$y_{in} : y_{out} = z_{in} : z_{out} = x_{in} : x_{out} = 1 : \frac{w \cdot \tan(\theta_L)}{w \cdot \tan(\theta_L) - \tan(\theta_p) \cdot x_{in}} \quad (2.10)$$

By a calculation using expressions (2.4), (2.9), and (2.10), the mapping point 1008 Q ($x_{out}$, $y_{out}$) can be expressed by using a left camera image X-axis direction-length 2w, the angle of view $\theta_{Len}$, the inter-viewpoint half value inclination angle $\theta_P$, xin, and yin. Q ($z_{out}$) also can be expressed by using yin and xin. However, Q ($z_{out}$) will not be described in detail because Q ($z_{out}$) is not to be used in subsequent processing.

$$x_{out} = A(x_{in}) \cdot x_{in} \quad (2.11)$$
$$y_{out} = A(x_{in}) \cdot y_{in}$$

$$A(x_{in}) = \frac{w \cdot \tan(\theta_L)}{w \cdot \tan(\theta_L) - \tan(\theta_p) \cdot x_{in}}$$
$$= \frac{w \cdot \cos(\theta_{Len}/2)}{w \cdot \cos(\theta_{Len}/2) + \sin(\theta_{Len}/2)\tan(\theta_p) \cdot x_{in}}$$

For the right camera (not illustrated), in calculating the right camera finite near projection-transform XY plane based on the right camera infinite-distance XY plane 804, the inter-viewpoint half value inclination angle $\theta_P$ used in expression (2.3) can be replaced with $-\theta_P$. In other words, by inputting the left camera image coordinate value $W_0$ ($x_{in}$, $y_{in}$) according to three constants used in expression (2.11), i.e., the angle of view $\theta_{Len}$, (set in consideration of the entrance pupil diameter, which is determined according to the zoom magnification and F-number), the inter-viewpoint half value inclination angle $\theta_P$, and the input image X-axis direction-length 2w. As a result, a projection transform coordinate value Q ($x_{out}$, $y_{out}$) for the projection transform on a projection plane whose z=0 can be acquired.

The left camera finite near projection-transform XY plane 1007 and a right camera finite near projection-transform XY plane (not illustrated) have a Z-axis direction-difference Δz (Δz≈0) and form a common infinite-distance XY plane.

On the common infinite-distance XY plane having Δz (≈0), no positional deviation in the Z-axis direction may occur on an intersecting view-binocular parallax image pair. Accordingly, the present exemplary embodiment can accurately detect the parallax vector by the template matching between the two-dimensional images.

FIG. 11 illustrates coordinates acquired by executing the above-described projection transform. Referring to FIG. 11, both the left camera 801 and the right camera 802 are inclined from a CG chart by the inter-viewpoint half value inclination angle $\theta_P$. Accordingly, images photographed by the left camera 801 and the right camera 802 are distorted in the X-axis direction and in the Y-axis direction at each pixel position. Non-distorted images can be generated by executing the projection-transform on the above-described distorted images.

On the non-distorted images, deviation of the object recorded according to the distance of the object in the Z-axis direction occurs in the X-axis direction only. In the present exemplary embodiment, the intersecting view-binocular parallax image pair is projection-transformed before the template matching due to the above-described causes.

Figure 12:
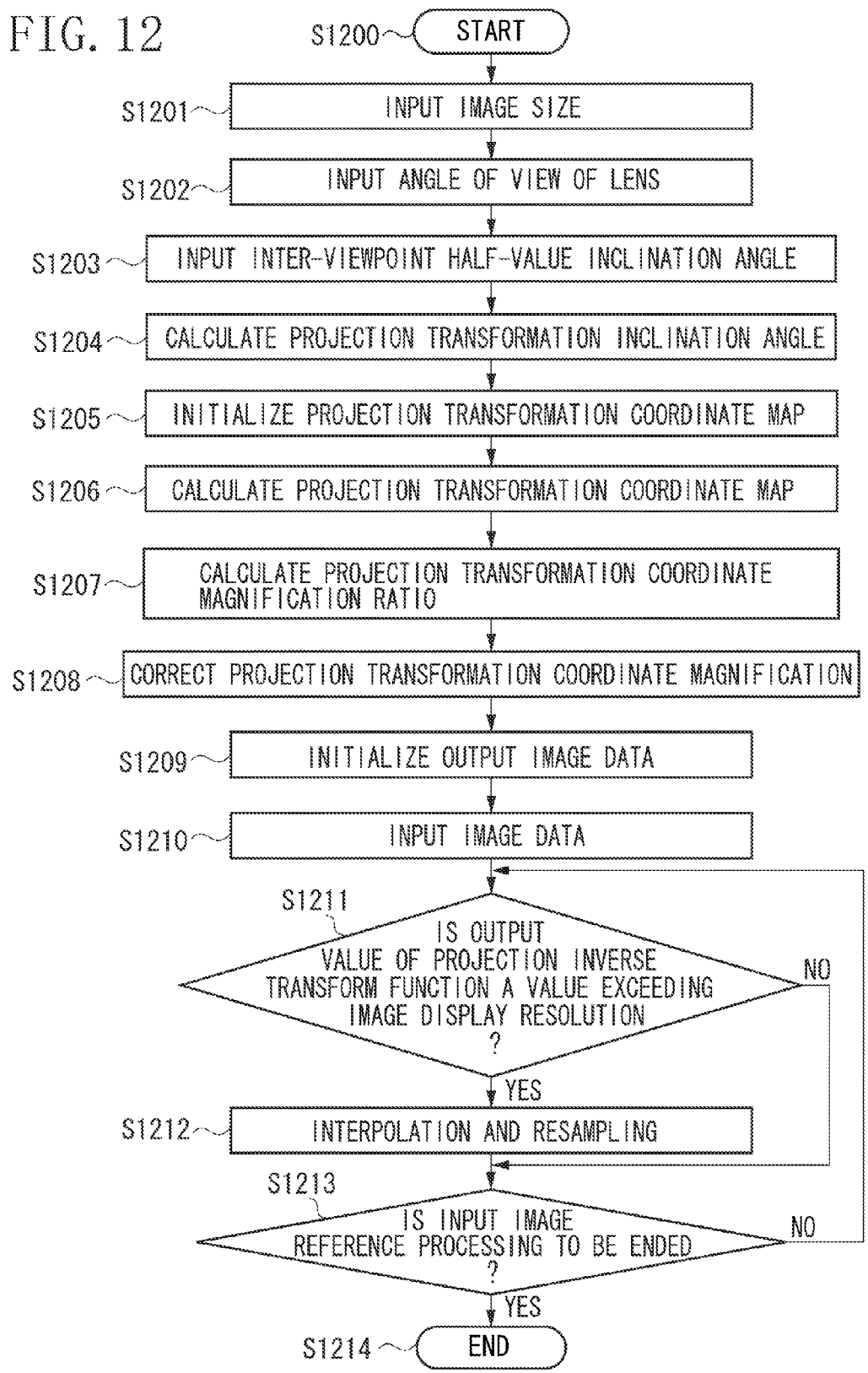
FIG. 12 is a flow chart illustrating an exemplary flow of projection transform processing, which is executed in step S905 in FIG. 9.

An exemplary method for executing the projection transform in step S905 (FIG. 9) will be described in detail below with reference to FIG. 12. FIG. 12 is a flow chart illustrating an exemplary flow of the projection transform processing, which is executed in step S905 illustrated in FIG. 9. In the following description, the flow chart of the projection transform processing will be referred to as a "sub flow chart 3".

In the processing according to the sub flow chart 3, it is supposed that the display resolutions, bit accuracy levels of pixels, color spaces, color formats, and the angles of view $\theta_{Len}$ of the lens used in shooting are the same for the intersecting view-binocular parallax images to be input.

In addition, in the present exemplary embodiment, it is supposed that image data of each of the intersecting view-binocular parallax images to be input having the following attributes has been recorded.

Display resolution: 2,592×1,728 (pixel²)
Color space: RGB

Color format: RGB (field sequential)
Bit accuracy of the pixel: 8 (bit)
Angle of view: $\theta_{Len}=\pi/2$ (rad)

In the following steps of the processing, the CPU 301 executes the processing by using an R image region only among image data having the field-sequential RGB format. Because the CPU 301 executes the same processing for a G image region and a B image region as the processing for the R image region, the processing for the G and B image regions will not be particularly described below.

In addition, for the following steps of the processing, projection transform on the left camera image only will be described in detail and projection transform on the right camera image will not be particularly described because the projection transform on the left camera image and the projection transform on the right camera image differ from each other only in the sign (positive or negative) of the inter-viewpoint half value inclination angle $\theta_P$.

Referring to FIG. 12, in step S1200, the CPU 301 starts the sub flow chart 3. In step S1201, the CPU 301 inputs an X-axis direction image size and a Y-axis direction image size. In the present exemplary embodiment, the X-axis direction image size=2,592 and the Y-axis direction image size=1,728.

In step S1202, the CPU 301 inputs the angle of view $\theta_{Len}$. In step S1203, the CPU 301 inputs the inter-viewpoint half value inclination angle $\theta_P$. In step S1204, the CPU 301 calculates a projection transform inclination angle $\theta_{PP}$.

In the projection transform in step S905 (FIG. 9), the CPU 301 calculates the projection transform inclination angle $\theta_{PP}$ by using the following expression (2.12).

$$\theta_{PP}=(-\theta_P+\phi) \quad (2.12)$$

where "$\phi$" denotes a projection transform correction angle. In the present exemplary embodiment, it is supposed that $\phi=0$.

In step S1205, the CPU 301 generates a projection forward transform coordinate forward reference map ProjMap I (x, y) and a projection transform coordinate inverse reference map ProjMap I (x,y) on the memory. In step S1206, the CPU 301 calculates a projection transform coordinates map.

More specifically, the CPU 301 examines all possible combinations of an X-coordinate value and a Y-coordinate value of each pixel constituting the input image. In addition, the CPU 301 calculates coordinate values after the projection transform by using expression (2.11).

In expression (2.11), the x coordinate and the y coordinate are scaled as $-1 \le x_{in} \le 1$ and $-1 \le y_{in} \le 1$, respectively. Accordingly, the CPU 301 rescales the x coordinate and the y coordinate according to the display resolution of the input image. In the following expression (2.13), "Resl_x" denotes an X-axis direction display resolution of the input image and "Resl_y" denotes a Y-axis direction display resolution of the input image. By executing the rescaling using expression (2.13), coordinate values $(xr_{out}, yr_{out})$ of a rescaled output image are calculated.

$$xr_{out} = \frac{Resl\_x}{2} \cdot x_{out} \quad (2.13)$$
$$yr_{out} = \frac{Resl\_y}{2} \cdot y_{out}$$

Let values "$(x_{in}, y_{in})$" be the coordinate values before the projection transform and values $(x_{out}, y_{out})$ be coordinate values after the projection transform. By executing the following expression (2.14), the coordinate values $(xr_{out}, yr_{out})$ can be calculated by using the coordinate values $(x_{in}, y_{in})$. The CPU 301 maps the calculated coordinate values $(xr_{out}, yr_{out})$ with the coordinate values $(x_{in}, y_{in})$ and stores the resulting values.

$$(xr_{out}, yr_{out})=ProjMapF(x_{in}, y_{in}) \quad (2.14)$$

A projection forward transform coordinate forward reference map ProjMap F (x,y) is a map for inputting the input coordinate values $(x_{in}, y_{in})$ and outputting the output coordinate values $(xr_{out}, yr_{out})$.

The output coordinates $(xr_{out}, yr_{out})$ in expression (2.13) have decimals. Therefore, an inter-output pixel-distance does not become an interval expressed by an integer. As a result, non-reference output coordinate values may arise.

Accordingly, the present exemplary embodiment generates a projection transform coordinate inverse reference map ProjMap I (x,y), to which output coordinates $(x_{out}, y_{out})$ are input and which outputs input coordinate values $(x_{in}, y_{in})$ to prevent the non-reference output coordinate values from arising.

In generating the projection transform coordinate inverse reference map ProjMap I (x,y), an inverse projection-transform function, which is expressed by the following expression (2.15), can be calculated by executing an operation on the coordinates $(x_{in}, y_{in})$ by using expression (2.11):

$$x_{in} = B(x_{out}) \cdot x_{out} \quad (2.15)$$
$$y_{in} = B(x_{out}) \cdot y_{out}$$
$$B(x_{in}) = \frac{w \cdot \tan(\theta_L)}{w \cdot \tan(\theta_L) - \tan(\theta_p) \cdot x_{out}}$$
$$= \frac{w \cdot \cos(\theta_{Len}/2)}{w \cdot \cos(\theta_{Len}/2) - \sin(\theta_{Len}/2)\tan(\theta_p) \cdot x_{out}}.$$

In expression (2.15), the coordinates $(x_{out}, y_{out})$ can assume values in the ranges of $-1 \le x_{out} \le 1$ and $-1 \le y_{out}$. Accordingly, by executing rescaling according to the display resolution of the input image, rescaled coordinate values $(xr_{in}, yr_{in})$ of the input image can be calculated by using the following expression (2.16):

$$xr=Resl\_x \cdot x_{in}$$
$$yr=Resl y \cdot y_{in} \quad (2.16).$$

The CPU 301 executes mapping of the coordinate values $(xr_{in}, yr_{in})$, which are calculated by using the inverse projection-transform function, with the coordinates $(x_{out}, y_{out})$ and stores the resulting values.

$$(xr_{in}, yr_{in})=ProjMapI(x_{out}, y_{out}) \quad (2.17)$$

The constant terms included in expressions (2.11) and (2.15), such as "$\tan(\theta_L)$", "$w \cdot \tan(\theta_L)$", and "$\tan(\theta_P)$" can be calculated before executing the processing in step S1206. However, alternatively, the above-described constant terms can be previously stored on the memory and can be loaded where necessary.

If the size of the image to be input is restricted, the projection forward transform coordinate forward reference map ProjMap F(x,y) and the projection transform coordinate inverse reference map ProjMap I(x,y) can be previously calculated and stored on the memory and can be loaded where necessary.

In step S1207, the CPU 301 calculates a projection transform coordinate magnification ratio ex_mag. In the projection transform according to the present exemplary embodiment, as is apparent from expressions (2.11) and (2.15), the inter-pixel distance of the output image is longer than the inter-pixel distance of the input image in one region while in another region, the inter-pixel distance of the output image is shorter than the inter-pixel distance of the input image.

The CPU 301 executes image enlargement processing on the region having the longer inter-pixel distance by executing the projection transform. On the other hand, the CPU 301 executes image reduction processing on the region having the shorter inter-pixel distance by executing pixel interpolation processing and resampling processing.

In the region in which the image reduction is executed, a spatial frequency characteristic is lost in relation to a corresponding region of the input image. In order to prevent this, the CPU 301 calculates a ratio of short inter-pixel distance in the region in which the inter-pixel distance becomes shortest. Furthermore, the CPU 301 multiplies the projection transform coordinate values with the calculated ratio of short inter-pixel distance. Accordingly, the CPU 301 can execute the image enlargement processing on all image regions after the projection transform. By executing the above-described processing, the present exemplary embodiment stores the spatial frequency characteristic of the input image.

The projection transform in step S1207 is executed not for outputting a parallax readjustment image but to detect the parallax vector with a high accuracy. Accordingly, it is not necessary to store the display resolution of the image. In other words, if the display resolution of the image is to be returned to its original level later, the display resolution of the output image may not vary after the image is enlarged.

In the following expression (2.18), "red" denotes a reduction ratio, which is a ratio of decrease of the inter-pixel distance, and "max_red" denotes a maximum reduction ratio, which is a ratio with which the inter-pixel distance becomes the shortest. The reduction ratio red assumes all combinations of the x coordinate value and the y coordinate value of a pixel constituting the input image. Accordingly, the CPU 301 can calculate a reduction ratio map red (x,y).

Furthermore, in expression (2.18), "$x_m$" and "$y_n$" denote the x coordinate value and the y coordinate value of the input image, respectively. In addition, a ratio between the distances between adjacent pixels across the projection transform red $(x_m, y_n)$ can be calculated by the following expression (2.18):

$$\text{red }(x_m) = \left| \frac{x_{out,m-1} - x_{out,m+1}}{x_{in,m-1} - x_{in,m+1}} \right| \quad (2.18)$$

$$\text{red }(y_n) = \left| \frac{y_{out,n-1} - y_{out,n+1}}{y_{in,n-1} - y_{in,n+1}} \right|.$$

The maximum reduction ratio max_red is a minimum value of the reduction ratio red in the reduction ratio map red (x, y), which is calculated by using expression (2.18). The CPU 301 outputs an inverse of the maximum reduction ratio max_red as the projection transform coordinate magnification ratio ex_mag. More specifically, max_red≤1 and 1<ex_mag.

Because ex_mag assumes a decimal, ex_mag can be replaced with an integer greater than the calculated ex_mag. In addition, as described above in the first exemplary embodiment of the present invention, the CPU 301 enlarges the image by multiplication by FID/PSA times in the parallax map generation processing. Accordingly, in the projection transform executed thereon, the value FID/PSA can be set as the maximum reduction ratio ex_mag.

If the size of the image to be input is restricted, coordinate values after the transform can be calculated by using expression (2.11) and ex_mag can be calculated before the projection transform. Accordingly, the calculated ex_mag can be stored on the memory and can be loaded where necessary.

In step S1208, the CPU 301 executes magnification correction on the projection forward transform coordinate forward reference map ProjMap F (x,y) and the projection transform coordinate inverse reference map ProjMap I (x,y) by using the projection transform coordinate magnification ratio ex_mag. More specifically, the CPU 301 calculates magnification correction output coordinate values ($xre_{out}$, $yre_{out}$) and magnification correction input coordinate values ($xre_{in}$, $yre_{in}$) based on the output coordinate values ($xr_{out}$, $yr_{out}$) and the input coordinate values ($xr_{in}$, $yr_{in}$) by using the following expression (2.19):

$$xre_{out} = ex\_mag \cdot xr_{out}$$

$$yre_{out} = ex\_mag \cdot yr_{out}$$

$$xre_{in} = ex\_mag \cdot xr_{in}$$

$$yre_{in} = ex\_mag \cdot yr_{in} \quad (2.19).$$

In step S1209, the CPU 301 generates and initializes a data region of the output image that has been projection-transformed. More specifically, the CPU 301 generates the region by multiplying the data region of the input image by ex_mag times in both the X-axis direction and the Y-axis direction.

In step S1210, the CPU 301 inputs the left camera image. In step S1211, the CPU 301 compares the display resolution of the image and the coordinate values ($x_{out}$, $y_{out}$) after the projection transform to determine an edge.

As illustrated in FIG. 10A, the coordinate values ($x_{out}$, $y_{out}$) includes a region that cannot be projection-transformed, such as a line segment formed between the left end point 1011 of the output image on the left camera finite near projection-transform XY plane 1007 and the left endpoint 1009 of the left camera finite near projection-transform XY plane 1007, because no corresponding pixel is included before the projection transform.

The CPU 301 identifies the above-described region by using an inverse projection-transform function. If an output value of the inverse projection-transform function is a value exceeding the display resolution of the image (NO in step S1211), the CPU 301 determines that the projection transform cannot be executed and the processing advances to step S1213. On the other hand, if it is determined that the output value of the inverse projection-transform function is within the display resolution (YES in step S1211), the CPU 301 determines that the projection transform can be executed and the processing advances to step S1212.

In step S1212, the CPU 301 generates pixel values of the coordinate values after projection transform ($xre_{out}$, $yre_{out}$) by using output values ($xr_{in}$, $yr_{in}$) of the inverse projection-transform function.

Figure 13:
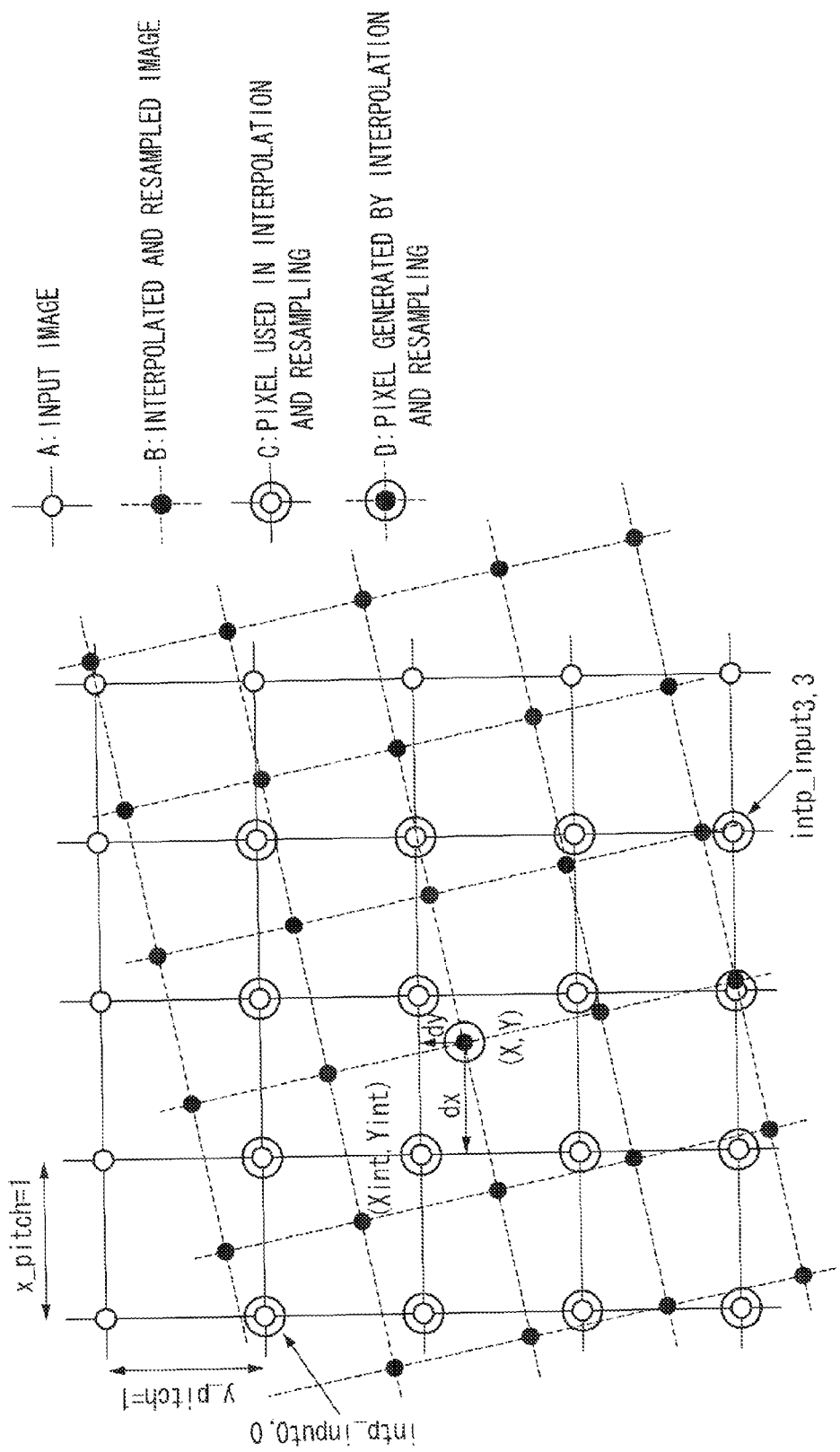
FIG. 13 schematically illustrates an example of correspondence among input/output pixels processed by bicubic interpolation processing according to the second exemplary embodiment of the present invention.

As illustrated in FIG. 13, the output values ($xr_{in}$, $yr_{in}$) assume decimals for the coordinates of the position at which the pixels that have been projection-transformed are arranged at integer-value intervals.

If the nearest neighbor interpolation method is used in the interpolation, xrin and yrin are converted into integer values having the nearest absolute values. Furthermore, the CPU 301 applies the values of the pixels positioned at the coordinates ($xr_{in}$, $yr_{in}$), which have been converted into the integer value whose absolute values are nearest, to the coordinate values ($xr_{out}$, $yr_{out}$).

Any method other than the nearest neighbor interpolation method, such as the bilinear method or the bicubic method, can be used in the interpolation. In the example illustrated in FIG. 13, an exemplary method for selecting the input pixel by using the bicubic interpolation method is illustrated.

Referring to FIG. 13, the CPU 301 can acquire the corresponding values ($xr_{in}$, $yr_{in}$) of a decimal accuracy for output coordinate values D. The CPU 301 identifies the input pixels of the coordinate values ($xr_{in}$, $yr_{in}$) illustrated in FIG. 13 by converting the values ($xr_{in}$, $yr_{in}$) into integer values whose absolute values are the nearest.

The CPU 301 selects sixteen near points C by using the identified input pixels to acquire the input pixels used for the interpolation on the pixel D by the bicubic interpolation method.

The CPU 301 enlarges the image by interpolating the image based on the generated pixel corresponding to the coordinate values ($xr_{out}$, $yr_{out}$) by using expression (2.19). In enlarging the image in the above-described manner, the above-described pixel interpolation method can be applied.

In step S1213, the CPU 301 determines whether all combinations of possible values of the input x-coordinate value and the input y-coordinate value have been examined. If it is determined that all such combinations, i.e., 2,592×1,728=4,478,976 combinations, has been examined (YES in step S1213), then the processing advances to step S1214 because the projection transform processing has been completed. On the other hand, if it is determined that any combination not examined yet still remains (NO in step S1213), then the processing returns to step S1211. In step S1214, the processing according to the sub flow chart 3 ends.

In step S906 (FIG. 9), the CPU 301 calculates an image search ratio SR. The image search ratio SR is a ratio of the near image distance NID to the far image distance FID.

An exemplary method for calculating the near image distance NID and the far image distance FID according to the present exemplary embodiment will be described in detail below with reference to FIG. 14.

Figure 14:
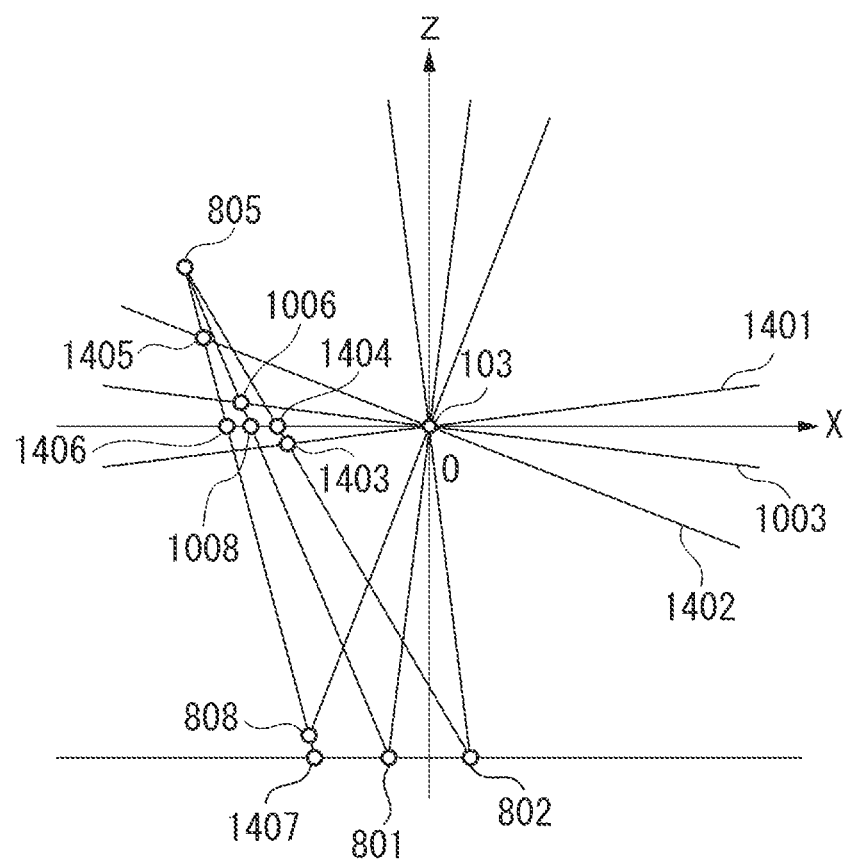
FIG. 14 schematically illustrates an example of a method for calculating a near image distance and a far image distance according to the second exemplary embodiment of the present invention.

Referring to FIG. 14, an XYZ three-dimensional space includes a right camera finite near XY plane 1401 and a virtual left camera finite near XY plane 1402. A mapping point 1403 is a mapping point of the object 805 on the right camera finite near XY plane 1401. A mapping point 1404 is a mapping point of the object 805 when viewed from a right camera-viewpoint on a common finite near XY plane. The common finite near XY plane is equivalent to the left camera finite near projection-transform XY plane 1007 and a right camera finite near projection-transform XY plane (not illustrated).

A mapping point 1405 is a mapping point of the object 805 on the virtual left camera finite near XY plane 1402. A mapping point 1406 is a mapping point of the object 805 when viewed from a virtual left camera viewpoint on the common finite near XY plane. In addition, a left camera viewpoint correction position 1407 and a right camera viewpoint correction position 1408 are included in the XYZ three-dimensional space.

On the common finite near XY plane, when an image of the object 805 photographed from the left camera viewpoint 801 is mapped to the mapping point 1008 and an image of the object 805 photographed from the right camera viewpoint 802 is mapped to the mapping point 1404, an image of the object 805 from the virtual left camera viewpoint 808 is mapped to the mapping point 1406.

Accordingly, in the parallax map generation processing, if the search reference position is set at the mapping point 1406, the image search ratio SR is set to satisfy the following equation:

Near image distance NID:far image distance FID=|mapping point 1406−mapping point 1008|:|mapping point 1406−mapping point 1404|.

Accordingly, the CPU 301 can detect the parallax vector by using the mapping point 1406 as the reference.

The CPU 301 calculates the ratio between the near image distance NID and the far image distance FID by using coordinates of the location of each camera.

In calculating the image search ratio SR for the intersecting view-binocular parallax image, it should be noted that the virtual left camera viewpoint 808 positionally deviates from the left camera viewpoint 801 and the right camera viewpoint 802 in the Z-axis direction. Accordingly, the left camera viewpoint correction position 1407 is set at a position on a straight line passing through the mapping point 1406 and the virtual left camera viewpoint 808 at which the left camera viewpoint correction position 1407 has coordinate values equal to the Z-axis direction coordinate values of the left camera viewpoint 801.

By using the following relationship, the CPU 301 calculates the near image distance NID, the far image distance FID, and the image search ratio SR:

The near image distance NID:the far image distance FID=|the mapping point 1406−the mapping point 1008|:|the mapping point 1406−the mapping point 1404|=|the left camera viewpoint correction position 1407−the left camera viewpoint 801|:|the left camera viewpoint correction position 1407−the right camera viewpoint 802|.

Suppose that the mapping point 1406 is the mapping point $W_0(xr_{in}, 0)$. A function of a straight line passing through $W_0$ ($xr_{in}$, 0) and PVL ($x_{VL}$, $z_{VL}$) can be expressed by the following expression (2.20) by using the definition defined by expressions (2.1) and (2.2):

$$z = \frac{d \cdot \cos(PM \cdot \theta_p)}{d \cdot \sin(PM \cdot \theta_p) - xr_{in}}(x - xr_{in}). \qquad (2.20)$$

If the left camera viewpoint correction position 1407 is positioned at PVL ($x_{PVLP}$ $z_{PVLP}$ the left camera viewpoint correction position 1407 exists on the function of the straight line expressed by expression (2.20). If $z_{PVLP}=Z_L=Z_R=d\cdot\cos(\theta_P)$ $x_{PVLP}$ can be expressed by the following expression (2.21):

$$x_{PVLP} = \frac{d \cdot \sin(PM \cdot \theta_p) \cdot \cos(\theta_p) + xr_{in}\{\cos(PM \cdot \theta_p) - \cos(\theta_p)\}}{\cos(PM \cdot \theta_p)}. \qquad (2.21)$$

By using $\theta_L=\pi/2+\theta_{Len}/2$, which is calculated by using expression (2.4), $d=-w/\tan(\theta_L)$, which is calculated by using expression (2.7), and $x_{PVLP}$ which is calculated by using expression (2.21), the ratio between the near image distance NID and the far image distance FID can be calculated by using the following expression (2.22):

$$\frac{NID}{FID} = \frac{x_{PVLP} - x_L}{x_{PVLP} - x_R} \qquad (2.22)$$
$$= \frac{w \cdot \tan(\theta_L) \cdot \sin\{(PM-1)\theta_p\} + xr_{in}\{\cos(PM \cdot \theta_p) - \cos(\theta_p)\}}{w \cdot \tan(\theta_L) \cdot \sin\{(PM+1)\theta_p\} + xr_{in}\{\cos(PM \cdot \theta_p) - \cos(\theta_p)\}}$$

-continued $$= \frac{xr_{in}\{\cos(PM\cdot\theta_p)-\cos(\theta_p)\}-w\cdot\frac{\cos(\theta_{Len})}{\sin(\theta_{Len})}\cdot\sin\{(PM-1)\theta_p\}}{xr_{in}\{\cos(PM\cdot\theta_p)-\cos(\theta_p)\}-w\cdot\frac{\cos(\theta_{Len})}{\sin(\theta_{Len})}\cdot\sin\{(PM+1)\theta_p\}}.$$

As is apparent from expression (2.22), the image search ratio SR depends on the search reference position (the mapping point 1406) $xr_{in}$ in the parallax vector detection on the intersecting view-binocular parallax image. Accordingly, the CPU 301 generates and uses a search ratio map SRMAP(x) in calculating the image search ratio SR of all x-coordinate values.

The constant terms included in expression (2.22), such as "$\tan(\theta_L)$", and "$\cos(\theta_P)$" can be calculated before executing the processing in step S906. However, alternatively, the above-described constant terms can be previously stored on the memory and can be loaded where necessary.

In addition, if the size of the image to be input, the inter-viewpoint half value inclination angle $\theta_P$, and the parallax magnification PM are limited, the search ratio map SRMAP(x) can be previously calculated. Accordingly, the size of the image to be input, the inter-viewpoint half value inclination angle $\theta_P$, and the parallax magnification PM can be previously stored on the memory and can be loaded where necessary.

In addition, the image search ratio SR, which is calculated by using expression (2.22), is equivalent to a correction magnification used in calculating the position of the pixel to be compensated for based on the parallax vector by using a conventional parallax compensation method.

In the conventional parallax vector detection, if the mapping point 1008 and the mapping point 1404 match each other, then coordinate values of the object 805, which is an intersection between a function of a straight line passing through the left camera viewpoint 801 and the mapping point 1008 and a straight line passing through the right camera viewpoint 802 and the mapping point 1404, are calculated. Furthermore, in the conventional parallax vector detection, the mapping point 1406 can be calculated by using the function of a storage location passing through the object 805 and the virtual left camera viewpoint 808. The calculation of the coordinate values of the mapping point 1406 in the conventional parallax vector detection is equivalent to the calculation of the image search ratio SR according to the present exemplary embodiment.

In the conventional parallax vector detection, when the calculated coordinate values of the mapping point 1406 are mapped, an order of multiplication of the number of blocks, which is the unit of the search, and the number of the searches executed in the unit of a block is required. On the other hand, the search ratio map SRMAP(x) can be acquired in the number corresponding to the number of blocks. In the present exemplary embodiment, the number of searches executed in the unit of a block is 24. Accordingly, the area of the map can be reduced to ¹⁄₂₄.

Similar the first exemplary embodiment, the CPU 301 adjusts and controls the value of the ratio between the values of the near image distance NID and the far image distance FID by a simple integer. This is because the image data has been discretized. It is not necessary to alter the values in an environment in which the image data can be processed as continuous data.

In step S907, the CPU 301 executes the parallax vector detection and generates a parallax map by using the left-eye viewpoint image and right-eye viewpoint image that have been projection-transformed on the common infinite-distance XY plane in step S905. More specifically, the CPU 301 determines a parallax vector corresponding to the search reference block coordinates by using the block image included in the projection-transformed near image NI existing at a position corresponding to the search reference block coordinates and at the near image distance NID and the block image included in the projection-transformed far image FI existing at a position corresponding to the search reference block coordinates and at the far image distance FID.

The processing in step S907 according to the present exemplary embodiment is similar to that described above in the first exemplary embodiment. Accordingly, the detailed description thereof will not be repeated here.

In step S908, the CPU 301 inputs the parallax map PMAP (ax, ay) and the projection-transformed intersecting view-binocular parallax image. In addition, the CPU 301 executes the parallax compensation. Furthermore, the CPU 301 generates a compensated image for virtual left camera-viewpoint PVL and a compensated image for virtual right camera-viewpoint PVR. The processing in step S908 according to the present exemplary embodiment is similar to that described above in the first exemplary embodiment. Accordingly, the detailed description thereof will not be repeated here.

In step S909, the CPU 301 projection-transforms the compensated image for the virtual left camera viewpoint PVL and generates a virtual left camera-viewpoint PVL image.

Now, the function of the processing in step S909 in a processing pipeline according to the present exemplary embodiment will be described in detail below with reference to FIG. 15.

Figure 15:
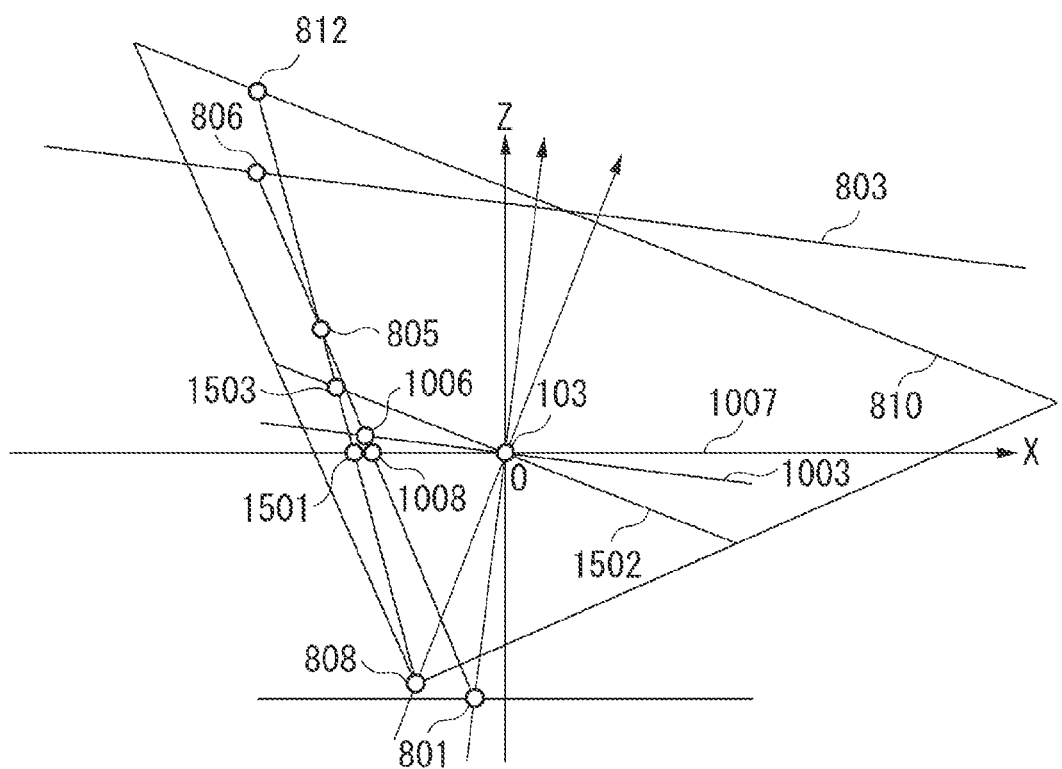
FIG. 15 schematically illustrates an exemplary flow of processing according to the second exemplary embodiment of the present invention.

Referring to FIG. 15, the XYZ three-dimensional space includes a parallax-compensated mapping point 1501, which is a mapping point acquired by compensating for the parallax of the mapping point 1008. The parallax-compensated mapping point 1501 exists on the left camera finite near projection-transform XY plane 1007 (i.e., a common finite near XY plane equivalent to a right camera finite near projection-transform XY plane (not illustrated)). In addition, an XY plane 1502 is a virtual left camera finite near projection-transform XY plane. A parallax-compensated mapping point 1503 exists on the virtual left camera finite near projection-transform XY plane 1502.

The left camera 801 is inclined by an inter-viewpoint half value inclination angle $\theta_P$. The object 805 is mapped to the mapping point 806 on the left camera infinite-distance XY plane 803. The object 805 is mapped to the mapping point 1006 on the left camera finite near XY plane 1003.

On the left camera finite near projection-transform XY plane 1007, which is generated by the projection-transform in step S905, the mapping point 1006 is mapped to the mapping point 1008. On the left camera finite near projection-transform XY plane 1007, the mapping point 1008 is subjected to matching at the search reference position of the parallax-compensated mapping point 1501 by executing the parallax vector detection.

The mapping point 1008 is compensated for to the parallax-compensated mapping point 1501 by the parallax compensation using the parallax vector calculated by the matching.

Furthermore, the CPU 301 generates a mapping plane of the virtual left camera finite near projection-transform XY plane 1502 by projection-transforming the left camera finite near projection-transform XY plane 1007 so that the left camera finite near projection-transform XY plane 1007 is inclined in the opposite direction by PM times of the inter-viewpoint half value inclination angle $\theta_P$. By executing the above-described processing, the parallax-compensated mapping point 1501 is mapped to the parallax-compensated mapping point 1503.

Because the virtual left camera finite near projection-transform XY plane 1502 is a mapping plane corresponding to the virtual left camera infinite-distance XY plane 810, the parallax compensation mapping point 1503 can be mapped to a mapping point 812.

Processing in step S909 is equivalent to projection transform for generating the left camera finite near projection-transform XY plane 1007 based on the virtual left camera finite near projection-transform XY plane 1502. More specifically, in step S909, the CPU 301 projection-transforms the parallax-compensated image pair by causing the same to incline by −PM times of the inter-viewpoint half value inclination angle $\theta_P$.

An exemplary method for executing the projection transform in step S909 will be described in detail below with reference to the flow chart of FIG. 16. In the following description, the flow chart of the projection transform processing will be simply referred to as a "sub flow chart 4".

Figure 16:
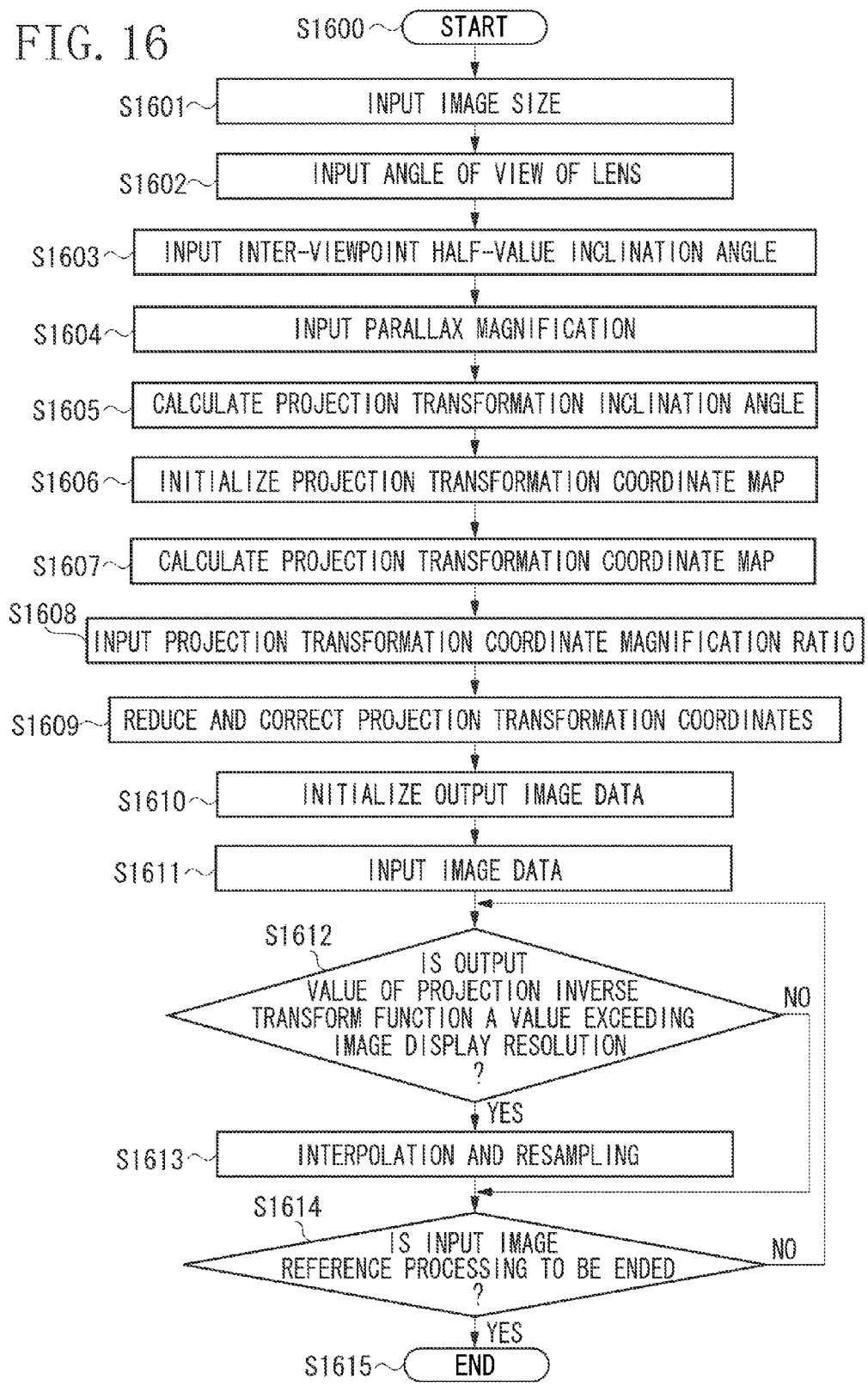
FIG. 16 is a flow chart illustrating an exemplary flow of projection transform processing, which is executed in step S909 in FIG. 9.

Referring to FIG. 16, in step S1600, the CPU 301 starts the processing illustrated in the sub flow chart 4. In step S1601, the CPU 301 inputs the X-axis direction image size and the Y-axis direction image size. In the present exemplary embodiment, the X-axis direction image size=2,592 and the Y-axis direction image size=1,728.

Processing in step S1602 is similar to the processing in step S1202. Accordingly, the detailed description thereof will not be repeated here. In addition, processing in step S1603 is similar to the processing in step S1203. Accordingly, the detailed description thereof will not be repeated here.

In step S1604, the CPU 301 inputs the parallax magnification PM. In step S1605, the CPU 301 calculates the projection transform inclination angle $\theta_{PP}$. More specifically, the CPU 301 calculates the projection transform inclination angle $\theta_{PP}$ by using the following expression (2.23):

$$\theta_{PP} = (PM \cdot \theta_P - \phi) \quad (2.23)$$

where "$\phi$" denotes a projection transform correction angle. In the present exemplary embodiment, it is supposed that $\phi=0$.

Processing in step S1606 is similar to the processing in step S1205. Accordingly, the detailed description thereof will not be repeated here. In addition, processing in step S1607 is similar to the processing in step S1206. Accordingly, the detailed description thereof will not be repeated here.

In step S1608, the CPU 301 inputs the projection transform coordinate magnification ratio ex_mag, which has been calculated in step S1207.

In step S1609, the CPU 301 executes magnification correction on the projection forward transform coordinate forward reference map ProjMap F (x,y) and the projection transform coordinate inverse reference map ProjMap I (x,y) by using the projection transform coordinate magnification ratio ex_mag.

$$xre_{out} = \frac{xr_{out}}{ex\_mag} \quad (2.24)$$

$$yre_{out} = \frac{yr_{out}}{ex\_mag}$$

$$xre_{in} = \frac{xr_{in}}{ex\_mag}$$

$$yre_{in} = \frac{yr_{in}}{ex\_mag}$$

In step S1610, the CPU 301 generates and initializes a data region of the output image that has been projection-transformed. More specifically, the CPU 301 generates a region whose area matches the area of a data region of the input image.

In step S1611, the CPU 301 inputs the compensated image for the virtual left camera viewpoint PVL. Processing in step S1612 is similar to the processing in step S1211. Accordingly, the detailed description thereof will not be repeated here. In addition, processing in steps S1613 and S1614 is similar to the processing in steps S1212 and S1213, respectively. Accordingly, the detailed description thereof will not be repeated here. In step S1615, the processing of the sub flow chart 4 ends.

In step S910, the processing of the processing program 2 ends.

The projection transform in steps S905 and S909 will be elaborated. In step S905, the left camera finite near XY plane 1003 is projection-transformed onto the left camera finite near projection-transform XY plane 1007, which is inclined by the inter-viewpoint half value inclination angle $\theta_P$. However, it is not necessary to limit the inclination angle to $\theta_P$. More specifically, the left camera finite near XY plane 1003 can be projection-transformed by using expression (2.12) by using the projection transform correction angle $\phi$.

In addition, it is not necessary to limitedly use PM and $\theta_P$ in executing the projection transform in step S909. More specifically, the projection-transformed in step S909 can be executed by using expression (2.23) by using the projection transform correction angle $\phi$.

In other words, by executing projection transform operations twice in total in steps S905 and S909, the CPU 301 can cause the left camera finite near projection-transform XY plane 1007 to incline by PM times of the inter-viewpoint half value inclination angle $\theta_P$ as a result of the projection transform operations.

As described above, in the parallax readjustment processing according to the present exemplary embodiment, the CPU 301 generates the virtual left camera image and the virtual right image based on the left camera image and the right camera image. Accordingly, the present exemplary embodiment can readjust the parallax of the left camera image and the right camera image.

In addition, as described above, the present exemplary embodiment uses the parallax map, which is generated by the parallax vector detection according to the present exemplary embodiment. As a result, no non-reference region may arise in the compensated image, which may arise when the conventional parallax compensation method is used. Accordingly, the present exemplary embodiment can effectively improve the image quality.

In addition, by executing the projection transform according to the present exemplary embodiment on the intersecting view-binocular parallax image, the present exemplary embodiment can accurately detect the parallax vector. Therefore, the present exemplary embodiment can allow a user to view an image suitable for the stereoscopic display.

In addition, by executing the projection transform according to the present exemplary embodiment on the parallax-compensated image, the present exemplary embodiment can reproduce the positional deviation of the object of the parallax-readjusted image in the Z-axis direction. Therefore, the present exemplary embodiment can allow a user to view an image suitable for the stereoscopic display.

If the parallax magnification PM=1, the near image distance NID=0 as a result of the calculation using expression (2.22). In this case, both the X-axis direction parallax vector Δx and the Y-axis direction parallax vector Δy become "0" as a result of the calculation using expression (1.11).

The offsets mx·NID and my·NID included in expression (1.18) become "0" also. As a result, the parallax-compensated image PPI ($x_{out}$, $y_{out}$) becomes equivalent to the near image NI $x_{in}$, $y_{in}$). Accordingly, the near image NI ($x_{in}$, $y_{in}$) can be output as the parallax-compensated image PPI ($x_{out}$, $y_{out}$) without executing the processing in steps S404 S405.

In addition, the left camera viewpoint position and the virtual left camera viewpoint position become the same as a result of the calculations using expressions (2.12) and (2.23). Accordingly, the left-viewpoint image can be output as the virtual left-viewpoint image.

In the present exemplary embodiment, it is not required to acquire the intersecting view-binocular parallax image used in the above-described processing by using two or more cameras. In other words, as discussed in Japanese Patent Application Laid-Open No. 2009-124213, the binocular parallax images can be generated based on the image data recorded by a single recording element. Accordingly, in the present exemplary embodiment, the binocular parallax image generated by using the above-described one camera can be used.

In a third exemplary embodiment of the present invention, the parallax of the intersecting view-binocular parallax image, which is a binocular parallax image photographed by the intersecting view method, is readjusted by multiplication by PM times. The configurations of the present exemplary embodiment similar to those of the above-described first and the second exemplary embodiments will not be described in detail in the following description.

In expression (2.22), the ratio between the near image distance NID and the far image distance FID may vary according to the input image X-axis direction-coordinate value xrin. In order to process the image, which exists in a discrete space, based on the ratio between the near image distance NID and the far image distance FID, the CPU 301 generates an image enlarged by interpolation according to the magnification differently set for each X-axis direction-coordinate value $xr_{in}$. In addition, the CPU 301 uses the X-axis direction-coordinate value $xr_{in}$ in executing the parallax vector detection.

However, alternatively, instead of generating the image enlarged by interpolation according to the magnification differently set for each X-axis direction-coordinate value $xr_{in}$, the present exemplary embodiment can generate an image in the following manner and can use the generated image in executing the parallax vector detection. More specifically, in this case, the CPU 301 can generate an image enlarged by interpolation according to a magnification set based on the ratio between the near image distance NID and the far image distance FID, which is calculated by inputting a representative value of the X-axis direction-coordinate value $xr_{in}$ into expression (2.22) and based on the representative value of the X-axis direction-coordinate value $xr_{in}$ within a specific region in the X-axis direction.

In addition, if the search ratio per each X-axis direction coordinate value $xr_{in}$ is more minute for the ratio between the near image distance NID and the far image distance FID which is calculated by the calculation using expression (2.22) according to the second exemplary embodiment than the ratio between the near image distance NID and the far image distance FID, which is calculated by the calculation using expression (1.4) according to the first exemplary embodiment, then the ratio between the near image distance NID and the far image distance FID which is calculated by using expression (1.4) can be used for the parallax vector detection.

In a fourth exemplary embodiment of the present invention, the parallax of the intersecting view-binocular parallax image, which is a binocular parallax image photographed by the intersecting view method, is readjusted by multiplication by PM times.

In the following description about the present exemplary embodiment, the description about the configurations similar to those of the first through the third exemplary embodiments will not be repeated.

In the examples illustrated in FIGS. 10A and 10B, if the inter-viewpoint half value inclination angle $θ_P$ is small, the difference between the mapping point 1006 and the mapping point 1008 in the X-axis direction and in the Z-axis direction becomes minute. In this case, the CPU 301 executes the processing program 2 except the projection transform on the input image pair in step S905.

In a fifth exemplary embodiment of the present invention, the processing program 1 illustrated in FIG. 4 can be constituted by hardware, such as an imaging apparatus. In this case, the processing program 1 is implemented by an electronic circuit, such as large-scale integration (LSI).

In addition, a control unit, which is equivalent to a CPU included in the hardware, such as an imaging apparatus, executes the function of the electronic circuit, such as LSI. With the above-described configuration, functions of the corresponding functional units can be implemented.

Figure 17:
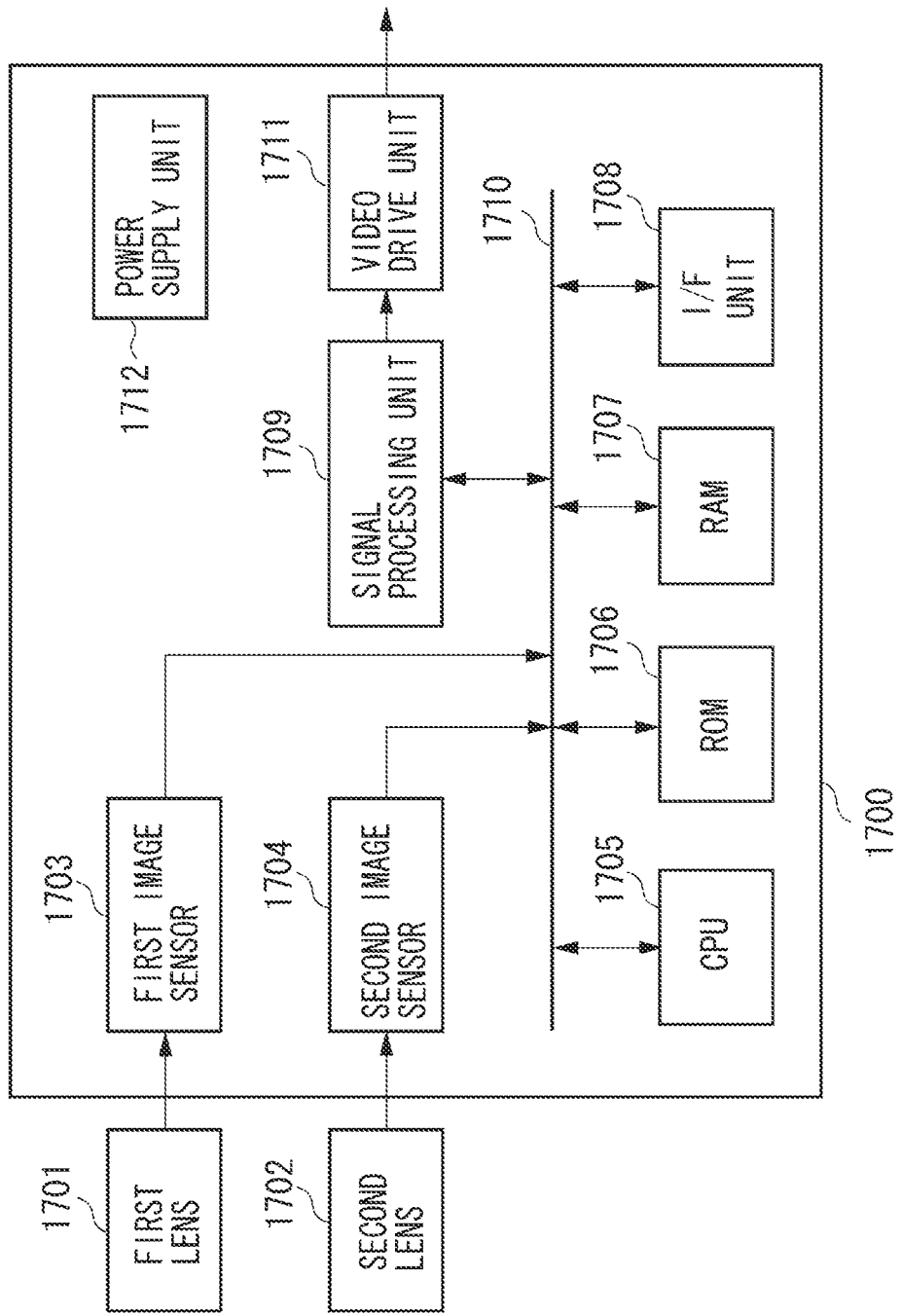
FIG. 17 illustrates an exemplary hardware configuration of a twin-lens camera according to fifth and sixth exemplary embodiments.

FIG. 17 schematically illustrates an exemplary configuration of a twin-lens imaging apparatus.

Referring to FIG. 17, the imaging apparatus includes an imaging apparatus body 1700, a first exchangeable lens 1701, a second exchangeable lens 1702, a first image sensor 1703, a second image sensor 1704, a CPU 1705, a ROM 1706, a RAM 1707, an I/F unit 1708, a signal processing unit 1709, a signal bus 1710, a video drive unit 1711, and a power supply unit 1712.

The image sensor body 1700 controls the power supply unit 1712 to appropriately supply power to other processing units included in the imaging apparatus body 1700 to activate and operate the other processing units.

The CPU 1705 transmits and receives an image data signal and a control signal to and from the other processing units included in the imaging apparatus body 1700, such as the first image sensor 1703, the second image sensor 1704, the ROM 1706, the RAM 1707, the I/F unit 1708, and the signal processing unit 1709, and can execute an operation on data where necessary. The signal bus 1710 is a bus for transmitting the image data signal and the control signal among the processing units included in the imaging apparatus body 1700.

Light collected by the first exchangeable lens 1701 irradiates the image plane of the first image sensor 1703 and is then photoelectrically converted into a voltage. The voltage generated by the photoelectric conversion is quantized according to a quantization threshold value. Then the quantized voltage is converted into image signal data.

On the other hand, light collected by the second exchangeable lens 1702 irradiates the image plane of the second image sensor 1704 and is then photoelectrically converted into a voltage. The voltage generated by the photoelectric conversion is quantized according to a quantization threshold value. Then the quantized voltage is converted into image signal data.

The I/F unit 1708 receives a user instruction input by a user operation. In addition, the I/F unit 1708 can display data processed within the imaging apparatus body 1700 on an LCD (not illustrated). Furthermore, the I/F unit 1708 can load image data from an external storage device (not illustrated).

The ROM 1706 records basic software, such as an operating system (OS), and application software, which is activated when called by the basic software. The CPU 1705 loads the basic software and the application software onto the RAM 1707 when the imaging apparatus body 1700 is activated and executes a program of the software.

The RAM 1707 includes a temporary storage area for temporarily storing digital data that can be rewritten while the imaging apparatus body 1700 is in operation. The RAM 1707 also temporarily stores image signal data.

The signal processing unit 1709 is an LSI configured to read the image data from the RAM 1707 and executes various image processing on the read image data. The configuration illustrated in FIG. 4 is implemented by the signal processing unit 1709.

The video drive unit 1711 executes control for storing the image data that has been subjected to the image processing by the signal processing unit 1709 on the external storage device (not illustrated).

Figure 18:
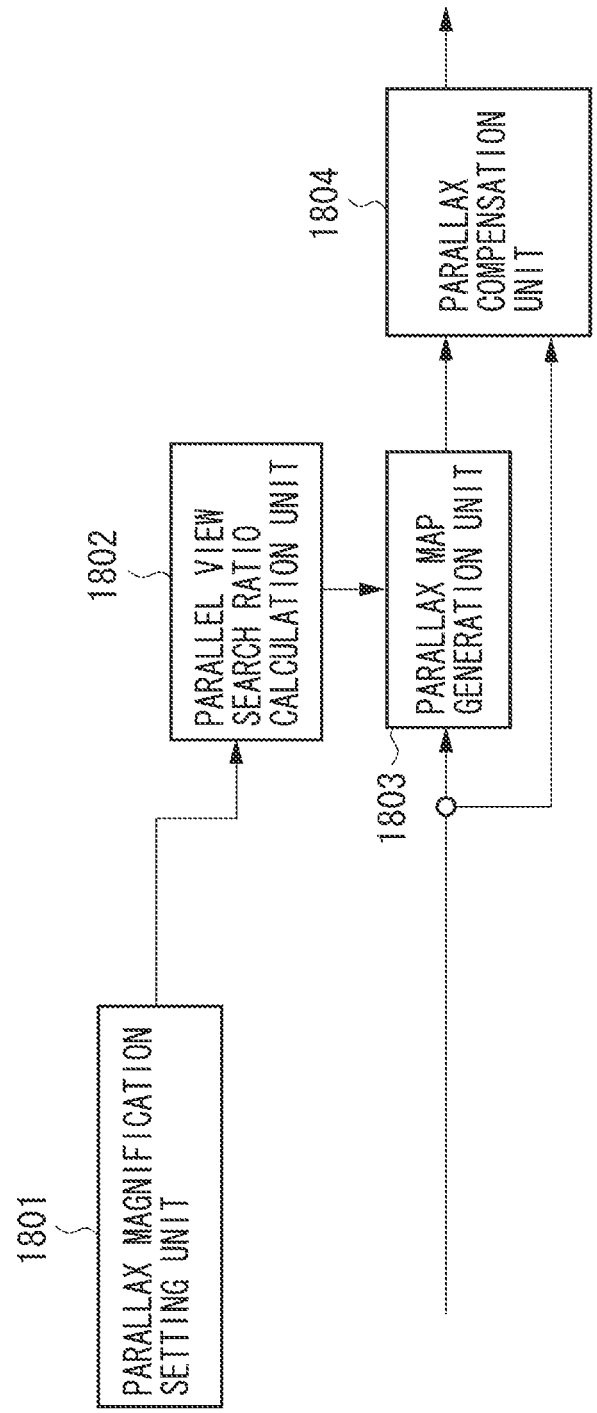
FIG. 18 is a block diagram illustrating exemplary processing blocks of the image processing apparatus according to the fifth exemplary embodiment of the present invention.

FIG. 18 is a processing block diagram illustrating signal processing units provided for executing the signal processing implemented by the signal processing unit 1709.

Referring to FIG. 18, the signal processing unit 1709 includes a parallax magnification setting unit 1801, a parallel view method-search ratio calculation unit 1802, a parallax map generation unit 1803, and a parallax compensation unit 1804.

The parallax magnification setting unit 1801 sets the parallax magnification PM. However, alternatively, the parallax magnification PM can be input by the user via the I/F unit 1708. Further alternatively, a value previously recorded on the ROM 1706 can be used as the parallax magnification PM.

The parallel view method search ratio calculation unit 1802 inputs the parallax magnification PM. In addition, the parallel view method-search ratio calculation unit 1802 calculates the image search ratio SR and the ratio between the near image distance NID and the far image distance FID by using expression (1.4).

The parallax map generation unit 1803 inputs the parallel view-binocular parallax image pair, the search ratio SR, and the ratio between the near image distance NID and the far image distance FID. In addition, the parallax map generation unit 1803 generates a parallax map, which is to be used in image processing executed by an electronic circuit which is configured to implement the processing illustrated in the sub flow chart 1 illustrated in FIG. 5.

The parallax compensation unit 1804 inputs the parallel view-binocular parallax image pair and the parallax map. In addition, the parallax compensation unit 1804 generates a parallax-compensated image, which is to be used in image processing executed by an electronic circuit which is configured to implement the processing illustrated in the sub flow chart 2 illustrated in FIG. 7.

In the present exemplary embodiment, it is not required to acquire the parallel view-binocular parallax image used in the above-described processing by using two or more cameras. In other words, alternatively, as discussed in Japanese Patent Application Laid-Open No. 2010-79505, an image can be reconstituted based on an image photographed by one camera whose field and focus are arbitrarily set. In addition, a parallel view-binocular parallax image can be generated based on image data recorded by using one recording element only. Accordingly, in the present exemplary embodiment, the parallel view-binocular parallax image generated by using the above-described one camera can be used.

According to a sixth exemplary embodiment of the present invention, the processing program 2 described above with reference to FIG. 9 can be implemented by hardware, such as an imaging apparatus. In this case, the processing program 1 is implemented by the electronic circuit, such as an LSI.

In addition, a control unit, which is equivalent to a CPU included in the hardware, such as an imaging apparatus, executes the function of the electronic circuit, such as LSI. With the above-described configuration, functions of the corresponding functional units can be implemented.

FIG. 17 schematically illustrates an exemplary configuration of a twin-lens imaging apparatus. Referring to FIG. 17, the imaging apparatus includes a hardware configuration similar to the hardware configuration described above in the fifth exemplary embodiment. Accordingly, the detailed description thereof will not be repeated here.

Figure 19:
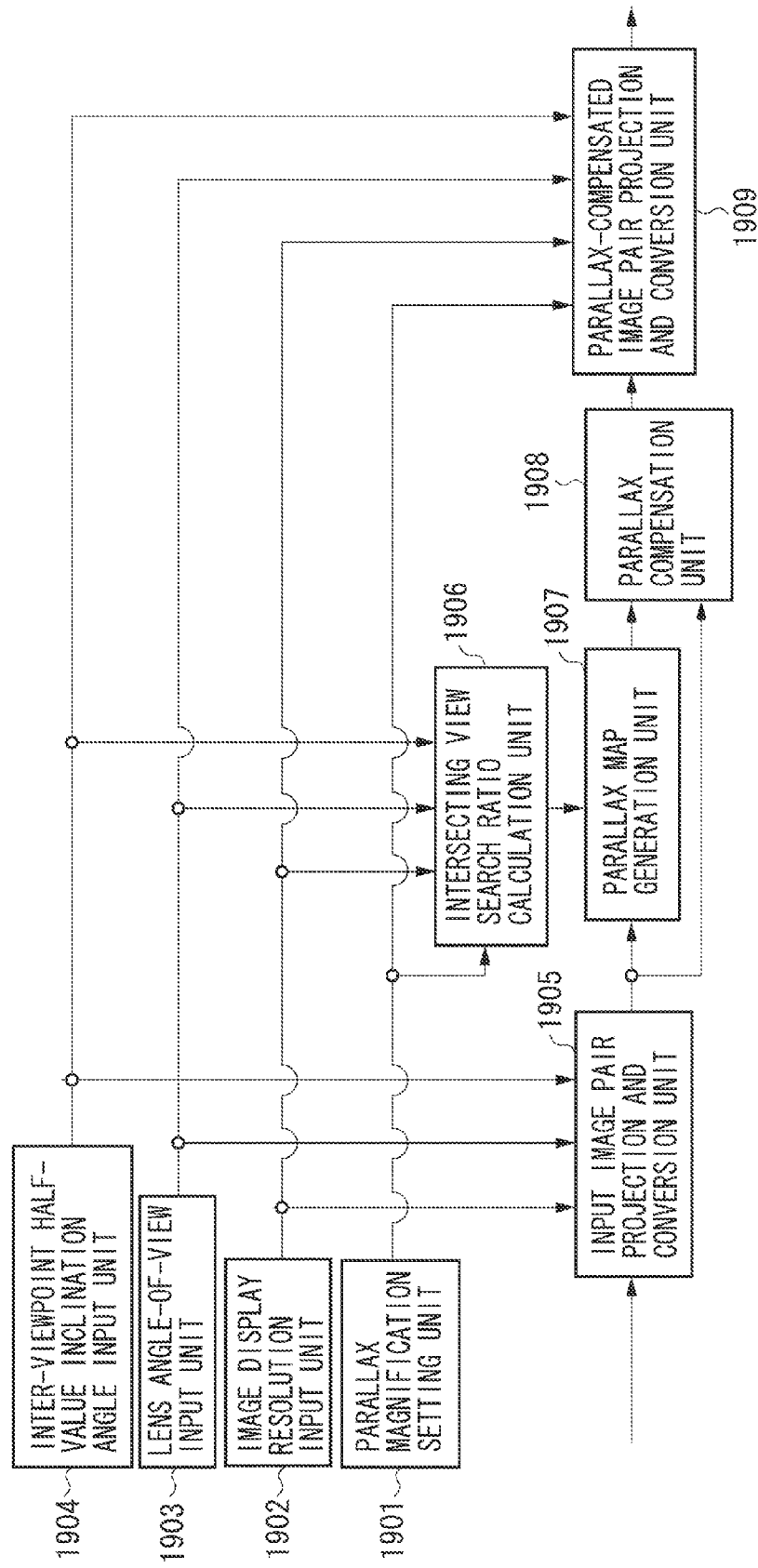
FIG. 19 is a block diagram illustrating exemplary processing blocks of the image processing apparatus according to the sixth exemplary embodiment of the present invention.

FIG. 19 is a processing block diagram illustrating signal processing units provided for executing the signal processing implemented by the signal processing unit 1709.

Referring to FIG. 19, the signal processing unit 1709 according to the present exemplary embodiment includes a parallax magnification setting unit 1901, an image display resolution input unit 1902, a lens angle-of-view input unit 1903, an inter-viewpoint half-value inclination angle input unit 1904, an input image pair projection and conversion unit 1905, an intersecting view search ratio calculation unit 1906, a parallax map generation unit 1907, a parallax compensation unit 1908, and a parallax-compensated image pair projection and conversion unit 1909.

The content of processing executed by the parallax magnification setting unit 1901 is similar to that described above in the fourth exemplary embodiment. Accordingly, the detailed description thereof will not be repeated here.

The image display resolution input unit 1902 inputs the X-axis direction resolution and the Y-axis direction resolution of the input image by using a value previously recorded on the ROM 1706. The lens angle-of-view input unit 1903 inputs the lens angle of view $\theta_{Len}$ by using a value previously recorded on the ROM 1706. Alternatively, the lens angle-of-view input unit 1903 can input information about a lens included in the first exchangeable lens 1701 and the second exchangeable lens 1702.

The inter-viewpoint half-value inclination angle input unit 1904 inputs the inter-viewpoint half-value inclination angle $\theta_P$ by using a value previously recorded on the ROM 1706. Alternatively, the inter-viewpoint half-value inclination angle input unit 1904 can input an inclination formed by the first exchangeable lens 1701 and the second exchangeable lens 1702.

The input image pair projection and conversion unit 1905 inputs the X-axis direction resolution and the Y-axis direction resolution of the image, the lens angle of view $\theta_{Len}$, the inter-viewpoint half-value inclination angle $\theta_P$, and the intersecting view-binocular parallax image pair. The input image pair projection and conversion unit 1905 executes projection-transform in executing image processing on an electronic circuit configured to implement the processing illustrated in the sub flow chart 3 illustrated in FIG. 12.

The intersecting view search ratio calculation unit 1906 inputs the X-axis direction resolution and the Y-axis direction resolution of the image, the lens angle of view $\theta_{Len}$, the inter-viewpoint half-value inclination angle $\theta_P$, and the parallax magnification PM. In addition, the intersecting view search ratio calculation unit 1906 calculates the search ratio SR and the ratio between the near image distance NID and the far image distance FID by using expression (2.22).

The content of processing executed by the parallax map generation unit 1907 is similar to that described above in the fourth exemplary embodiment. Accordingly, the detailed description thereof will not be repeated here. The content of processing executed by the parallax compensation unit 1908 is similar to that described above in the fourth exemplary embodiment. Accordingly, the detailed description thereof will not be repeated here.

The parallax-compensated image pair projection and conversion unit 1909 inputs the X-axis direction resolution and the Y-axis direction resolution of the image, the lens angle of view $\theta_{Len}$, the inter-viewpoint half-value inclination angle $\theta_P$, the parallax magnification PM, the compensated image for the virtual left camera viewpoint PVL, and the compensated image for the virtual right camera viewpoint PVR.

In addition, the parallax-compensated image pair projection and conversion unit 1909 executes projection-transform to execute image processing on an electronic circuit configured to implement the processing of the sub flow chart 4 described above with reference to FIG. 16. Furthermore, the parallax-compensated image pair projection and conversion unit 1909 generates the virtual left camera viewpoint PVL image and the virtual right camera viewpoint PVR image for the image processing.

In the present exemplary embodiment, it is not required to acquire the intersecting view-binocular parallax image used in the above-described processing by using two lenses or two image sensors. In other words, alternatively, as discussed in Japanese Patent Application Laid-Open No. 2010-79505, an image can be reconstituted based on an image photographed by one camera whose field and focus are arbitrarily set. In addition, an intersecting view-binocular parallax image can be generated based on image data recorded by using one recording element only. Accordingly, in the present exemplary embodiment, the intersecting view-binocular parallax image generated by using the above-described one camera can be used.

In a seventh exemplary embodiment of the present invention, the CPU 301 readjusts the parallax of the parallel view-binocular parallax image, which is a binocular parallax image photographed by the parallel view method, according to the parallax magnification PM. The description about configurations of the present exemplary embodiment similar to those of the first exemplary embodiment described above will be omitted in the following description.

Figure 20:
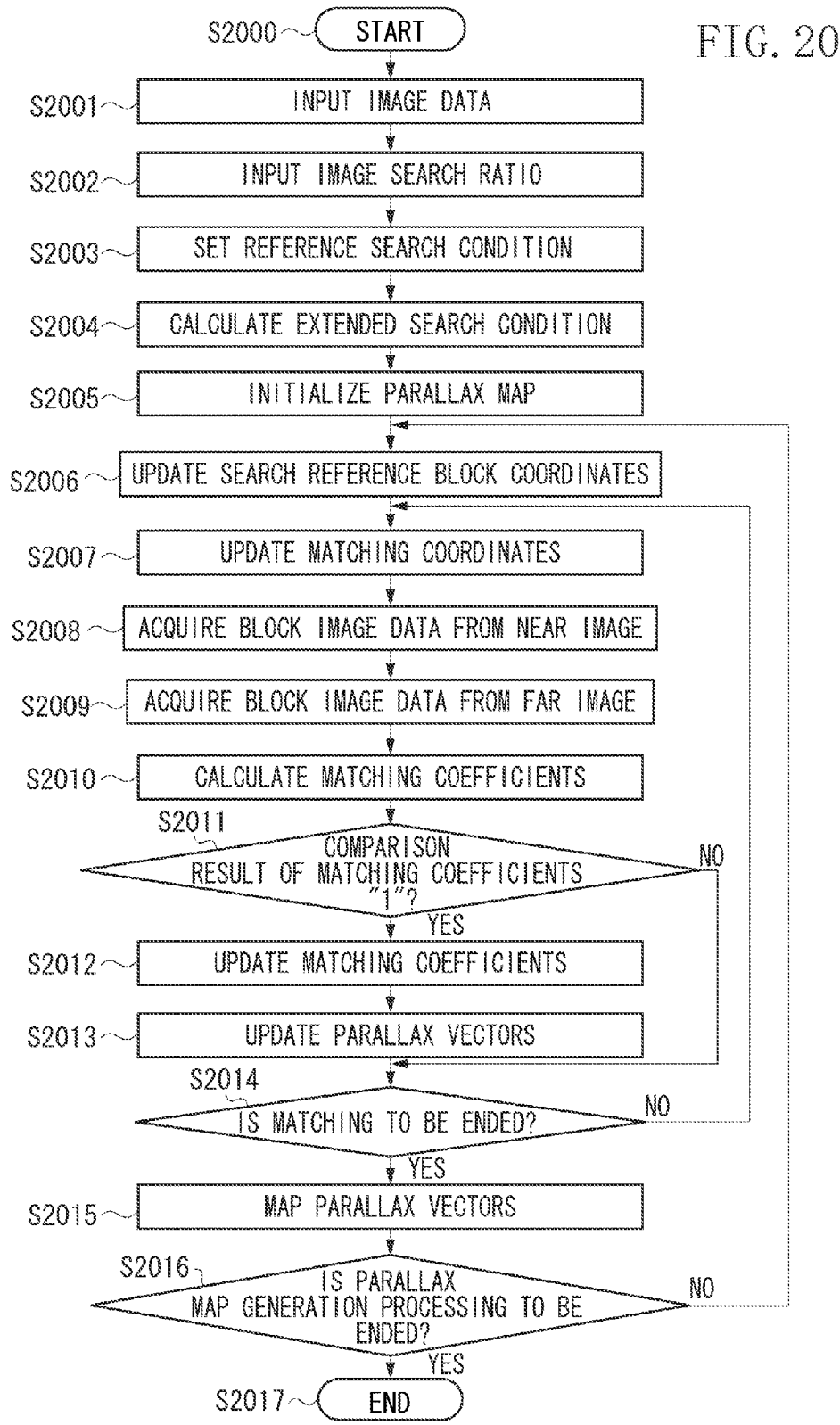
FIG. 20 is a flow chart illustrating an exemplary flow of processing according to a seventh exemplary embodiment of the present invention.

FIG. 20 is a flow chart illustrating an exemplary flow of the parallax vector detection processing in step S404 according to the seventh exemplary embodiment. In the following description, the flow chart of the parallax vector detection processing is referred to as a "sub flow chart 5".

In step S2003, the CPU 301 sets a reference matching processing condition, which is used for the template matching.

Figure 21:
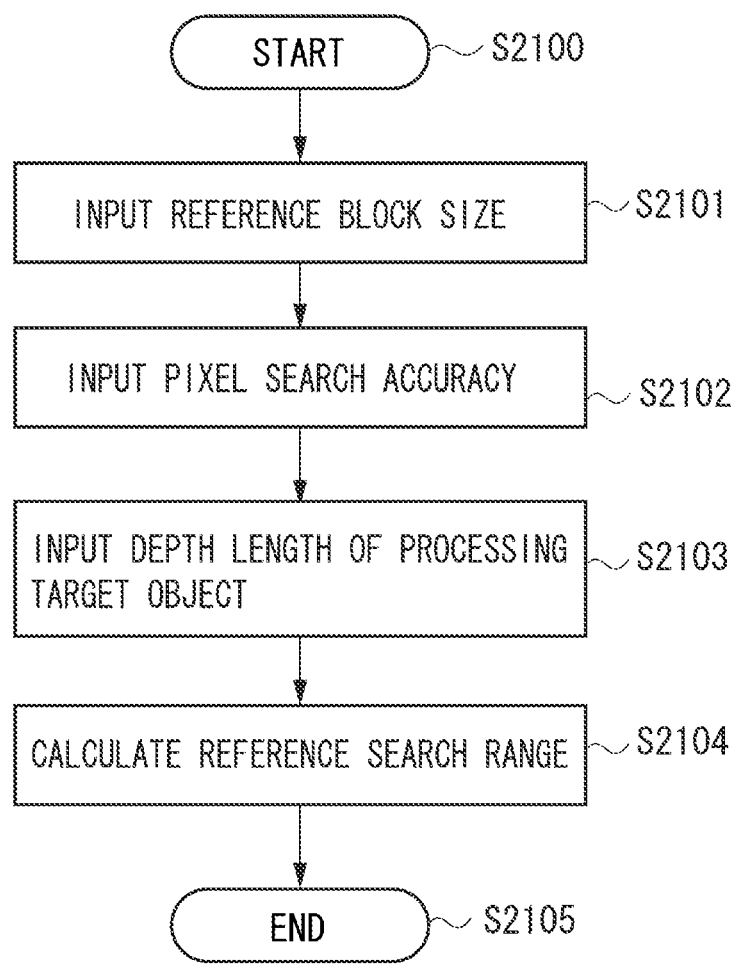
FIG. 21 is a flow chart illustrating an exemplary flow of search reference condition setting processing according to the seventh exemplary embodiment of the present invention.

FIG. 21 is a flow chart illustrating an exemplary flow of the search reference condition setting processing according to the seventh exemplary embodiment. In the following description, the flow chart of the parallax vector detection illustrated in FIG. 21 is referred to as a "sub flow chart 6".

Referring to FIG. 21, in step S2100, the CPU 301 starts the processing of the sub flow chart 6. In step S2101, the CPU 301 inputs the X-axis direction reference block size BS_BASIC$_x$ and the X-axis direction reference block size BS_BASIC$_y$, which are used in the template matching. In the present exemplary embodiment, BS_BASIC$_x$=8 and BS_BASIC$_y$=8.

In step S2102, the CPU 301 inputs the pixel search accuracy PSA, which is used in the template matching. In the present exemplary embodiment, PSA=0.5.

In step S2103, the CPU 301 inputs a z-axis direction processing target depth length DepthLength. The z-axis direction processing target depth length DepthLength denotes the length of a line segment parallel to an optical axis of the imaging lens.

Similarly, for a depth of field, a predetermined range can be set around a center object in the z-axis direction. The depth of field denotes the distance in the direction of the photographing depth between a near-side depth of field Dof$_N$, which corresponds to an object existing close to the lens, and a far-side depth of field Dof$_F$, which corresponds to an object existing more distant from the lens, in relation to the center object distance, at which a focus plane on the object side exists.

The near-side depth of field Dof$_N$ can be calculated by using the following expression (6.1). The far-side depth of field Dof$_F$ can be calculated by using the following expression (6.2).

In expressions (6.1) and (6.2), "f" denotes a focal length of the imaging lens, "a" denotes the center object distance, "F" denotes the F-number, and "$\epsilon$" denotes a tolerable circle-of-confusion diameter. In the present exemplary embodiment, f=30.234 mm, a=1 m, F=$2^{0.5}$, and $\epsilon$=0.03 mm.

By substituting the above-described values into expressions (6.1) and (6.2), the near-side depth of field Dof$_N$=0.444 m and the far-side depth of field Dof$_F$=0.487 m are acquired.

$$Dof_N = \frac{a^2 \cdot \varepsilon \cdot F}{f^2 + a \cdot \varepsilon \cdot F} \quad (6.1)$$

$$Dof_F = \frac{a^2 \cdot \varepsilon \cdot F}{f^2 - a \cdot \varepsilon \cdot F} \quad (6.2)$$

The processing target depth length DepthLength can be calculated by the following expression (6.3) by using the near-side depth of field Dof$_N$ and the far-side depth of field Dof$_F$. In expression (6.3), "$w_n$," and "$w_f$," denote correction magnification, whose values are in the following ranges:

$0 \leq w_n < \infty$ $0 \leq w_f < \infty$.

In the present exemplary embodiment, $w_n$=1 and $w_f$=1. In addition, the processing target depth length DepthLength=0.931 m.

$$w_n \cdot Dof_N + w_f \cdot Dof \quad (6.3)$$

In the present exemplary embodiment, the z-axis direction processing target depth length DepthLength is set based on the depth of field calculated based on the information about the imaging lens used in the left-viewpoint camera and the right-viewpoint camera. However, in the present exemplary embodiment, the range of the z-axis direction processing target depth length DepthLength is not limited to a specific range.

In step S2104, the CPU 301 sets an X-axis direction reference search range minimum value SS_BASIC_MIN$_x$ and an X-axis direction reference search range maximum value SS_BASIC_MAX$_x$. For the X-axis direction reference search range minimum value SS_BASIC_MIN$_x$ and the X-axis direction reference search range maximum value SS_BASIC_MAX$_x$, the search range in the X-axis direction is set within the range from SS_BASIC_MIN$_x$ to SS_BASIC_MAX$_x$ inclusive.

To execute the search within the search range including "0" is equivalent to executing the search on an assumption that a matching object exists at an infinite distance. In the present exemplary embodiment, the X-axis direction reference search range minimum value SS_BASIC_MIN$_x$ and the X-axis direction reference search range maximum value SS_BASIC_MAX$_x$ are used to execute the search only when a matching object exists within a range previously assumed and in which a matching object is highly likely to exist in the z-axis direction.

Figure 22:
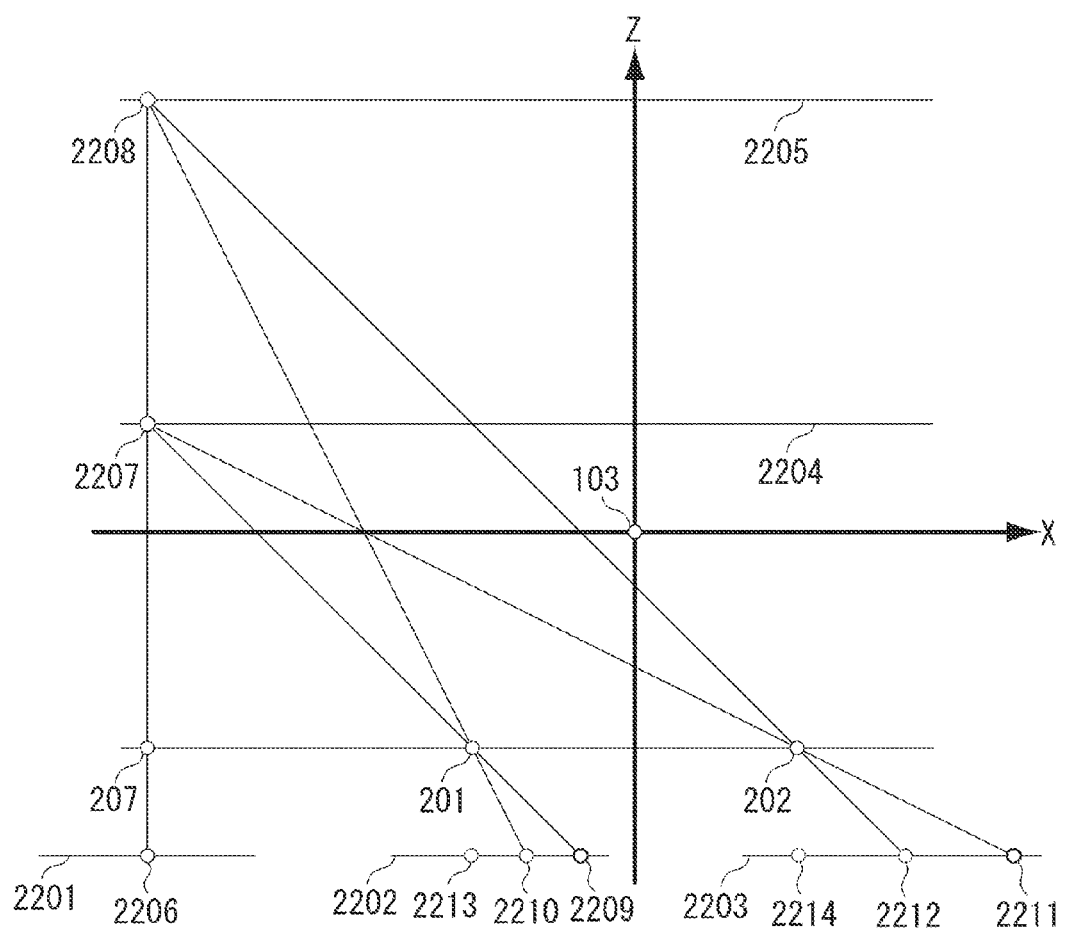
FIG. 22 illustrates an example of an XZ plane when viewed from the negative direction towards the positive direction in the direction of the Y-axis according to the seventh exemplary embodiment of the present invention.

An exemplary method for setting the X-axis direction reference search range minimum value SS_BASIC_MIN$_x$ and the X-axis direction reference search range maximum value SS_BASIC_MAX$_x$ will be described in detail below with reference to FIG. 22. FIG. 22 illustrates the XZ plane 102 when viewed from the negative direction towards the positive direction in the Y-axis direction.

Referring to FIG. 22, the XZ plane includes the origin O 103. The left camera 201 has principal points of the imaging lenses at the same coordinate position. The right camera 202 has principal points of the imaging lenses at the same coordinate position. The virtual left camera 207 has principal points of the imaging lenses at the same coordinate position.

In the present exemplary embodiment, lens optical axes of the left camera 201, the right camera 202, and the virtual left camera 207 are parallel to one another. In addition, similar to the first exemplary embodiment, the left camera 201, the right camera 202, and the virtual left camera 207 are located at positions having the same z coordinate value.

The length of the inter-camera base line between the left camera 201 and the right camera 202 is 5 mm. As a result of the calculation using expression (1.2), the length of the inter-camera base line between the left camera 201 and the virtual left camera 207 is 5 mm.

A first image sensor plane 2201 is an image plane of a virtual image sensor included in the virtual left camera 207. A second image sensor plane 2202 is an image plane of the image sensor included in the left camera 201. A third image sensor plane 2203 is an image plane of the image sensor included in the right camera 202.

The first image sensor plane 2201, the second image sensor plane 2202, and the third image sensor plane 2203 share the same imaging conditions. Accordingly, the geometric conditions become the same as those applied when projecting on one plane.

The sizes of the sensors of the first image sensor plane 2201, the second image sensor plane 2202, and the third image sensor plane 2203 are the same as one another. More specifically, the sensor size can be expressed by an x-direction sensor length SensorX and a y-direction sensor length SensorY. In the present exemplary embodiment, full size image sensors are used. Accordingly, SensorX=36 mm and SensorY=24 mm.

A front processing target plane 2204 and a rear processing target plane 2205 are distant from each other by a distance equivalent to the processing target depth length DepthLength. The left camera 201, the right camera 202, and the virtual left camera 207 share the front processing target plane 2204 and the rear processing target plane 2205.

A coordinate position 2206 is a mapping point A. The coordinate position 2206 is a predetermined coordinate position on the first image sensor plane 2201 of the virtual left camera 207. A point 2207 is a candidate point B. More specifically, the point 2207 is an intersection between a half-line, which is formed between the mapping point A 2206 and the virtual left camera 207, and the front processing target plane 2204. The point 2207 is a point at which the z coordinate value is the lowest of the z coordinate values of the objects formed at the mapping point A 2206 within the range expressed by the processing target depth length DepthLength.

A candidate point C 2208 is a point of intersection between a half-line, which is formed between the mapping point A 2206 and the virtual left camera 207, and the rear processing target plane 2205. The point 2208 is a point at which the z coordinate value is the highest of the z coordinate values of the objects formed at the mapping point A 2206 within the range expressed by the processing target depth length DepthLength.

A mapping point D 2209 denotes a position of coordinates of a point at which the candidate point B 2207 is formed on the second image sensor plane 2202. A mapping point E 2210 denotes a position of coordinates of a point at which the candidate point C 2208 is formed on the second image sensor plane 2202. A mapping point F 2211 denotes a position of coordinates of a point at which the candidate point B 2207 is formed on the third image sensor plane 2203.

A same-UV coordinate position H 2213 is a coordinate position on the second image sensor plane 2202, at which the coordinate values in the UV coordinate system on the sensor plane becomes the same as the coordinate values of the mapping point A 2206, which exists on the first image sensor plane 2201. A same-UV coordinate position 12214 is a coordinate position on the third image sensor plane 2203, at which the coordinate values in the UV coordinate system on the sensor plane becomes the same as the coordinate values of the mapping point A 2206, which exists on the first image sensor plane 2201.

The UV coordinate system is a two-dimensional coordinate system on the sensor plane. The UV coordinate system can be geometrically associated with the XYZ coordinate system, which is a three-dimensional space.

A distance b, which is a distance from the sensor plane of each of the first image sensor plane 2201, the second image sensor plane 2202, and the third image sensor plane 2203 to a lens principal plane is approximately 31.177 mm, which can be calculated by using the following lens imaging formula:

$$\frac{1}{f} = \frac{1}{a} + \frac{1}{b},$$

and
a center object distance a=1 m, and an imaging lens focal length f=30.234 mm.

A distance $D_N$ from the lens principal plane to the front processing target plane 2204 can be calculated as follows:

$$D_N = a - \text{Dof}_N = 0.556 \text{ m}.$$

A triangle A, which includes vertexes at the candidate point B 2207, the virtual left camera 207, and the left camera 201 and a triangle B, which includes vertexes at the candidate point B 2207, the mapping point A 2206, and the mapping point D 2209, are geometrically similar. The similarity ratio of the triangles A and B can be calculated as follows.

$$D_N:(D_N+b)=1:1.056.$$

The length of the inter-camera base line between the left camera 201 and the virtual left camera 207 is 5 mm. Accordingly, the distance between the mapping point D 2209 and the mapping point A 2206 becomes 5×1.056=5.28 mm.

The distance between the mapping point A 2206 and the same-UV coordinate position H 2213 is equivalent to the length of the inter-camera base line between the left camera 201 and the virtual left camera 207. Accordingly, a distance β between the mapping point D 2209 and the same-UV coordinate position H 2213 becomes 5.28−5=0.28 mm.

To calculate the pixel-equivalent value of the distance β (=0.28 mm), because SensorX=36 mm and the X-axis direction display resolution rsl_x=2,592 (pixels), the pixel-equivalent value of the distance R can be calculated as follows:

$$\beta \cdot \frac{rsl\_x}{SensorX} = 20.16 \text{ (pixels)}.$$

Supposing that the X-axis direction reference search range maximum value SS_BASIC_MAX$_x$=21, the CPU 301 sets the smallest integer of integers greater than $$\beta \cdot \frac{rsl\_x}{SensorX}.$$

The distance D$_F$ from the lens principal plane to the front processing target plane 2204 can be calculated as follows:

$$D_F = a + Dof_F = 1.487 \text{ m}.$$

A triangle C, which includes vertexes at the candidate point C 2208, the virtual left camera 207, and the left camera 201, and a triangle D, which includes vertexes at the candidate point C 2208, the mapping point A 2206, and the mapping point E 2210 are similar. The similarity ratio between the triangles C and D can be calculated as follows:

$$D_F:(D_F+b)=1:1.021.$$

The length of the inter-camera base line between the right camera 202 and the virtual left camera 207 is 5 mm. Accordingly, the distance between the mapping point E 2210 and the mapping point A 2206 becomes 5×1.021=5.105 mm.

The distance between the mapping point A 2206 and the same-UV coordinate position H 2213 is equivalent to the length of the inter-camera base line between the left camera 201 and the virtual left camera 207. Accordingly, a distance χ between the mapping point E 2210 and the same-UV coordinate position H 2213 becomes 5.105−5=0.105 mm.

To calculate the pixel-equivalent value of the distance χ (=0.015 mm), because SensorX=36 mm and the X-axis direction display resolution rsl_x=2,592 (pixels), the pixel-equivalent value of the distance χ can be calculated as follows:

$$\chi \cdot \frac{rsl\_x}{SensorX} = 7.56 \text{ (pixels)}.$$

Supposing that the X-axis direction reference search range minimum value SS_BASIC_MIN$_x$=7, the CPU 301 sets the greatest integer of integers smaller than $$\chi \cdot \frac{rsl\_x}{SensorX}.$$

In step S2105, the processing illustrated in the sub flow chart 6 ends.

In step S2004 (FIG. 20), the CPU 301 calculates an extended matching processing condition, which is used in the template matching, by using the image search ratio SR and the reference matching processing condition.

The extended matching processing condition includes an X-axis direction extended block size BS_EXTEND$_x$, a Y-axis direction extended block size BS_EXTEND$_y$, an X-axis direction extended search range minimum value SS_EXTEND_MIN$_x$, and an X-axis direction extended search range maximum value SS_EXTEND_MAX$_x$.

The sizes or values BS_EXTEND$_x$, BS_EXTEND$_y$, SS_EXTEND_MIN$_x$, and SS_EXTEND_MAX$_x$ can be defined as expressed by the following expression (6.4):

$$\begin{aligned} BS\_EXTEND_x &= \frac{FID \cdot BS\_BASIC_x}{PSA} \\ BS\_EXTEND_y &= \frac{FID \cdot BS\_BASIC_y}{PSA} \\ SS\_EXTEND\_MIN_x &= \frac{SS\_BASIC\_MIN_x}{PSA} \\ SS\_EXTEND\_MAX_x &= \frac{SS\_BASIC\_MAX_x}{PSA}. \end{aligned} \quad (6.4)$$

As a result of calculation by expression (6.4), BS_EXTEND$_x$=32, BS_EXTEND$_y$=32, SS_EXTEND_MIN$_x$=14, and SS_EXTEND_MAX$_x$=42.

Processing in steps S2005 and S2006 is similar to the processing in steps S505 and S506, respectively. Accordingly, the detailed description thereof will not be repeated here. In step S2007, the CPU 301 calculates matching coordinates of each of the near image NI and the far image FI for the block image existing at the search reference block coordinates (BBC_X, BBC_Y).

In the following expression (6.5), "NMC_X" denotes an X-axis direction matching coordinate within the near image NI, "NMC_Y" denotes a Y-axis direction matching coordinate within the near image NI, "FMC_X" denotes an X-axis direction matching coordinate within the far image FI, and "FMC_Y" denotes a Y-axis direction matching coordinate within the far image FI. In expression (6.5), which includes the above-described terms NMC_X, NMC_Y, FMC_X, and FMC_Y, an X-axis direction matching pointer mx assumes an integer value in the following range:

$$SS\_EXTEND\_MIN_x \le mx \le SS\_EXTEND\_MAX_x.$$

$$NMC\_X = BBC\_X + mx \cdot NID$$

$$NMC\_Y = BBC\_Y + my \cdot NID$$

$$FMC\_X = BBC\_X + mx \cdot FID$$

$$FMC\_Y = BBC\_Y + my \cdot FID \quad (6.5)$$

Processing in steps S2008 through S2017 is similar to the processing in steps S508 through S517. Accordingly, the detailed description thereof will not be repeated here.

As described above, the present exemplary embodiment uses the processing target depth length DepthLength in setting the search range of the search in the z-axis direction. Accordingly, the present exemplary embodiment can execute the matching in a narrowed search range even if the parallax magnification ratio is high. With the above-described configuration, the present exemplary embodiment can generate a virtual viewpoint, which is more distant from the actual viewpoint, with a high accuracy.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-191203 filed Aug. 27, 2010 and No. 2011-140883 filed Jun. 24, 2011, which are hereby incorporated by reference herein in their entirety.

What is claimed is:

1. An image processing apparatus configured to generate, based on a plurality of images photographed from a plurality of different viewpoints, an image viewed from a virtual viewpoint, the image processing apparatus comprising:
 a calculation unit configured to calculate a near image distance (NID), which corresponds to a distance from the virtual viewpoint to a first viewpoint among the viewpoints of the plurality of images, and a far image distance (FID), which corresponds to a distance from the virtual viewpoint to a second viewpoint among the viewpoints of the plurality of images, which is relatively distant from the virtual viewpoint compared with the first viewpoint;
 a search range setting unit configured to set a search range;
 a determination unit configured to determine parallax vectors corresponding to search reference block coordinates by executing block matching processing within the search range and by using a first block image, which is included in a near image corresponding to the first viewpoint and which corresponds to the search reference block coordinates and the near image distance, and a second block image, which is included in a far image corresponding to the second viewpoint and which corresponds to the search reference block coordinates and the far image distance;
 a generation unit configured to generate the image from viewed from the virtual viewpoint by using the parallax vectors; and
 a setting unit configured to set a parallax magnification (PM),
 wherein the search range setting unit sets the search range according to a depth length which denotes the length of a line segment parallel to an optical axis of an imaging lens, and
 wherein the near image distance (NID) and the far image distance (FID) are first calculated based on the parallax magnification (PM) set by the setting unit using the expressions NID=PM-1 and FID=PM+1, and then adjusted to express a ratio between the NID and the FID by a simple integer when image data has been discretized.

2. The image processing apparatus according to claim 1, wherein the first block image is a block image included in the near image, which exists at a point having coordinates calculated by adding a result of multiplication of the near image distance by a matching pointer having an integer value to the search reference block coordinates, and the second block image is a block image included in the far image, which exists at a point having coordinates calculated by adding a result of multiplication of the far image distance by the matching pointer to the search reference block coordinates, and
 wherein the determination unit includes:
  a second calculation unit configured to calculate matching coefficients for matching between the first block image and the second block image; and
  an updating unit configured to update the matching pointer.

3. The image processing apparatus according to claim 2, wherein the determination unit is configured, if the same matching coefficients are acquired, to use a matching result whose absolute value of the matching pointer is greater.

4. A non-transitory computer-readable storage medium storing computer-executable instructions which, when executed by a computer, implement the image processing apparatus according to claim 1.

5. The image processing apparatus according to claim 1, wherein the depth length denotes the distance based on a direction of a photographing depth between a near-side depth of field $Dof_N$, which corresponds to an object existing close to the lens, and a far-side depth of field $Dof_F$, which corresponds to an object existing more distant from the lens, in relation to the center object distance, at which a focus plane on the object side exists.

6. The image processing apparatus according to claim 5, wherein the depth length is calculated, using $W_n$ and $W_f$ denote correction magnification, according to the following expression: $W_n * Dof_N + W_f * Dof_F$.

7. An image processing apparatus configured to generate, based on a plurality of images photographed from a plurality of different viewpoints, an image viewed from a virtual viewpoint that is located outside the plurality of different viewpoints, the image processing apparatus comprising:
 a projection transform unit configured to projection-transform each of the plurality of images on a common plane;
 a correction unit configured to calculate an intersection between a straight line passing through a search reference position on the common plane and the virtual viewpoint and a straight line passing through the viewpoints of the plurality of images as a virtual viewpoint correction position;
 a calculation unit configured to calculate a near image distance (NID) and a far image distance (FID) for each search reference position on the common plane, wherein the near image distance corresponds to a distance between the virtual viewpoint correction position and a first viewpoint among the viewpoints of the plurality of images, and wherein the far image distance corresponds to a distance between the virtual viewpoint correction position and a second viewpoint, among the viewpoints of the plurality of images, which is relatively distant from the virtual viewpoint correction position compared with the first viewpoint;
 a determination unit configured to determine parallax vectors corresponding to search reference block coordinates by using a first block image, which is included in the projection-transformed near image corresponding to the first viewpoint and which corresponds to the search reference block coordinates and the near image distance, and a second block image, which is included in the projection-transformed far image corresponding to the second viewpoint and which corresponds to the search reference block coordinates and the far image distance;
 a generation unit configured to generate the image viewed from the virtual viewpoint by using the parallax vectors; and
 a setting unit configured to set a parallax magnification (PM),
 wherein the near image distance (NID) and the far image distance (FID) are first calculated based on the parallax magnification (PM) set by the setting unit using the expressions NID=PM-1 and FID=PM+1, and then adjusted to express a ratio between the NID and the FID by a simple integer when image data has been discretized.

8. An image processing method for generating, based on a plurality of images photographed from a plurality of different viewpoints, an image viewed from a virtual viewpoint, the image processing method comprising:

calculating a near image distance (NID), which corresponds to a distance from the virtual viewpoint to a first viewpoint among the viewpoints of the plurality of images, and a far image distance (FID), which corresponds to a distance from the virtual viewpoint to a second viewpoint among the viewpoints of the plurality of images, which is relatively distant from the virtual viewpoint compared with the first viewpoint;

setting a search range;

determining parallax vectors corresponding to search reference block coordinates by executing block matching processing within the search range and by using a first block image, which is included in a near image corresponding to the first viewpoint and which corresponds to the search reference block coordinates and the near image distance, and a second block image, which is included in a far image corresponding to the second viewpoint and which corresponds to the search reference block coordinates and the far image distance; and generating the image viewed from the virtual viewpoint by using the parallax vectors; and setting a parallax magnification (PM), wherein the setting step sets the search range according to a depth length which denotes the length of a line segment parallel to an optical axis of an imaging lens, and wherein the near image distance (NID) and the far image distance (FID) are first calculated based on the parallax magnification (PM) using the expressions NID=PM-1 and FID=PM+1, and then adjusted to express a ratio between the NID and the FID by a simple integer when image data has been discretized.

9. An image processing method for generating, based on a plurality of images photographed from a plurality of different viewpoints, an image viewed from a virtual viewpoint that is located outside the plurality of different viewpoints, the image processing method comprising:

executing a projection-transform on each of the plurality of images on a common plane;

calculating an intersection between a straight line passing through a search reference position on the common plane and the virtual viewpoint and a straight line passing through the viewpoints of the plurality of images as a virtual viewpoint correction position;

calculating a near image distance (NID) and a far image distance (FID) for each search reference position on the common plane, wherein the near image distance corresponds to a distance between the virtual viewpoint correction position and a first viewpoint among the viewpoints of the plurality of images, and wherein the far image distance corresponds to a distance between the virtual viewpoint correction position and a second viewpoint, among the viewpoints of the plurality of images, which is relatively distant from the virtual viewpoint correction position compared with the first viewpoint;

determining parallax vectors corresponding to search reference block coordinates by using a first block image, which is included in the projection-transformed near image corresponding to the first viewpoint and which corresponds to the search reference block coordinates and the near image distance, and a second block image, which is included in the projection-transformed far image corresponding to the second viewpoint and which corresponds to the search reference block coordinates and the far image distance;

generating the image viewed from the virtual viewpoint by using the parallax vectors; and setting a parallax magnification (PM), wherein the near image distance (NID) and the far image distance (FID) are first calculated based on the parallax magnification (PM) using the expressions NID=PM-1 and FID=PM+1, and then adjusted to express a ratio between the NID and the FID by a simple integer when image data has been discretized.

10. An image processing apparatus configured to generate, based on a plurality of images photographed from a plurality of different viewpoints, an image viewed from a virtual viewpoint, the image processing apparatus comprising:

a calculation unit configured to calculate a near image distance (NID), which corresponds to a distance from the virtual viewpoint to a first viewpoint among the viewpoints of the plurality of images, and a far image distance (FID), which corresponds to a distance from the virtual viewpoint to a second viewpoint among the viewpoints of the plurality of images, which is relatively distant from the virtual viewpoint compared with the first viewpoint;

a search range setting unit configured to set a search range;

a determination unit configured to determine parallax vectors corresponding to search reference block coordinates by executing block matching processing within the search range and by using a first block image, which is included in a near image corresponding to the first viewpoint and which corresponds to the search reference block coordinates and the near image distance, and a second block image, which is included in a far image corresponding to the second viewpoint and which corresponds to the search reference block coordinates and the far image distance; and a generation unit configured to generate the image from viewed from the virtual viewpoint by using the parallax vectors; and a setting unit configured to set a parallax magnification (PM), wherein the search range setting unit sets the search range according to a depth of field, and wherein the near image distance (NID) and the far image distance (FID) are first calculated based on the parallax magnification (PM) set by the setting unit using the expressions NID=PM-1 and FID=PM+1, and then adjusted to express a ratio between the NID and the FID by a simple integer when image data has been discretized.

11. An image processing method configured to generate, based on a plurality of images photographed from a plurality of different viewpoints, an image viewed from a virtual viewpoint, the image processing method comprising:

calculating a near image distance (NID), which corresponds to a distance from the virtual viewpoint to a first viewpoint among the viewpoints of the plurality of images, and a far image distance (FID), which corresponds to a distance from the virtual viewpoint to a second viewpoint among the viewpoints of the plurality of images, which is relatively distant from the virtual viewpoint compared with the first viewpoint;

setting a search range;

determining parallax vectors corresponding to search reference block coordinates by executing block matching processing within the search range and by using a first block image, which is included in a near image corresponding to the first viewpoint and which corresponds to the search reference block coordinates and the near image distance, and a second block image, which is included in a far image corresponding to the second viewpoint and which corresponds to the search reference block coordinates and the far image distance;

generating the image from viewed from the virtual viewpoint by using the parallax vectors; and setting a parallax magnification (PM), wherein the setting step sets the search range according to a depth of field and wherein the near image distance (NID) and the far image distance (FID) are first calculated based on the parallax magnification (PM) set by the setting unit using the expressions NID=PM-1 and FID=PM+1, and then adjusted to express a ratio between the NID and the FID by a simple integer when image data has been discretized.

* * * * *